(12) United States Patent
Kanbayashi et al.

(10) Patent No.: US 11,635,563 B2
(45) Date of Patent: Apr. 25, 2023

(54) ILLUMINATION DEVICE AND DISPLAY DEVICE

(71) Applicant: Sharp Display Technology Corporation, Kameyama (JP)

(72) Inventors: Yuuichi Kanbayashi, Kameyama (JP); Shugo Yagi, Kameyama (JP); Satoshi Tsubooka, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 17/675,276

(22) Filed: Feb. 18, 2022

(65) Prior Publication Data

US 2022/0268987 A1 Aug. 25, 2022

(30) Foreign Application Priority Data

Feb. 25, 2021 (JP) .............................. JP2021-028837

(51) Int. Cl.
*F21V 8/00* (2006.01)
(52) U.S. Cl.
CPC ........... *G02B 6/0053* (2013.01); *G02B 6/003* (2013.01); *G02B 6/0055* (2013.01)
(58) Field of Classification Search
CPC .... G02B 6/0016; G02B 6/0018; G02B 6/003; G02B 6/0036; G02B 6/0038; G02B 6/005; G02B 6/0053
See application file for complete search history.

(56) References Cited

U.S. PATENT DOCUMENTS

| 7,370,999 | B2 * | 5/2008 | Feng | G02B 6/0016 362/617 |
| 7,918,597 | B2 * | 4/2011 | Kunimochi | G02B 6/0016 362/613 |
| 11,035,996 | B2 * | 6/2021 | Chang | G02B 6/0078 |
| 2008/0002431 | A1 * | 1/2008 | Maeda | G02B 6/0038 362/618 |
| 2008/0285309 | A1 * | 11/2008 | Fang | G02B 6/0061 362/620 |
| 2010/0271841 | A1 * | 10/2010 | Kim | G02B 6/0031 362/607 |
| 2013/0027972 | A1 | 1/2013 | Suma | |
| 2017/0285244 | A1 * | 10/2017 | Yoshida | G02B 6/0055 |

FOREIGN PATENT DOCUMENTS

JP 2013026138 A 2/2013

* cited by examiner

*Primary Examiner* — Keith G. Delahoussaye
(74) *Attorney, Agent, or Firm* — ScienBiziP, P.C.

(57) ABSTRACT

A backlight device includes at least a plurality of LEDs arranged in a row, a light guide plate including at least a light entering end face having a plate shape, and a light refracting portion configured with a plurality of unit light refracting portions arranged side by side on the light entering end face along an alignment direction of the plurality of LEDs, wherein in the light refracting portion, an occupancy rate occupied by the unit light refracting portion in an end side portion of the light entering end face in the alignment direction is made lower than an occupancy rate occupied by the unit light refracting portion in a central side portion of the light entering end face in the alignment direction.

22 Claims, 33 Drawing Sheets

ILLUMINATION DEVICE AND DISPLAY DEVICE

CROSS-REFERENCE TO RELATED APPLICATIONS

This application claims the benefit of priority to Japanese Patent Application Number 2021-028837 filed on Feb. 25, 2021. The entire contents of the above-identified application are hereby incorporated by reference.

BACKGROUND

Technical Field

The techniques disclosed herein relate to illumination devices and display devices.

As an example of an illumination device to be used for a liquid crystal display device and the like in the related art, an illumination device described in JP 2013-26138 A is known. A planar illumination device that is the illumination device described in JP 2013-26138 A has a light entering prism formed on a light entering end face of a light guide plate thereof, and the light entering prism includes a first prism portion including a plurality of first prisms formed in a convex shape with respect to the light entering end face, and a second prism portion provided adjacent to the first prism portion along a longitudinal direction of the light entering end face and including a plurality of second prisms formed in a convex shape with respect to the light entering end face. Then, each of the plurality of first prisms is formed so as to partially overlap the adjacent first prism, and a top portion of each first prism is at a higher position with respect to the light entering end face than that of a top portion of each second prism, thereby suppressing brightness inversion phenomenon generated near the light entering end face without increasing light leakage.

SUMMARY

In a planar illumination device such as that described in JP 2013-26138 A, it may be necessary to improve the front brightness of emission light, and in this case, an optical design may be adopted that narrows an angle range where light incident on the light entering end face of the light guide plate is to spread. In such a case, at an end portion of the light guide plate in the longitudinal direction of the light entering end face, there is a risk that a dark portion locally having a small amount of emission light may be easily visually recognized near an end face at the opposite side to the light entering end face, and a bright portion locally having a large amount of emission light may be easily visually recognized near the light entering end face. As a result, brightness unevenness in emission light easily occurs.

The technique described herein has been made based on the circumstances described above, and an object thereof is to suppress the occurrence of brightness unevenness.

(1) An illumination device according to the technique described in the present specification includes a plurality of light sources arranged in a row, a light guide plate including at least a light entering end face having a plate shape, the light entering end face including an outer peripheral edge face on which light emitted from the plurality of light sources is incident, and an opposite end face to the light entering end face disposed at an opposite side to the light entering end face, the light guide plate having one plate face serving as a light emission plate face configured to emit light, and a light refracting portion configured with a plurality of unit light refracting portions arranged side by side on the light entering end face along an alignment direction of the plurality of light sources, the light refracting portion being configured to refract incident light, wherein in the light refracting portion, an occupancy rate occupied by the unit light refracting portion in an end side portion of the light entering end face in the alignment direction is made lower than an occupancy rate occupied by the unit light refracting portion in a central side portion of the light entering end face in the alignment direction.

(2) Further, in addition to the above-described (1), in the illumination device described above, the light refracting portion may be configured to have a length in the alignment direction of the end side portion within a range being greater than 4.5 mm and less than 15.9 mm.

(3) Further, in addition to the above-described (2), in the illumination device described above, the light refracting portion may be configured to have the length in the alignment direction of the end side portion within a range being equal to or greater than 8.3 mm and equal to or less than 12.1 mm.

(4) Further, in addition to any one of the above-described (1) to (3), in the illumination device described above, the light refracting portion may be configured to have the occupancy rate in the central side portion being equal to or greater than 70% and equal to or less than 85% in percent figures.

(5) Further, in addition to the above-described (4), in the illumination device described above, the light refracting portion may have the occupancy rate in the central side portion being higher than 70%.

(6) Further, in addition to any one of the above-described (1) to (5), in the illumination device described above, the light refracting portion may be configured to have the occupancy rate in the end side portion being equal to or greater than 50% and equal to or less than 60% in percent figures.

(7) Further, in addition to the above-described (6), in the illumination device described above, the light refracting portion may be configured to have the occupancy rate in the end side portion being lower than 60%.

(8) Further, in addition to the above-described (6) or (7), in the illumination device described above, the light refracting portion may be configured to have a dimension in the alignment direction of each of the plurality of the unit light refracting portions being identical in the end side portion and the central side portion.

(9) Further, in addition to any one of the above-described (1) to (5), in the illumination device described above, the light refracting portion may be configured to have the occupancy rate in the end side portion being equal to 0% in percent figures.

(10) Further, in addition to any of the above-described (1) to (9), in the illumination device described above, the light refracting portion may be configured to have, in two of the end side portions sandwiching the central side portion of the light entering end face, the occupancy rates being different from each other.

(11) Further, in addition to any one of the above-described (1) to (10), in the illumination device described above, the light refracting portion may be configured to have the plurality of unit light refracting portions each of which extends along a normal direction of the light emission plate face, and has an arch shape in a cross section taken along the light emission plate face.

(12) Further, in addition to any one of the above-described (1) to (11), the illumination device described above may include a light reflecting member facing at least a portion excluding the light entering end face, of the outer peripheral edge face of the light guide plate.

(13) Further, in addition to any one of the above-described (1) to (12), the illumination device described above may include a first prism sheet disposed on a light emission side with respect to the light guide plate, the first prism sheet being provided with a plurality of first unit prisms arranged side by side along a direction from each of the plurality of light sources toward the light guide plate on a light emission face configured to emit light, the plurality of first unit prisms extending along the alignment direction, and a second prism sheet disposed on a light emission side with respect to the first prism sheet, the second prism sheet being provided with a plurality of second unit prisms arranged side by side in the direction from each of the plurality of light sources toward the light guide plate on the light emission face configured to emit light, the plurality of second unit prisms extending along the alignment direction.

(14) Further, in addition to any one of the above-described (1) to (13), the illumination device described above may include a prism sheet disposed on a light emission side with respect to the light guide plate, the prism sheet being provided with a plurality of unit prisms arranged side by side along a direction from each of the plurality of light sources toward the light guide plate on the light entering face on which light from the light guide plate is incident, the plurality of unit prisms extending along the alignment direction.

(15) A display device according to the technique described in the present specification includes the illumination device according to any one of the above-described (1) to (14), and a display panel configured to perform display by using light from the illumination device.

According to the technique described herein, the occurrence of brightness unevenness can be suppressed.

BRIEF DESCRIPTION OF DRAWINGS

The disclosure will be described with reference to the accompanying drawings, wherein like numbers reference like elements.

DESCRIPTION OF EMBODIMENTS

First Embodiment

A first embodiment will be described with reference to FIG. 1 to FIG. 16. In the present embodiment, a liquid crystal display device 10 (a display device) is exemplified. Note that an X-axis, a Y-axis, and a Z-axis are illustrated in a part of each drawing, and each axial direction is illustrated to be the direction illustrated in each drawing. Furthermore, a vertical direction is based on the vertical direction of FIG. 2 and FIG. 3, an upper side of the same drawing is referred to as a front side, and a lower side of the same drawing is referred to as a back side.

Figure 1:
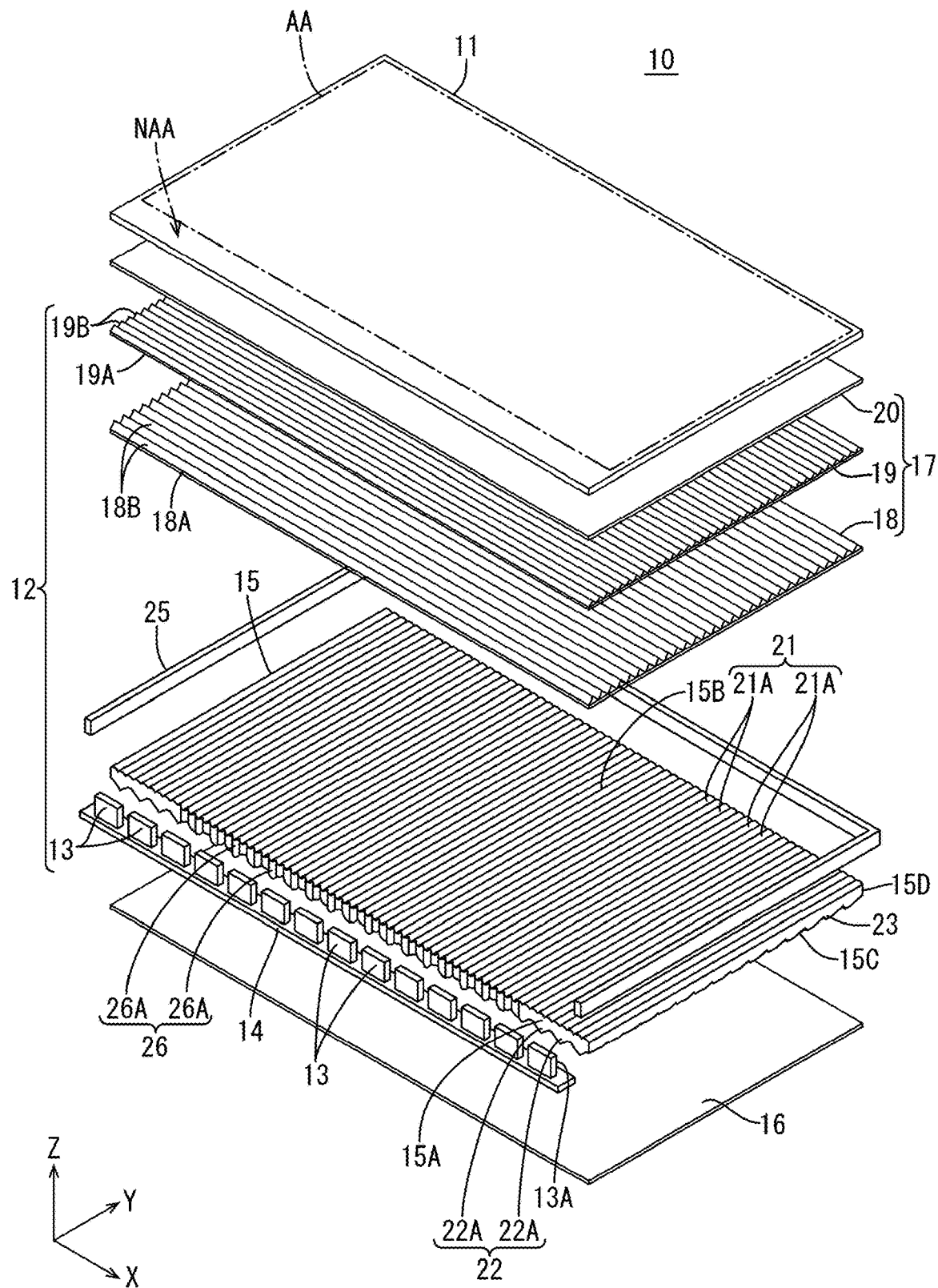
FIG. 1 is an exploded perspective view of a liquid crystal display device according to a first embodiment.

As illustrated in FIG. 1, the liquid crystal display device 10 includes a liquid crystal panel (display panel) 11 configured to display an image, and a backlight device (illumination device) 12 disposed at a back side of the liquid crystal panel 11 and configured to irradiate the liquid crystal panel 11 with light to be used for display. The liquid crystal panel 11 is formed in a rectangular plate shape as a whole, a long side direction, a short side direction, and a plate thickness direction thereof coincide with an X-axis direction, a Y-axis direction, and a Z-axis direction, respectively. A screen size of the liquid crystal panel 11 is set to, for example, approximately 13 inches. The liquid crystal panel 11 is formed by sealing a liquid crystal layer between a pair of substrates, and of the pair of substrates, a CF substrate (counter substrate) is disposed at the front side, and an array substrate (TFT substrate) is disposed at the back side. The CF substrate is provided with a color filter in which color portions such as R (red), G (green), and B (blue) are arranged in a predetermined array, and a light blocking portion (black matrix) partitioning between adjacent color portions, and is further provided with a structure such as an alignment film. The array substrate (TFT substrate) is provided with structures such as a switching element (for example, a TFT) connected to a source wiring line and a gate wiring line that are orthogonal to each other, a pixel electrode connected to the switching element and configuring a pixel, and an alignment film. The liquid crystal panel 11 has a display region AA being capable of displaying an image and positioned in a central side portion of a plate face thereof, and a non-display region NAA positioned at an outer peripheral edge portion surrounding the display region AA and having a frame shape. In the display region AA, a plurality of pixels each of which is one display unit are arranged side by side along each of the X-axis direction and the Y-axis direction and are formed in an array. A reflective polarizing sheet 20 provided in the backlight device 12 that will be described below is attached to the plate face at the back side (outer side) of the array substrate constituting the liquid crystal panel 11. The reflective polarizing sheet 20 will be described in detail later. Note that a polarizer is attached to the plate face at the front side (outer side) of the CF substrate constituting the liquid crystal panel 11.

Next, the backlight device 12 will be described. As illustrated in FIG. 1, the backlight device 12 includes at least LEDs (light sources) 13, an LED substrate (light source substrate) 14 on which the LEDs 13 are mounted, a light guide plate 15 that guides light from the LEDs 13, a reflection sheet 16 disposed at a back side of the light guide plate 15, and a plurality of optical sheets 17 arranged in an interposed manner between the light guide plate 15 and the liquid crystal panel 11. The LED 13 is a "light source", and the backlight device 12 is an edge light type of a one-side light entering type in which light of the LED 13 is incident on the light guide plate 15 only from one side.

As illustrated in FIG. 1, the LED 13 is configured such that an LED chip is sealed with a sealing material on a substrate portion affixed to the LED substrate 14. The LED 13 is configured such that the LED chip emits, for example, blue light in a single light, and a phosphor is dispersed and mixed in the sealing material to emit white light as a whole. Examples of the phosphor include yellow phosphor, green phosphor, and red phosphor. The LED 13 is a so-called side light emitting type in which a side face thereof adjacent to a mounting face of the LED substrate 14 is a light-emitting face 13A. The LED 13 has a width dimension (dimension in the X-axis direction) of approximately 3 mm. The plate faces of the LED substrate 14 are disposed in a posture parallel to the plate face of the light guide plate 15, a plate face thereof facing the front side is a mounting face provided with the LED 13, and a plurality of LEDs 13 are arranged side by side and mounted on the mounting face at intervals along the X-axis direction. The arrangement interval between two of the LEDs 13 adjacent to each other in the X-axis direction is substantially constant. An alignment direction of the LED 13 and the light guide plate 15 matches the Y-axis direction (first direction), and the Y-axis direction includes a direction from the LED 13 toward the light guide plate 15 and a direction from the light guide plate 15 toward the LED 13. Furthermore, an alignment direction of the plurality of LEDs 13 coincides with the X-axis direction (second direction), and the X-axis direction is orthogonal to both the Y-axis direction and the Z-axis direction (the normal direction of the plate face of the light guide plate 15).

The light guide plate 15 is made of a synthetic resin material (for example, acrylic resin such as PMMA or the like) that has a sufficiently higher refractive index than that of the air and that is substantially transparent. As illustrated in FIG. 1, the light guide plate 15 has a plate shape, and the plate face thereof is parallel to the plate face of the liquid crystal panel 11. Note that the light guide plate 15 is configured such that a long side direction of the plate face, a short side direction of the plate face, and a plate thickness direction being the normal direction of the plate face coincide with the X-axis direction, the Y-axis direction, and the Z-axis direction, respectively. The light guide plate 15 has a long side dimension (a dimension in the X-axis direction) of approximately 290 mm, and a short side dimension (a dimension in the Y-axis direction) of approximately 180 mm. The light guide plate 15 is disposed directly below the liquid crystal panel 11 and the optical sheet 17, and an end face at a side of one long side of the outer peripheral edge face thereof is a light entering end face 15A that faces the light-emitting faces 13A of the LEDs 13 and on which light from the light-emitting faces 13A is directly incident. The longitudinal direction of the light entering end face 15A coincides with the X-axis direction (the alignment direction of the plurality of LEDs 13). Of a pair of plate faces of the light guide plate 15, the plate face at the front side facing the liquid crystal panel 11 and the optical sheet 17 is a light emission plate face 15B that emits light guided therein, and the plate face at the back side facing the reflection sheet 16 is an opposite plate face 15C. Then, the light guide plate 15 has a function of introducing light emitted from the LED 13 toward the light guide plate 15 from the light entering end face 15A, propagating the light therein, then, allowing the light to rise along the Z-axis direction such that the light is directed toward the front side (light emission side), and emitting the light. A detailed structure of the light guide plate 15 will be described later. Note that the normal direction of the light entering end face 15A coincides with the Y-axis direction.

As illustrated in FIG. 1, the reflection sheet 16 has the plate face disposed in parallel with the respective plate faces of the liquid crystal panel 11 and the light guide plate 15, and is disposed to cover the opposite plate face 15C of the light guide plate 15. The reflection sheet 16 has excellent light reflectivity, and can efficiently cause light leaked from the opposite plate face 15C of the light guide plate 15 to rise toward the front side, that is, toward the light emission plate face 15B. The reflection sheet 16 has an outer shape slightly larger than that of the light guide plate 15, and is disposed so as to overlap substantially all over the opposite plate face 15C.

As illustrated in FIG. 1, the optical sheet 17 has a sheet shape, and the plate face thereof is parallel to the respective plate faces of the liquid crystal panel 11 and the light guide plate 15. As with the liquid crystal panel 11 and the light guide plate 15, the optical sheet 17 is configured such that a long side direction of the plate face, a short side direction of the plate face, and a plate thickness direction being the normal direction of the plate face coincide with the X-axis direction, the Y-axis direction, and the Z-axis direction, respectively. The optical sheet 17 is disposed in an interposed manner between the liquid crystal panel 11 and the light guide plate 15 in the Z-axis direction, and has functions of imparting a predetermined optical action to light emitted from the LEDs 13, emitting the light toward the liquid crystal panel 11, and the like. In the optical sheet 17, a plate face facing to the back side, that is, to the light guide plate 15 side serves as a light entering face 17A on which light is incident, and a plate face facing to the front side, that is, to the liquid crystal panel 11 side serves as a light emission face 17B from which light is emitted. The optical sheet 17 includes a total of three sheets, which are a first prism sheet 18, a second prism sheet 19, and a reflective polarizing sheet 20 that are arranged in this order from the back side.

First, the reflective polarizing sheet 20 illustrated in FIG. 1 will be described. The reflective polarizing sheet 20 includes a polarization layer having a specific polarization axis (transmission axis), a multilayer film in which layers having mutually different refractive indices are alternately layered, a protection layer, and the like. The polarization layer is configured such that a polarizing plate formed by mixing an absorber such as iodine, or dichroic dye into a polymer resin film such as a polyvinyl alcohol (PVA) film, and performing uniaxial stretching to orient the absorber is sandwiched with a protection film such as a triacetyl cellulose (TAC) film. The polarization layer that has been uniaxially stretched as described above has a polarization axis and an absorption axis orthogonal to the polarization axis, so that linearly polarized light parallel to the polarization axis can be selectively transmitted and circularly polarized light can be converted to linearly polarized light along the polarization axis. The polarization axis of the polarization layer has an orthogonal relationship to the polarization axis of the polarizer attached to the plate face at the outer side of the CF substrate. The multilayer film includes a plurality of layers made of, for example, polyethylene naphthalate (PEN), and reflection characteristics (transmission characteristics) that differ between p-waves and s-waves included in light are exhibited due to its multilayer structure. That is, the multilayer film has a reflection characteristic that the reflectivity for the s-waves is generally higher than the reflectivity for the p-waves. The s-waves reflected by the multilayer film are reflected again toward the front side by the light guide plate 15, the reflection sheet 16, another optical sheet 17, or the like to be separated into s-waves and p-waves at that time. In this way, the reflective polarizing sheet 20 being provided with the multilayer film can reflect s-waves that are originally to be absorbed by the polarization layer toward the back side to allow the s-waves to be reused, thereby enhancing the usage efficiency (and then, brightness) of light.

Figure 2:
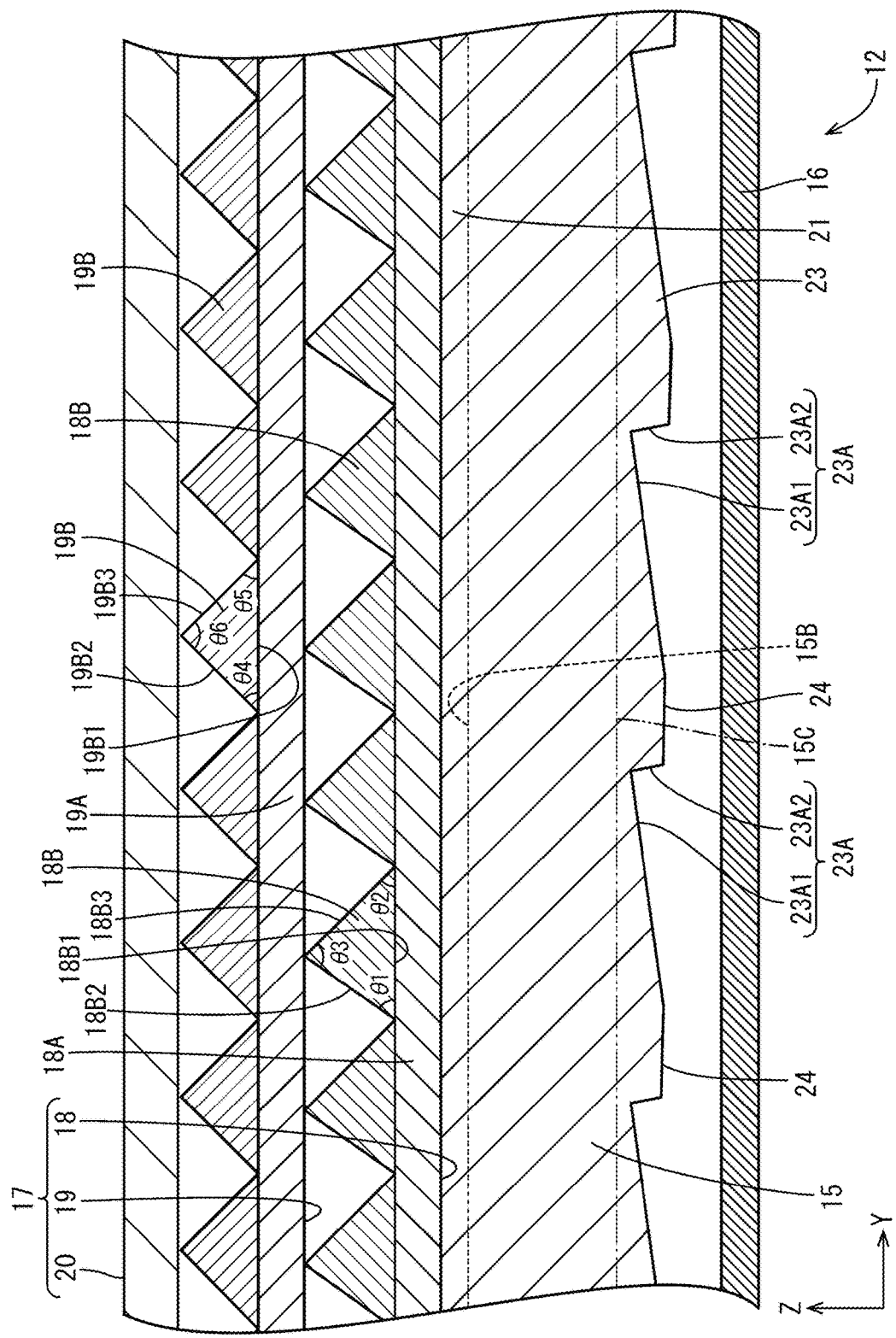
FIG. 2 is a cross-sectional view of a backlight device, which is taken along a Y-axis direction, constituting the liquid crystal display device.

As illustrated in FIG. 1 and FIG. 2, the first prism sheet 18 includes a first base material 18A having a sheet shape, and first unit prisms 18B provided on a plate face (light emission face 17B) at the front side (light emission side) of the first base material 18A. The first base material 18A is made of substantially transparent synthetic resin, and specifically, is formed of, for example, a crystalline transparent resin material such as polyethylene terephthalate (PET). The first base material 18A is formed into a sheet shape by stretching the crystalline transparent resin material serving as a raw material in a biaxially stretching process in manufacturing, which is suitable for reducing manufacturing costs. The first unit prism 18B is formed of an ultraviolet-curing resin material being substantially transparent and being a type of photo-curable resin material. In manufacturing the first prism sheet 18, for example, the uncured ultraviolet-curing resin material is filled into a mold for molding, and the first base material 18A is applied to an opening end of the mold to dispose the uncured ultraviolet-curing resin material so as to contact the plate face at the front side, and in this state, when the ultraviolet-curing resin material is irradiated with ultraviolet rays through the first base material 18A, the ultraviolet-curing resin material is cured, and the first unit prisms 18B are integrally provided with the first base material 18A. The ultraviolet-curing resin material constituting the first unit prisms 18B is, for example, acrylic resin such as PMMA. A refractive index of the ultraviolet-curing resin material constituting the first unit prisms 18B is preferably within a range from 1.49 to 1.52, and is most preferably set to 1.49.

As illustrated in FIG. 1 and FIG. 2, the first unit prisms 18B are provided so as to protrude from the plate face of the first base material 18A toward the front side (opposite side to the light guide plate 15 side) along the Z-axis direction. The first unit prism 18B has a substantially triangular shape (substantially mountain shape) in a cross section taken along the Y-axis direction and extends linearly along the X-axis direction (second direction), and a plurality of the first unit prisms 18B are continuously arranged side by side with substantially no interval along the Y-axis direction (first direction) on the plate face of the first base material 18A. The first unit prism 18B includes a base 18B1 parallel to the Y-axis direction, and a pair of oblique sides 18B2 and 18B3 rising from both ends of the base 18B1. Of the pair of oblique sides 18B2 and 18B3 in the first unit prism 18B, the oblique side at the LED 13 side in the Y-axis direction is referred to as a first LED-side oblique side (first light source-side oblique side) 18B2, and the oblique side at the opposite side is referred to as a first opposite-side oblique side to the LED side (first opposite-side oblique side to the light source side) 18B3. Of the pair of oblique sides, the first opposite-side oblique side to the LED side 18B3 is exposed mainly to light traveling in a direction away from the LED 13 in the Y-axis direction, of light incident on the first unit prism 18B, to refract the light. In contrast, the first LED-side oblique side 18B2 is exposed mainly to light traveling in a direction approaching the LED 13 in the Y-axis direction, of the light incident on the first unit prism 18B, to refract the light. In any case, most of the light refracted by the pair of oblique sides 18B2 and 18B3 in the first unit prism 18B is selectively raised in the Y-axis direction and condensed.

Additionally, as illustrated in FIG. 1 and FIG. 2, in the first unit prism 18B, when an inclination angle (angle, bottom angle at the front face) θ1 of the first LED-side oblique side 18B2 with respect to the base 18B1, and an inclination angle (angle, bottom angle at the back face) θ2 of the first opposite-side oblique side to the LED side 18B3 with respect to the base 18B1 are compared, the former is set to be larger than the latter. In other words, the first unit prism 18B has an asymmetrical cross-sectional shape, which is a scalene triangle. Specifically, the inclination angle θ1 of the first LED-side oblique side 18B2 with respect to the base 18B1 in the first unit prism 18B is preferably within a range from 50 degrees to 60 degrees, and is most preferably set to 55 degrees. In contrast, the inclination angle θ2 of the first opposite-side oblique side to the LED side 18B3 with respect to the base 18B1 in the first unit prism 18B is preferably within a range from 35 degrees to 50 degrees, and is most preferably set to 45 degrees. Furthermore, an apex angle (angle) θ3 formed by the pair of oblique sides 18B2 and 18B3 in the first unit prism 18B is preferably within a range from 70 degrees to 95 degrees, and is most preferably set to 80 degrees. Note that all the plurality of first prisms 18B aligned along the X-axis direction have substantially the same height dimension thereof, width dimension of the base 18B1, inclination angles of the oblique sides 18B2 and 18B3 with respect to the base 18B1, and the like, and are arranged such that the arrangement intervals between the adjacent first unit prisms 18B are substantially constant and equal.

As illustrated in FIG. 1 and FIG. 2, the second prism sheet 19 has a second base material 19A having a sheet shape and second unit prisms 19B provided on a plate face (light emission face 17B) at the front side (light emission side) of the second base material 19A. The second base material 19A is made of substantially transparent synthetic resin, and is specifically formed of, for example, a crystalline transparent resin material such as PET that is the same as the first base material 18A. The second unit prism 19B is formed of a substantially transparent ultraviolet-curing resin material that is a type of photo-curable resin material. A manufacturing method of the second prism sheet 19 is similar to the manufacturing method of the first prism sheet 18 described above. The ultraviolet-curing resin material constituting the second unit prism 19B is, for example, acrylic resin such as PMMA, and a refractive index thereof is made to be higher than the refractive index of the material of the first unit prism 18B, and is set to, for example, approximately 1.61.

As illustrated in FIG. 1 and FIG. 2, the second unit prism 19B is provided so as to protrude from a plate face of the second base material 19A toward the front side (opposite side to the first prism sheet 18 side) along the Z-axis direction. The second unit prism 19B has a substantially triangular shape (substantially mountain shape) in a cross section taken along the Y-axis direction and extends linearly along the X-axis direction, and a plurality of the second unit prisms 19B are continuously arranged side by side with substantially no interval along the Y-axis direction on the plate face of the second base material 19A. The second unit prism 19B includes a base 19B1 parallel to the Y-axis direction, and a pair of oblique sides 19B2 and 19B3 rising from both ends of the base 19B1. Of the pair of oblique sides 19B2 and 19B3 in the second unit prism 19B, the oblique side at the LED 13 side in the Y-axis direction is referred to as a second LED-side oblique side (second light source-side oblique side) 19B2, and the oblique side at the opposite side is referred to as a second opposite-side oblique side to the LED side (second opposite-side oblique side to the light source side) 19B3. Of the pair of oblique sides, the second opposite-side oblique side to the LED side 19B3 is exposed mainly to light traveling in a direction away from the LED 13 in the Y-axis direction, of light incident on the second unit prism 19B, to refract the light. In contrast, the second LED-side oblique side 19B2 is exposed mainly to light traveling in a direction approaching the LED 13 in the Y-axis direction, of the light incident on the second unit prism 19B, to refract the light. In any case, most of the light refracted by the pair of oblique sides 19B2 and 19B3 in the second unit prism 19B is selectively raised in the Y-axis direction and condensed.

Additionally, as illustrated in FIG. 1 and FIG. 2, in the second unit prism 19B, an inclination angle (angle, bottom angle at the front side) θ4 of the second LED-side oblique side 19B2 with respect to the base 19B1, and an inclination angle (angle, bottom angle at the back side) θ5 of the second opposite-side oblique side to the LED side 19B3 with respect to the base 19B1 are identical. In other words, the second unit prism 19B has a symmetric cross-sectional shape, which is an isosceles triangle. Moreover, the inclination angle θ4 of the second LED-side oblique side 19B2 with respect to the base 19B1 of the second unit prism 19B is made smaller than the inclination angle θ1 of the first LED-side oblique side 18B2 with respect to the base 18B1 of the first unit prism 18B provided in the first prism sheet 18. Specifically, the respective inclination angles θ4 and θ5 of the pair of oblique sides 19B2 and 19B3 with respect to the base 19B1 of the second unit prism 19B are preferably within a range from 40 degrees to 50 degrees, and are most preferably set to 45 degrees. In contrast, an apex angle (angle) θ6 formed by the pair of oblique sides 19B2 and 19B3 in the second unit prism 19B is preferably within a range from 80 degrees to 100 degrees, and is most preferably set to 90 degrees, that is, a right angle. Note that all the plurality of second unit prisms 19B aligned along the X-axis direction have substantially the same height dimension thereof, width dimension of the base 19B1, inclination angles of the oblique sides 19B2 and 19B3 with respect to the base 19B1, and the like, and are arranged such that the arrangement intervals between the adjacent second unit prisms 19B are substantially constant and equal. In addition, it is preferable that the height dimension and the arrangement interval in the second unit prism 19B differ from the height dimension and the arrangement interval in the first unit prism 18B, respectively, in terms of suppressing the occurrence of interference fringes called moire.

The actions and effects of the first prism sheet 18 and the second prism sheet 19 having the configurations described above will be described. Light emitted from the LED 13 to be incident on the light entering end face 15A of the light guide plate 15 propagates inside the light guide plate 15 and is emitted from the light emission plate face 15B to be incident on the first prism sheet 18. Most of the light incident on the first prism sheet 18 is incident on and refracted by the first opposite-side oblique side to the LED side 18B3 that is an oblique side positioned at the opposite side to the LED 13 side in the Y-axis direction, of the pair of oblique sides 18B2 and 18B3 in the first unit prism 18B, and then, is raised and emitted, or is directed toward the first LED-side oblique side 18B2 that is an oblique side positioned at the LED 13 side in the Y-axis direction. Here, in the first unit prism 18B, the angle formed by the first LED-side oblique side 18B2 that is the oblique side positioned at the LED 13 side in the Y-axis direction with respect to the bases 18B1 and 19B1 is larger than that in the second unit prism 19B, so compared with the case where the angles are identical, or the magnitude relationship between the angles is reversed, the light incident on the first prism sheet 18 is less likely to be incident on the first LED-side oblique side 18B2 that is the oblique side positioned at the LED 13 side in the first unit prism 18B. When the incident light on the first prism sheet 18 is incident on the first LED-side oblique side 18B2 that is the oblique side at the LED 13 side of the first unit prism 18B, the light is not raised when being emitted from the first unit prism 18B, and tends to become stray light to be emitted. Thus, when the incident light on the first prism sheet 18 becomes difficult to be directly incident on the first LED-side oblique side 18B2 that is the oblique side positioned at the LED 13 side in the first unit prism 18B, the generation of stray light is suppressed, and as a result, the usage efficiency of light is improved.

Most of the light emitted from the first prism sheet 18 to be incident on the second prism sheet 19 is incident on and refracted by the second opposite-side oblique side to the LED side 19B3 that is an oblique side positioned at the opposite side to the LED 13 side in the Y-axis direction, of the pair of oblique sides 19B2 and 19B3 in the second unit prism 19B, and then, is raised and emitted or is directed toward the second LED-side oblique side 19B2 that is an oblique side positioned at the LED 13 side in the Y-axis direction. Here, in the second unit prism 19B, the angle formed by the second LED-side oblique side 19B2 that is an oblique side positioned at the LED 13 side in the Y-axis direction with respect to the base 19B1 is smaller than that in the first unit prism 18B, so compared with the case where the angles are identical, or the magnitude relationship between the angles is reversed, the light refracted by the second opposite-side oblique side to the LED side 19B3 that is an oblique side positioned at the opposite side to the LED 13 side in the Y-axis direction to be directed toward the second LED-side oblique side 19B2 that is an oblique side positioned at the LED 13 side in the Y-axis direction is easily returned to the first prism sheet 18 side by the second LED-side oblique side 19B2 that is an oblique side positioned at the LED 13 side in the Y-axis direction. As a result, the amount of light returned from the second prism sheet 19 toward the first prism sheet 18 side (hereinafter referred to as recursive light) is increased. This recursive light reaches the second prism sheet 19 again by being reflected or the like inside the backlight device 12, and is raised and emitted by either of the pair of oblique sides 19B2 and 19B3 in the second unit prism 19B, so the usage efficiency of light is improved. Since a light path until light is emitted from the second prism sheet 19 is complicated, a rising angle given by the second unit prism 19B is also diversified, thereby improving the viewing angle characteristics. As described above, the viewing angle characteristics and brightness (front brightness) can be improved.

Figure 3:
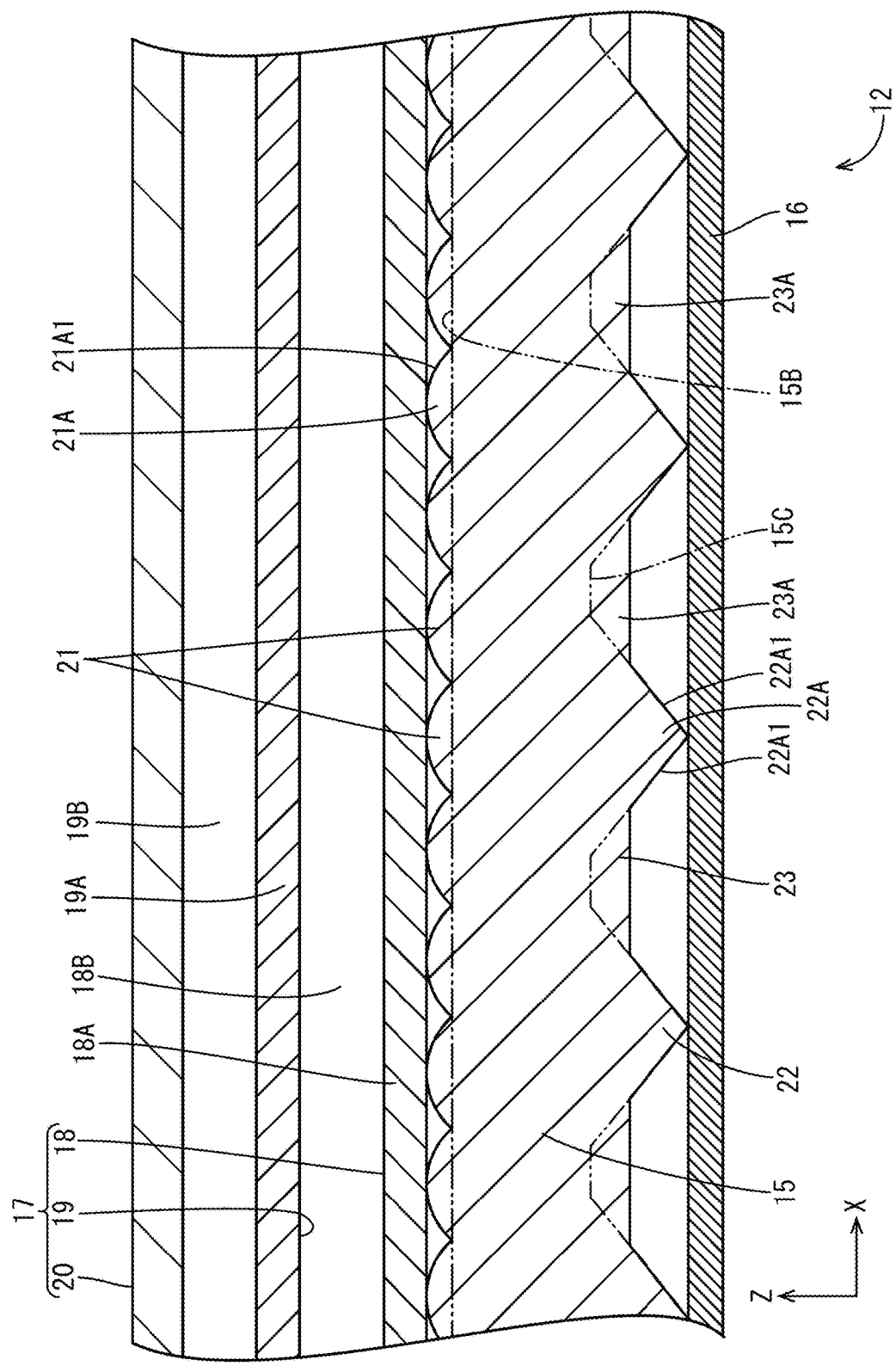
FIG. 3 is a cross-sectional view of the backlight device taken along an X-axis direction.

As illustrated in FIG. 1 and FIG. 3, a first light guide plate lens portion 21 and a second light guide plate lens portion 22 are provided on the light emission plate face 15B and the opposite plate face 15C of the light guide plate 15, respectively. The first light guide plate lens portion 21 includes a plurality of first light guide plate unit lenses 21A extending along the Y-axis direction on the light emission plate face 15B of the light guide plate 15 and arranged side by side along the x-axis direction. In the present embodiment, the first light guide plate lens portion 21 is a so-called lenticular lens, and the first light guide plate unit lens 21A is a convex type cylindrical lens protruding from the light emission plate face 15B to the front side. The first light guide plate unit lens 21A has a cross section having a semi-circular shape when being taken along the X-axis direction and having a semi-cylindrical shape linearly extending along the Y-axis direction, and the surface thereof is a circular arc-shaped face 21A1. When an angle formed by a tangent line at a base end portion of the circular arc-shaped face 21A1 with respect to the X-axis direction is defined as a "contact angle", a contact angle of the first light guide plate unit lens 21A is, for example, approximately 62 degrees. The plurality of first light guide plate unit lenses 21A aligned along the X-axis direction are substantially identical in contact angle, width dimension (arrangement interval) of the bottom face, and height dimension. In order to provide the first light guide plate lens portion 21 having such a configuration integrally with the light guide plate 15, for example, the light guide plate 15 may be manufactured by injection molding, and a transfer shape for transferring the first light guide plate lens portion 21 may be formed in advance on a molding face of a molding die thereof for molding the light emission plate face 15B.

As illustrated in FIG. 1 and FIG. 3, the second light guide plate lens portion 22 includes a plurality of second light guide plate unit lenses 22A extending along the Y-axis direction and arranged side by side along the X-axis direction on the opposite plate face 15C of the light guide plate 15. In the present embodiment, the second light guide plate lens portion 22 is a so-called prism type lens, and the second light guide plate unit lens 22A is a convex type prism protruding from the light emission plate face 15B to the back side. The second light guide plate unit lens 22A has a substantially triangular shape (substantially mountain shape) in a cross section taken along the X-axis direction and extends linearly along the Y-axis direction. The width dimension (dimension in the X-axis direction) of the second light guide plate unit lens 22A is constant throughout the entire length in the Y-axis direction. The second light guide plate unit lens 22A has a cross section having an approximately isosceles triangle shape, and has a pair of inclined faces 22A1, and an apex angle thereof is preferably set to an obtuse angle (angle larger than 90 degrees), specifically, within a range from 100 degrees to 150 degrees, and is most preferably set to 140 degrees. The plurality of second light guide plate unit lenses 22A aligned along the X-axis direction are substantially identical in apex angle, width dimension (arrangement interval) of the bottom face, and height dimension. In the present embodiment, the arrangement interval of the second light guide plate unit lenses 22A is larger than the arrangement interval of the first light guide plate unit lenses 21A. In order to provide the second light guide plate lens portion 22 having such a configuration integrally with the light guide plate 15, for example, the light guide plate 15 may be manufactured by injection molding, and a transfer shape for transferring the second light guide plate lens portion 22 may be formed in advance on a molding face of a molding die thereof for molding the light emission plate face 15B.

According to such a configuration, as illustrated in FIG. 2, light propagating inside the light guide plate 15 is repeatedly reflected by being incident on the circular arc-shaped face 21A1 of the first light guide plate unit lens 21A constituting the first light guide plate lens portion 21 at the light emission plate face 15B side in the Z-axis direction and travels in a zigzag manner substantially along the Y-axis direction. On the other hand, light propagating inside the light guide plate 15 is repeatedly reflected by being incident on the inclined face 22A1 of the second light guide plate unit lens 22A constituting the second light guide plate lens portion 22 at the opposite plate face 15C side in the Z-axis direction, and travels in a zigzag manner substantially along the Y-axis direction. As a result, the light propagating inside the light guide plate 15 is restricted from spreading in the X-axis direction, and thus, unevenness of darkness and brightness is unlikely to occur between the vicinity of the LED 13 and the surroundings thereof (such as a portion between the LEDs 13) in the X-axis direction.

As illustrated in FIG. 1 and FIG. 2, a light emission reflection portion 23 is provided on the opposite plate face 15C of the light guide plate 15. The light emission reflection portion 23 includes a plurality of unit reflection portions 23A arranged side by side at intervals along the Y-axis direction. The unit reflection portion 23A is provided so as to protrude from the opposite plate face 15C toward the back side along the Z-axis direction, and has a triangle shape in a cross section taken along the Y-axis direction. The unit reflection portion 23A includes a first reflective face 23A1 disposed at the LED 13 side in the Y-axis direction and inclined with respect to the Y-axis direction, and a second reflective face 23A2 disposed at the opposite side and inclined with respect to the Y-axis direction. These reflective faces 23A1 and 23A2 reflect light propagating inside the light guide plate 15 and rise the light toward the front side so as to be at an angle close to the Z-axis direction to promote emission from the light emission plate face 15B. The first reflective face 23A1 mainly functions to reflect and rise light that travels so as to be away from the LED 13 in the Y-axis direction. On the other hand, the second reflective face 23A2 mainly functions to reflect and rise light that travels so as to come close to the LED 13 in the Y-axis direction. The first reflective face 23A1 has a gradient in which a distance from the light emission plate face 15B where the light emission reflection portion 23 is not installed is smaller while getting farther from the LED 13 in the Y-axis direction. The first reflective face 23A1 has an inclination angle of, for example, approximately 8 degrees with respect to the Y-axis direction. The second reflective face 23A2 has a gradient in which a distance from the light emission plate face 15B where the light emission reflection portion 23 is not installed is larger while getting farther from the LED 13 in the Y-axis direction, that is, a gradient opposite to that of the first reflective face 23A1. The second reflective face 23A2 has a steep gradient with an inclination angle of, for example, approximately 80 degrees, which is almost vertical, with respect to the Y-axis direction, and the inclination angle is larger than the inclination angle of the first reflective face 23A1. Further, the plurality of unit reflection portions 23A arranged along the Y-axis direction are designed such that the height dimension (dimension in the Z-axis direction) and the length dimension (dimension in the Y-axis direction) increase while getting farther from the LED 13 in the Y-axis direction. More specifically, when the unit reflection portion 23A positioned close to the LED 13 in the Y-axis direction and the unit reflection portion 23A positioned farther from the LED 13 in the Y-axis direction are compared, the respective areas of the first reflective face 23A1 and the second reflective face 23A2 of the latter are larger than those of the former. As a result, at the side close to the LED 13 in the Y-axis direction, light is difficult to be incident on each of the reflective faces 23A1 and 23A2 of the unit reflection portion 23A and emission of light is suppressed, but at the side farther from the LED 13 in the Y-axis direction, light is easily incident on each of the reflective faces 23A1 and 23A2 of the unit reflection portion 23A, and emission of light is facilitated. As a result, the amount of light emitted from the light emission plate face 15B is made uniform between the LED 13 side and the opposite side in the Y-axis direction.

As illustrated in FIG. 1 and FIG. 2, the opposite plate face 15C of the light guide plate 15 is provided with an inclined face 24 disposed adjacent to the unit reflection portion 23A in the Y-axis direction. A plurality of the inclined faces 24 are repeatedly arranged in an alternating manner with the plurality of unit reflection portions 23A in the Y-axis direction on the opposite plate face 15C. The inclined face 24 is connected to the second reflective face 23A2 of the unit reflection portion 23A adjacent thereto at the LED 13 side in the Y-axis direction, and the first reflective face 23A1 of the unit reflection portion 23A adjacent thereto at the opposite side to the LED 13 side. The inclined face 24 has a gradient in which a distance from the light emission plate face 15B where the light emission reflection portion 23 is not installed is larger while getting farther from the LED 13 in the Y-axis direction. In other words, the inclined face 24 has a gradient similar to that of the second reflective face 23A2 of the unit reflection portion 23A. The inclined face 24 has an inclination angle of, for example, approximately 1.4 degrees with respect to the Y-axis direction, and the inclination angle is smaller than both of the inclination angles of the reflective faces 23A1 and 23A2 of the unit reflection portion 23A. The inclined face 24 having such a configuration reflects light traveling inside the light guide plate 15 so as to move away from the LED 13, and directs the light toward the light emission plate face 15B side, but because the incident angle of the light with respect to the light emission plate face 15B does not exceed the critical angle, the light is totally reflected by the light emission plate face 15B and guided so as to go farther away from the LED 13. Thus, the light emitted from the light emission plate face 15B is less likely to be biased toward the LED 13 side in the Y-axis direction. As described above, the light guide plate 15 is configured such that the inclination angle with respect to the Y-axis direction increases in the order of the inclined face 24, the first reflective face 23A1, and the second reflective face 23A2. Further, the plurality of inclined faces 24 arranged along the Y-axis direction are designed such that the length dimension decreases while getting farther from the LED 13 in the Y-axis direction. This is because the length dimension of the unit reflection portion 23A increases while getting farther from the LED 13 in the Y-axis direction, and the occupancy range of the unit reflection portion 23A increases.

Figure 4:
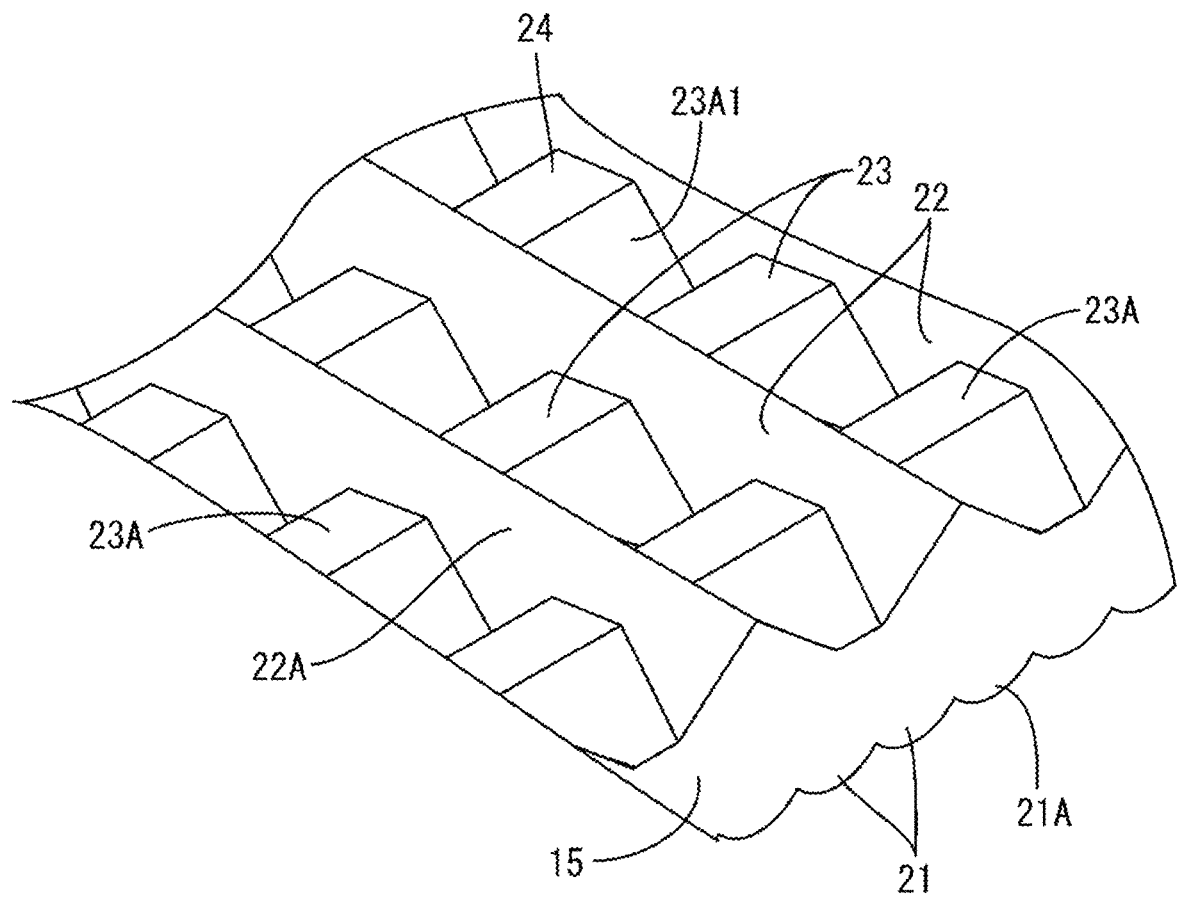
FIG. 4 is a perspective view of a light guide plate constituting the backlight device in a view from an opposite plate face side.
Figure 4:
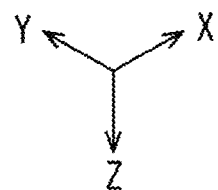
Figure 5:
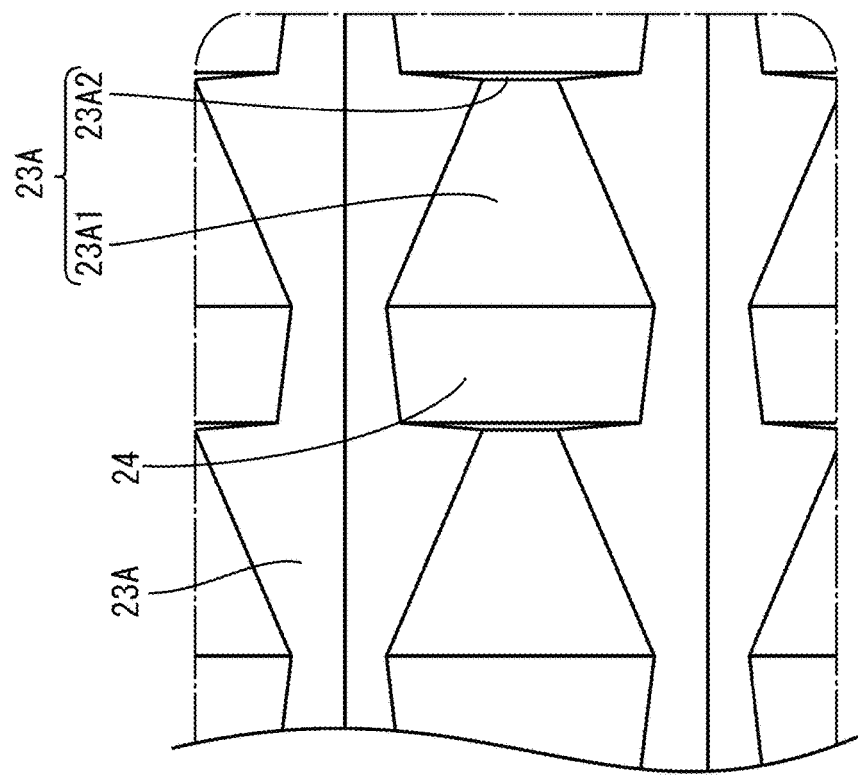
FIG. 5 is a bottom view illustrating a configuration on the opposite plate face of the light guide plate.
Figure 5:
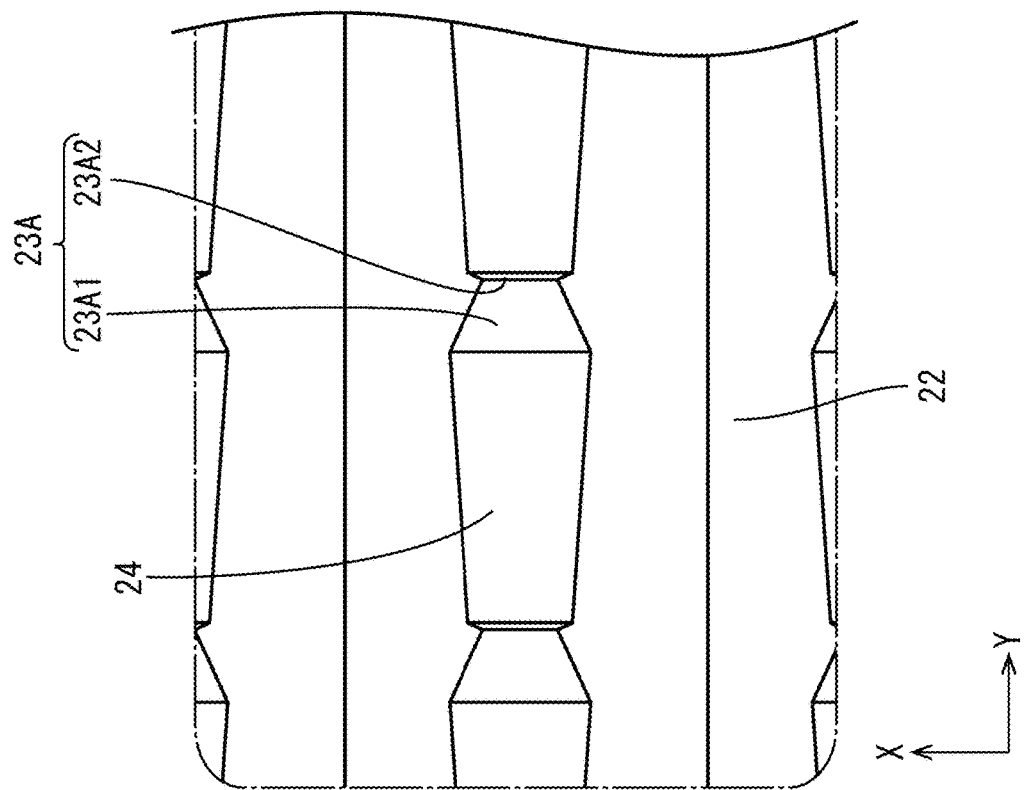

As illustrated in FIG. 3 to FIG. 5, the light emission reflection portion 23 and the inclined face 24 having a configuration as described above are sandwiched and disposed between two second light guide plate unit lenses 22A that are adjacent to each other in the X-axis direction. Accordingly, the light emission reflection portion 23 and the inclined face 24 are repeatedly arranged in an alternating manner with the second light guide plate unit lens 22A in the X-axis direction. In the unit reflection portion 23A configuring the light emission reflection portion 23, the maximum value of the protrusion dimension (height dimension) from the opposite plate face 15C is made smaller than the same protrusion dimension of the second light guide plate unit lens 22A. Thus, even the unit reflection portion 23A positioned at the farthest side from the LED 13 in the Y-axis direction does not protrude farther toward the back side than the second light guide plate unit lens 22A.

The configurations and the like related to the backlight device 12 and the liquid crystal display device 10 described above are substantially identical to those described in JP 2020-119678 A, except that the relationship between the long side and the short side of each of the liquid crystal panel 11, the light guide plate 15, and the optical sheet 17 is reversed and the LED 13 is a side light emitting type. For each experiment (Demonstration Experiment 1 and Comparative Experiments 1 to 6) for validating the advantages of the backlight device 12 and liquid crystal display device 10 (mainly, the actions and effects of the first prism sheet 18 and the second prism sheet 19), the contents disclosed in JP 2020-119678 are incorporated herein for reference.

Figure 6:
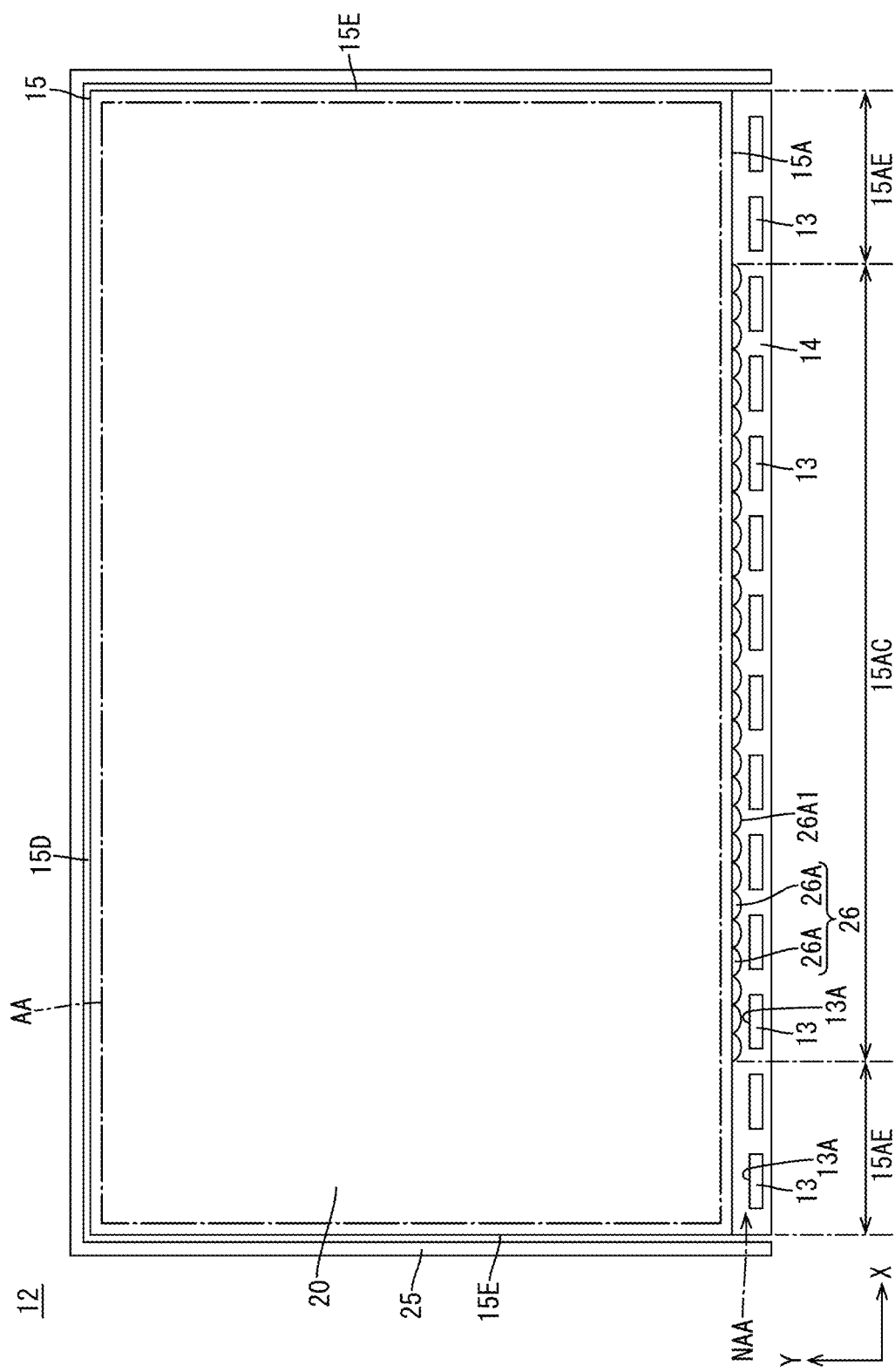
FIG. 6 is a plan view of the backlight device.

As illustrated in FIG. 1 and FIG. 6, the backlight device 12 according to the present embodiment includes a frame (light reflecting member) 25 surrounding the light guide plate 15. The frame 25 is made of synthetic resin (for example, made of polycarbonate) that exhibits white color with excellent light reflectivity on its surface. The frame 25 is configured to have the outer shape thereof obtained by removing one side of a frame body that is slightly larger than the light guide plate 15. Here, in describing the configuration of the frame 25, the configuration of the light guide plate 15 will be described again. An end face at the other long side of the outer peripheral edge face of the light guide plate 15, in other words, an end face at the opposite side to the light entering end face 15A is an opposite end face to the light entering end face 15D. The longitudinal direction of the opposite end face to the light entering end face 15D coincides with the X-axis direction. In addition, end faces provided at sides of a pair of short sides of the outer peripheral edge face of the light guide plate 15 are side end faces 15E. The longitudinal direction of the pair of side end faces 15E coincides with the Y-axis direction, and the pair of side end faces 15E are end faces adjacent to both the light entering end face 15A and the opposite end face to the light entering end face 15D of the outer peripheral edge face of the light guide plate 15. Of the outer peripheral edge face of the light guide plate 15, it can be said that the opposite end face to the light entering end face 15D and the pair of side end faces 15E are non-facing end faces to the LED (non-facing end faces to the light source) that do not face the LEDs 13. The frame 25 does not have a portion, of the outer peripheral edge face of the light guide plate 15, facing the light entering end face 15A, and has a portion facing the opposite end face to the light entering end face 15D and the pair of side end faces 15E (three sides of the non-facing end face to the LED). According to such a configuration, in the case where light leaks out from the opposite end face to the light entering end face 15D and the pair of side end faces 15E of the outer peripheral edge face of the light guide plate 15, the leaked light is diffused (scattered) and reflected by the surface of the frame 25 facing the opposite end face to the light entering end face 15D and the pair of side end faces 15E. The light reflected by the frame 25 is incident again on the opposite end face to the light entering end face 15D of the light guide plate 15 and the pair of side end faces 15E, and then, is emitted from the light emission plate face 15B. Thus, the usage efficiency of light can be improved. In addition, the frame 25 is fixed to another member (such as the liquid crystal panel 11) by using a fixing member such as double-sided tape.

As illustrated in FIG. 1 and FIG. 6, a light refracting portion 26 that imparts a refracting action to incident light is provided on the light entering end face 15A of the light guide plate 15 according to the present embodiment. The light refracting portion 26 is configured of a plurality of unit light refracting portions 26A arranged side by side along the X-axis direction (the alignment direction of the plurality of LEDs 13) on the light entering end face 15A. The unit light refracting portion 26A has an arch shape (substantially semi-circular shape) in a cross section taken along the X-axis direction and the Y-axis direction (the light emission plate face), and is formed in a semi-cylindrical shape extending along the Z-axis direction (the normal direction of the light emission plate face 15B). That is, it can be said that the unit light refracting portion 26A is a convex type cylindrical lens protruding from the light entering end face 15A to the LED 13 side, and the light refracting portion 26 formed from the plurality of unit light refracting portions 26A is a type of so-called lenticular lens. The surface of the unit light refracting portion 26A is a circular arc-shaped face 26A1 having a predetermined radius of curvature. Each of a width dimension (dimension in the X-axis direction) W1 of each of the plurality of unit light refracting portions 26A arranged side by side along the X-axis direction, the maximum protrusion dimension from the light entering end face 15A, and the radius of curvature of the circular arc-shaped face 26A1 is constant, and an arrangement interval P1 of two unit light refracting portions 26A adjacent to each other in the X-axis direction is constant (see FIG. 7). In order to provide the light refracting portion 26 having such a configuration integrally with the light guide plate 15, for example, the light guide plate 15 may be manufactured by injection molding, and a transfer shape for transferring the light refracting portion 26 may be formed in advance on a molding face of a molding die thereof for molding the light entering end face 15A. The light refracting portion 26 having such a configuration can impart a refracting action to light incident on the light entering end face 15A so as to be diffused widely in the X-axis direction by the circular arc-shaped face 26A1 of the unit light refracting portion 26A. The light imparted with the refracting action travels while being diffused widely in the X-axis direction inside the light guide plate 15, compared to light that is not imparted with the refracting action. In this way, since emission from the light emission plate face 15B is promoted near the light entering end face 15A of the light emission plate face 15B of the light guide plate 15, dark portions are likely to occur near the light entering end face 15A of the light emission plate face 15B, and as a result, brightness unevenness is difficult to occur.

However, as illustrated in FIG. 1, in the backlight device 12 according to the present embodiment, the first prism sheet 18, the second prism sheet 19, and the reflective polarizing sheet 20 are included in the optical sheet 17, and the first light guide plate lens portion 21 and the second light guide plate lens portion 22 are respectively provided on the light emission plate face 15B and the opposite plate face 15C of the light guide plate 15, thereby improving the viewing angle characteristics and the front brightness of emission light. The "front brightness" described herein refers to the brightness of emission light when the backlight device 12 is viewed from the normal direction of the light emission plate face 15B of the light guide plate 15. In particular, in the backlight device 12 according to the present embodiment, in order to improve the front brightness of emission light, an optical design is adopted that narrows a range where light emitted from one LED 13 is to be emitted from the light emission plate face 15A of the light guide plate 15. In such an optical design, at the end portions of the light guide plate 15 in the X-axis direction (the end portions having the side end faces 15E), dark portions where the amount of emission light is locally small near the opposite end face to the light entering end face 15D tend to be easily visually recognized, and bright portions where the amount of emission light is locally large near the light entering end face 15A tend to be easily visually recognized. It is presumed that the dark portions occur due to the fact that light from the LEDs 13 positioned at the central side in the X-axis direction is difficult to reach near the opposite end face to the light entering end face 15D at the end portions of the light guide plate 15 in the X-axis direction. It is assumed that the bright portions occur due to the fact that light from the LEDs 13 positioned at the end sides in the X-axis direction is leaked out mainly from the side end faces 15E of the light guide plate 15, the leaked light is diffused (scattered) and reflected by the frame 25, and most of the reflected light is incident again on the vicinity of the light entering end face 15A at the end portions of the light guide plate 15 in the X-axis direction. In detail, it is presumed that the bright portions occur due to the fact that the light being incident again on the light guide plate 15 travels in various directions because the light has been diffused and reflected by the frame 25, and thus, when the light is incident on the respective light guide plate lens portions 21 and 22 and the light emission reflection portion 23 near the light entering end face 15A at the end portions of the light guide plate 15 in the X-axis direction, the light is emitted to the outside without being totally reflected.

Thus, as illustrated in FIG. 1 and FIG. 6, the light refracting portion 26 according to the present embodiment is provided partially on the light entering end face 15A, and the distribution of the light refracting portion 26 on the light entering end face 15A will be described in detail below. First, the light entering end face 15A is divided into a pair of end side portions 15AE positioned at both end sides in the X-axis direction and a central side portion 15AC positioned at the central side and sandwiched between the pair of end side portions 15AE. The light refracting portion 26 is configured such that an occupancy rate occupied by the unit light refracting portions 26A in the pair of end side portions 15AE is made lower than an occupancy rate occupied by the unit light refracting portions 26A in the central side portion 15AC. This "occupancy rate" is a rate obtained by dividing a dimension (area) in the X-axis direction in an arrangement region (formation region) in which the unit light refracting portions 26A are arranged, of the light entering end face 15A of the light guide plate 15, by the sum of dimensions (areas) in the X-axis direction of the above-described arrangement region and a non-arrangement region (non-formation region) in which no unit light refracting portion 26A is arranged. In the present embodiment in which the arrangement interval P1 of the unit light refracting portions 26A is constant, it can also be said that the "occupancy rate" is a rate (W1/P1) obtained by dividing the width dimension W1 of the unit light refracting portion 26A by the arrangement interval P1 of the unit light refracting portions 26A. The case where the occupancy rate is "100%" in percent figures means that because the width dimension W1 of the unit light refracting portion 26A and the arrangement interval P1 of the unit light refracting portions 26A have the same value, the end side portions 15AE and the central side portion 15AC are constituted entirely by the arrangement region of the unit light refracting portions 26A, and no non-arrangement region of the unit light refracting portion 26A is present. The case where the occupancy rate is "0%" in percent figures means that the end side portions 15AE and the central side portion 15AC are constituted entirely by the non-arrangement region of the unit light refracting portion 26A, and no arrangement region of the unit light refracting portion 26A is present. Additionally, the occupancy rate described above can also be said to be distribution density of the unit light refracting portions 26A in the end side portions 15AE and the central side portion 15AC.

As described above, since the light refracting portion 26 is configured such that the occupancy rate occupied by the unit light refracting portions 26A in the pair of end side portions 15AE of the light entering end face 15A is lower than the occupancy rate occupied by the unit light refracting portions 26A in the central side portion 15AC, in the pair of end side portions 15AE, the amount of light that is imparted with a refracting action by the light refracting portion 26 is reduced in comparison with the central side portion 15AC, and the degree of diffusion of incident light is decreased. Thus, as compared to incident light on the central side portion 15AC, incident light on the end side portions 15AE of the light entering end face 15A has a narrow range of an angle at which the incident light travels inside the light guide plate 15, so light incident on the end side portions 15AE of the light entering end face 15A from the LEDs 13 positioned at the end side in the X-axis direction is difficult to leak from the side end faces 15E of the light guide plate 15 to the outside, and is easy to reach near the opposite end face to the light entering end face 15D at the end portions (end portions having the side end faces 15E) of the light guide plate 15 in the X-axis direction. When leaked light from the side end face 15E of the light guide plate 15 decreases, the amount of light reflected by the frame 25 also decreases, the amount of light that is incident again on the light guide plate 15 also decreases, and as a result, the amount of light being incident on the light guide plate lens portions 21 and 22 and the light emission reflection portion 23 near the light entering end face 15A at the end portions of the light guide plate 15 in the X-axis direction to be emitted to the outside after being incident again on the light guide plate 15 also decreases. This makes it difficult for the bright portions to be visually recognized near the light entering end face 15A at the end portions of the light guide plate 15 in the X-axis direction. On the other hand, even when light incident on the central side portion 15AC of the light entering end face 15A is difficult to reach near the opposite end face to the light entering end face 15D at the end portions of the light guide plate 15 in the X-axis direction, light incident on the end side portions 15AE is easy to reach thereto, so the dark portions are less likely to be visually recognized. In this way, bright portions and dark portions are less likely to occur at the end portions of the light guide plate 15 in the X-axis direction, and as a result, brightness unevenness is less likely to occur over the whole emission light emitted from the light emission plate face 15B.

Figure 7:
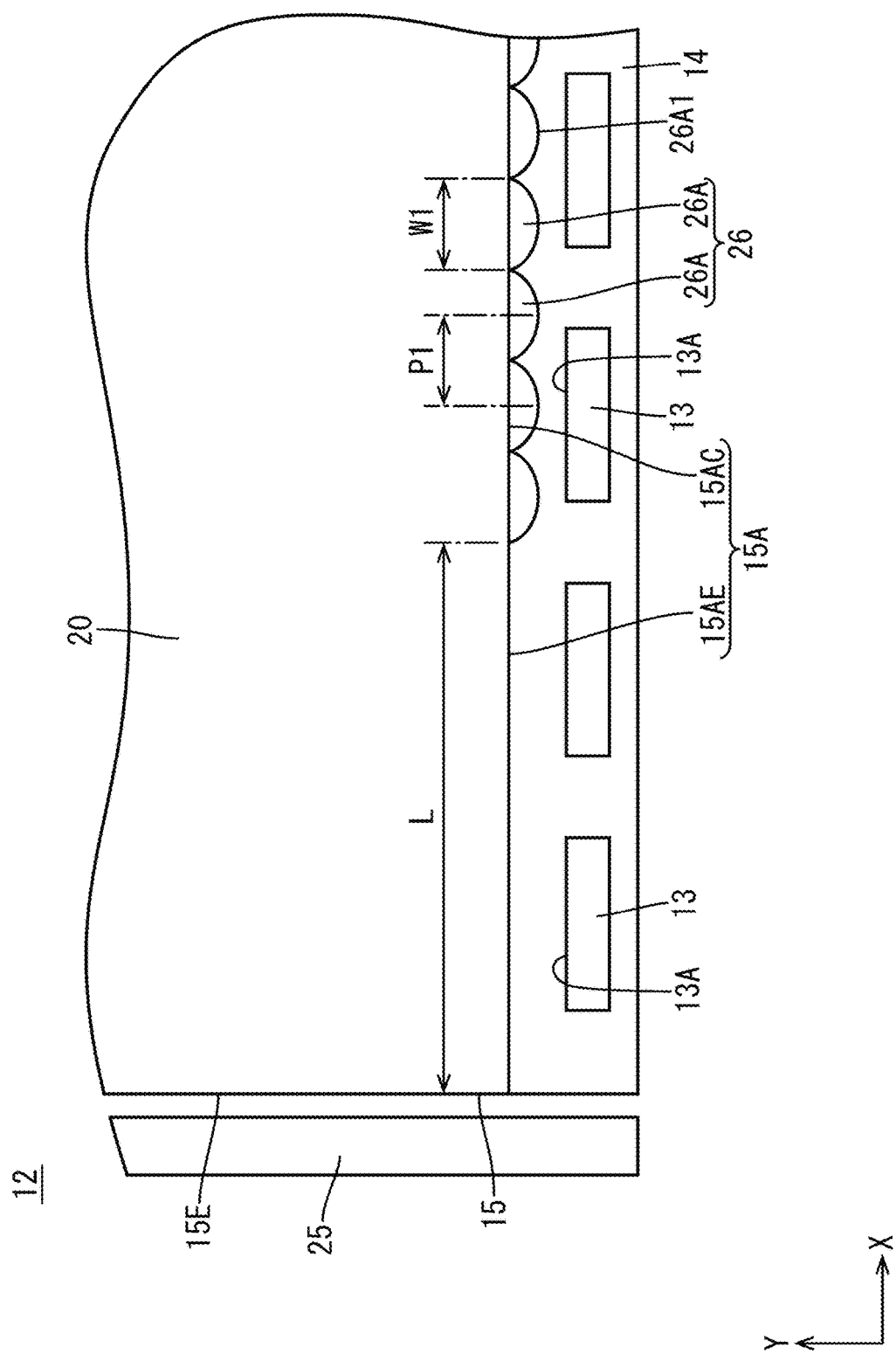
FIG. 7 is a plan view of the backlight device in which the vicinity of a corner portion of the light guide plate at a light entering end face side is enlarged.

Specifically, as illustrated in FIG. 7, the light refracting portion 26 is configured such that the occupancy rate occupied by the unit light refracting portions 26A in the central side portion 15AC of the light entering end face 15A is 100% in percent figures, while both of the occupancy rates occupied by the unit light refracting portions 26A in the pair of end side portions 15AE of the light entering end face 15A are equally 0% in percent figures. The central side portion 15AC of the light entering end face 15A is provided with the light refracting portion 26 such that the width dimension W1 of the unit light refracting portion 26A and the arrangement interval P1 of the unit light refracting portions 26A have the same value. The central side portion 15AC is, over the entire region, the arrangement region in which the unit light refracting portions 26A are arranged, and does not include a non-arrangement region in which no unit light refracting portion 26A is arranged. That is, the central side portion 15AC is constituted by a curved face (circular arc-shaped face 26A1) over the entire portion, and no flat face exists therein. The light refracting portion 26 is not provided in the pair of end side portions 15AE of the light entering end face 15A. The pair of end side portions 15AE are, over the entire regions, the non-arrangement regions in which no unit light refracting portion 26A is arranged, and do not include an arrangement region in which the unit light refracting portion 26A is arranged. That is, the pair of end side portions 15AE is constituted by a substantially flat face over the entire regions, and no curved face exists therein. According to such a configuration, most of light incident on the central side portion 15AC of the light entering end face 15A is imparted with a refracting action by the light refracting portion 26 (unit light refracting portions 26A), while light incident on the end side portions 15AE of the light entering end face 15A is not imparted with a refracting action by the light refracting portion 26. Thus, as compared to the incident light on the central side portion 15AC, the incident light on the end side portions 15AE has a narrow range of an angle at which the incident light travels inside the light guide plate 15, so the incident light is difficult to leak from the side end face 15E of the light guide plate 15 to the outside, and is easy to reach near the opposite end face to the light entering end face 15D at the end portions of the light guide plate 15 in the X-axis direction. As described above, bright portions are difficult to be visually recognized near the light entering end face 15A at the end portions of the light guide plate 15 in the X-axis direction, and dark portions are difficult to be visually recognized near the opposite end face to the light entering end face 15D at the same end portions.

As illustrated in FIG. 7, the light refracting portion 26 is configured such that a length L in the X-axis direction of each of the pair of end side portions 15AE is within a range being greater than 4.5 mm and less than 15.9 mm. In this way, when the length L in the X-axis direction of the end side portions 15AE is made less than 15.9 mm, an excessive reduction in the amount of light that leaks from the side end faces 15E of the light guide plate 15 to the outside after being incident on the end side portions 15AE of the light entering end face 15A from the LEDs 13 positioned at the end sides in the X-axis direction is suppressed, and light imparted with a diffusing action by the light refracting portion 26 in the central side portion 15AC of the light entering end face 15A easy reaches to the end portions of the light guide plate 15 in the X-axis direction. As a result, it is possible to suppress an excessive reduction in the brightness of emission light near the light entering end face 15A at the end portions of the light guide plate 15 in the X-axis direction. On the other hand, when the length L in the X-axis direction of the end side portion 15AE is larger than 4.5 mm, because an effect of lowering the occupancy rate occupied by the unit light refracting portions 26A to 0% in the end side portions 15AE can be sufficiently obtained, dark portions are less likely to be visually recognized near the opposite end face to the light entering end face 15D at the end portions of the light guide plate 15 in the X-axis direction, and bright portions are less likely to be visually recognized near the light entering end face 15A. When the lower limit value (4.5 mm) and the upper limit value (15.9 mm) within the numerical value range of the length L described above are expressed as the rates with respect to the dimension of the light entering end face 15A in the longitudinal direction (dimension of the light guide plate 15 in the X-axis direction), the rate of the lower limit value is approximately 0.02 (2%), and the rate of the upper limit value is approximately 0.06 (6%). Similarly, when the lower limit value (4.5 mm) and the upper limit value (15.9 mm) within the numerical value range of the length L described above are expressed as rates with respect to the width dimension of the LED 13, the rate of the lower limit value is approximately 1.5 (150%), and the rate of the upper limit value is approximately 5.3 (530%).

More preferably, as illustrated in FIG. 7, the light refracting portion 26 is configured such that the length L in the X-axis direction of the pair of end side portions 15AE is within a range being equal to or greater than 8.3 mm and equal to or less than 12.1 mm. In this way, when the length L in the X-axis direction of the end side portions 15AE is made equal to or less than 12.1 mm, an excessive reduction in the amount of light that leaks from the side end face 15E of the light guide plate 15 to the outside after being incident on the end side portions 15AE of the light entering end face 15A from the LEDs 13 positioned at the end sides in the X-axis direction is suitably avoided, and light imparted with a diffusing action by the light refracting portion 26 in the central side portion 15AC of the light entering end face 15A easily reaches to the end portions of the light guide plate 15 in the X-axis direction. Thus, it is possible to suitably avoid the excessive reduction in the brightness of the emission light near the light entering end face 15A at the end portions of the light guide plate 15 in the X-axis direction. On the other hand, when the length L in the X-axis direction of the end side portions 15AE is larger than 8.3 mm, because an effect of lowering the occupancy rate occupied by the unit light refracting portions 26A to 0% in the end side portions 15AE is further obtained, dark portions are less likely to be visually recognized near the opposite end face to the light entering end face 15D at the end portions of the light guide plate 15 in the X-axis direction, and bright portions are less likely to be visually recognized near the light entering end face 15A. When the lower limit value (8.3 mm) and the upper limit value (12.1 mm) within the preferable numerical value range of the length L described above are expressed as rates with respect to the dimension of the light entering end face 15A in the longitudinal direction (dimension of the light guide plate 15 in the X-axis direction), the rate of the lower limit value is approximately 0.03 (3%), and the rate of the upper limit value is approximately 0.04 (4%). Similarly, when the lower limit value (8.3 mm) and the upper limit value (12.1 mm) within the preferable numerical range of the length L described above are expressed as rates with respect to the width dimension of the LED 13, the rate of the lower limit value is approximately 2.8 (280%), and the rate of the upper limit value is approximately 4 (400%).

Next, in order to validate the advantages of the backlight device 12 and the liquid crystal display device 10 according to the present embodiment, the following Comparative Experiment 1 was performed. A purpose of Comparative Experiment 1 is to obtain knowledge related to a change in brightness distribution related to emission light of the backlight device 12 in the case where the length L in the X-axis direction of the end side portions 15AE of the light entering end face 15A is changed. In Comparative Experiment 1, examples in which the backlight device 12 having the configuration described in the paragraphs prior to those of Comparative Experiment 1 was used, and in which the length L in the X-axis direction of each end side portion 15AE of the light entering end face 15A of the light guide plate 15 was changed, are referred to as Examples 1 to 4 (see FIG. 7), and a comparative example using the backlight device 12 having the same configuration as that of Examples 1 to 4, except for using the light guide plate 15 in which the entire light entering end face 15A was the arrangement region where the unit light refracting portions 26A were arranged, is referred to as Comparative Example 1. In Example 1, the length L in the X-axis direction of each end side portion 15AE of the light entering end face 15A is set to 4.5 mm. In Example 2, the length L in the X-axis direction of each end side portion 15AE of the light entering end face 15A is set to 8.3 mm. In Example 3, the length L in the X-axis direction of each end side portion 15AE of the light entering end face 15A is set to 12.1 mm. In Example 4, the length L in the X-axis direction of each end side portion 15AE of the light entering end face 15A is set to 15.9 mm. In Examples 1 to 4, the light refracting portion 26 is provided in the central side portion 15AC of the light entering end face 15A such that the width dimension W1 of the unit light refracting portion 26A and the arrangement interval P1 of the unit light refracting portions 26A have the same value. In Comparative Example 1, the light refracting portion 26 is provided in the entire region of the light entering end face 15A such that the width dimension W1 of the unit light refracting portion 26A and the arrangement interval P1 of the unit light refracting portions 26A have the same value, and the occupancy rate is set to 100% in percent figures over the entire region.

Figure 8:
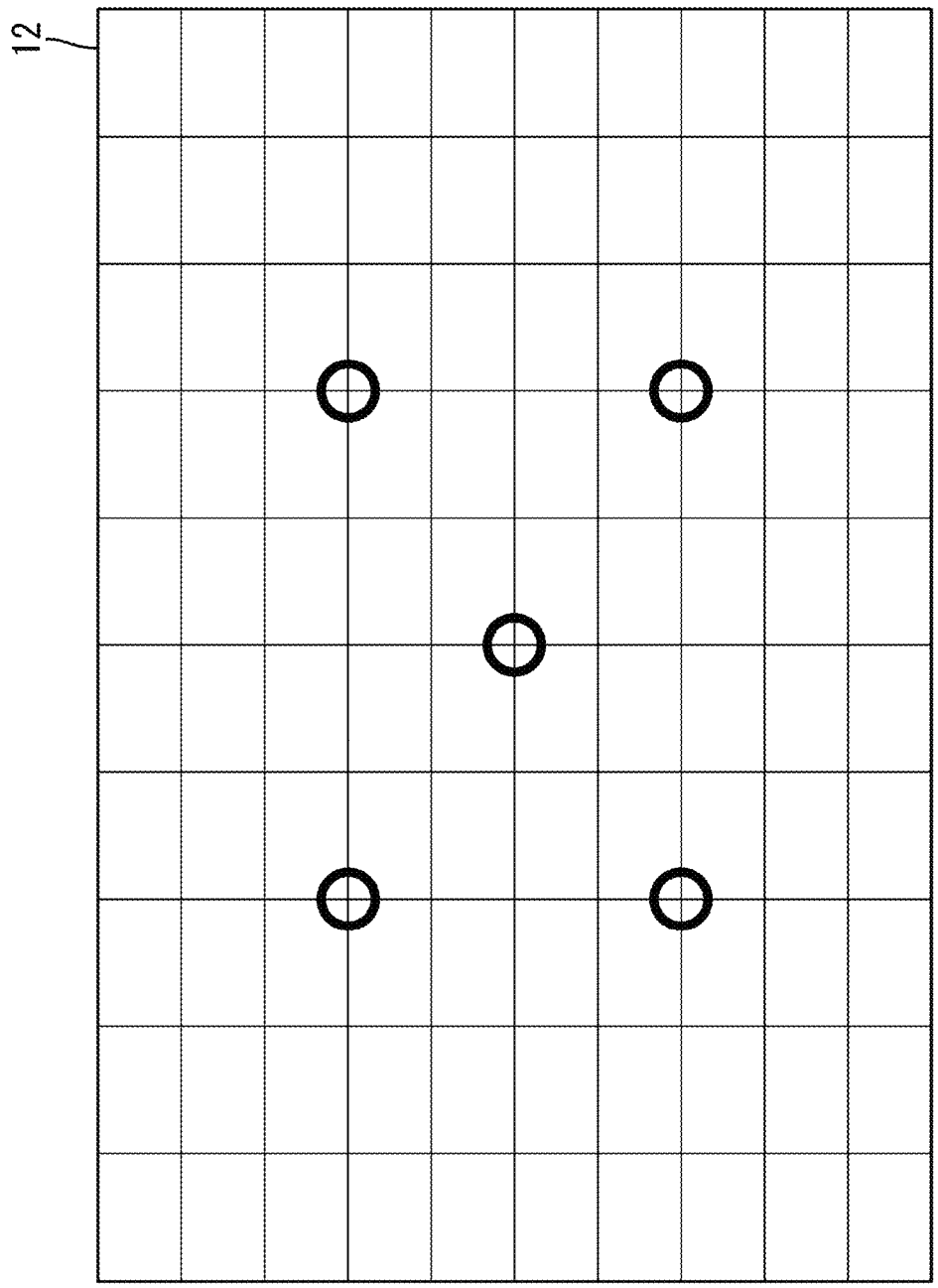
FIG. 8 is a diagram illustrating measurement positions of brightness when the backlight device is viewed from the front.

Then, in Comparative Experiment 1, brightness related to emission light was measured in a state where all the LEDs 13 were turned on in each backlight device 12 according to Comparative Example 1 and Examples 1 to 4 to calculate relative average brightness, a diagram was produced in which brightness distribution was represented by shading, and a graph related to the brightness distribution in the Y-axis direction was produced. The relative average brightness will be described with reference to FIG. 8. FIG. 8 is a diagram illustrating measurement positions of brightness when the backlight device 12 is viewed from the front. First, the average brightness is calculated by averaging the brightness values measured at the positions of the five circles illustrated in FIG. 8 in each backlight device 12 according to Comparative Example 1 and Examples 1 to 4. A relative value with the average brightness of Comparative Example 1 among those kinds of average brightness used as a reference is the relative average brightness. Note that the five measurement positions of brightness are a center position of the backlight device 12, and positions on four radial line segments connecting the center position and four corner positions.

Figure 9:
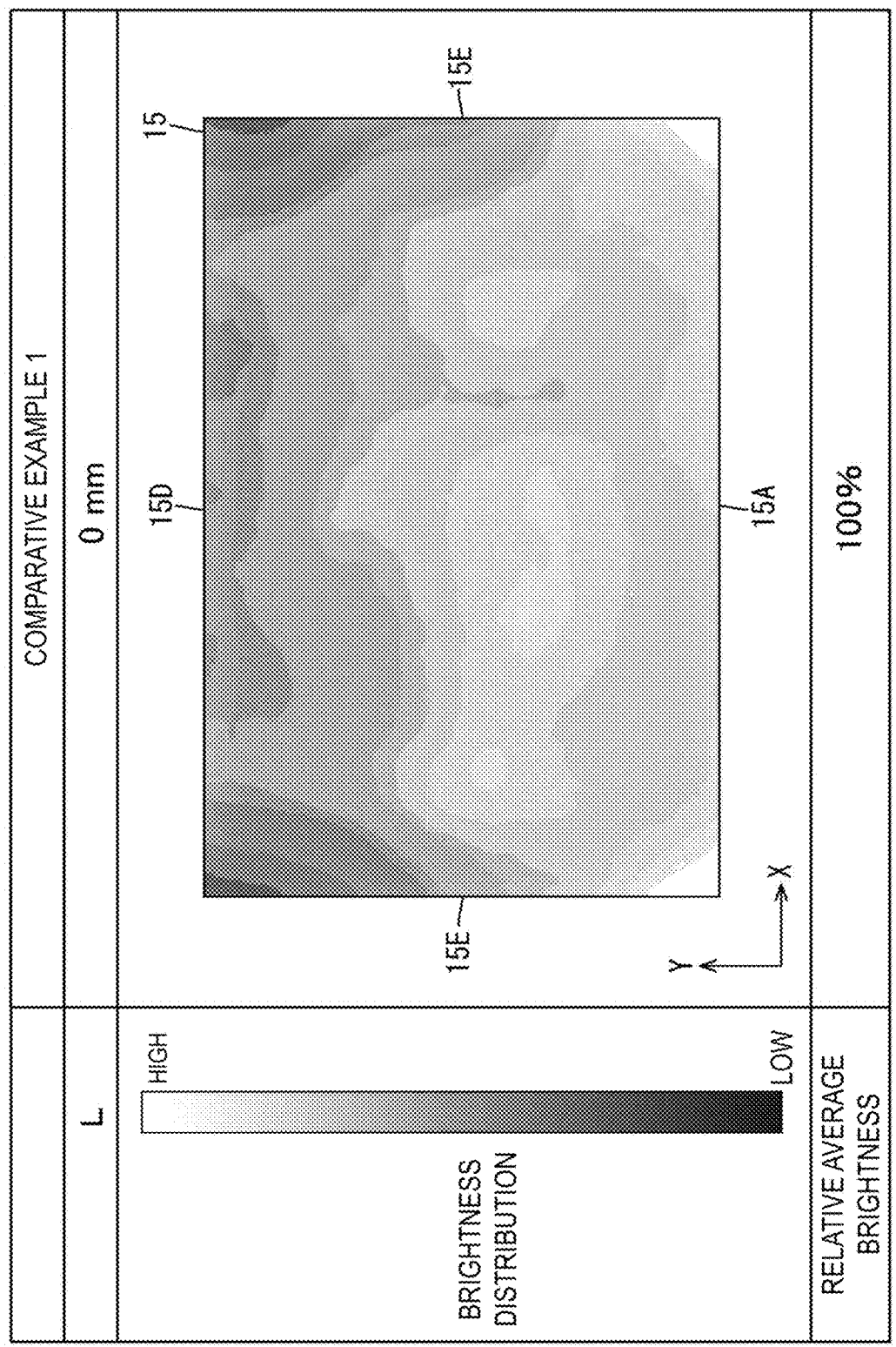
FIG. 9 is a table showing brightness distribution of Comparative Example 1 of Comparative Experiment 1.
Figure 10:
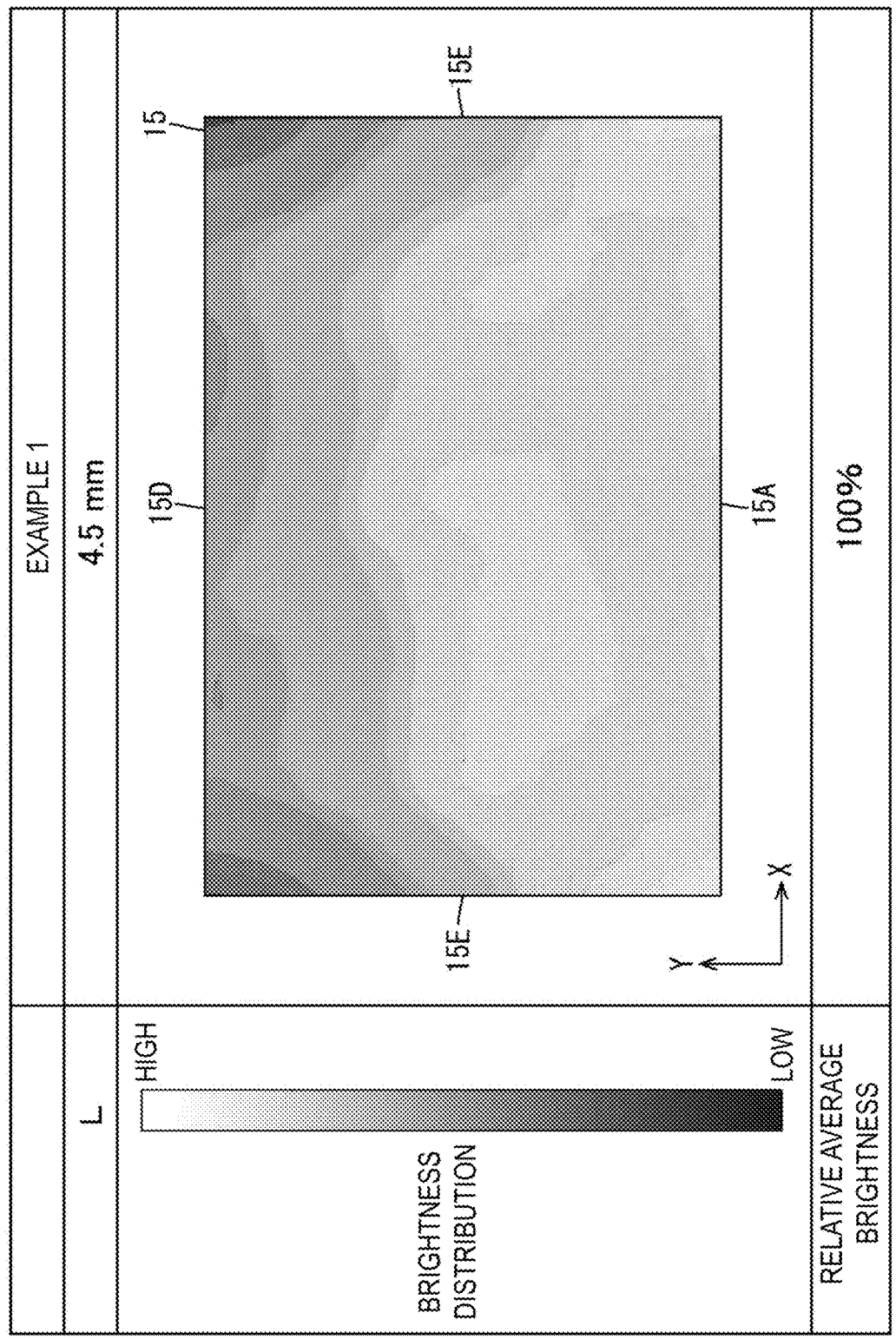
FIG. 10 is a table showing brightness distribution of Example 1 of Comparative Experiment 1.
Figure 11:
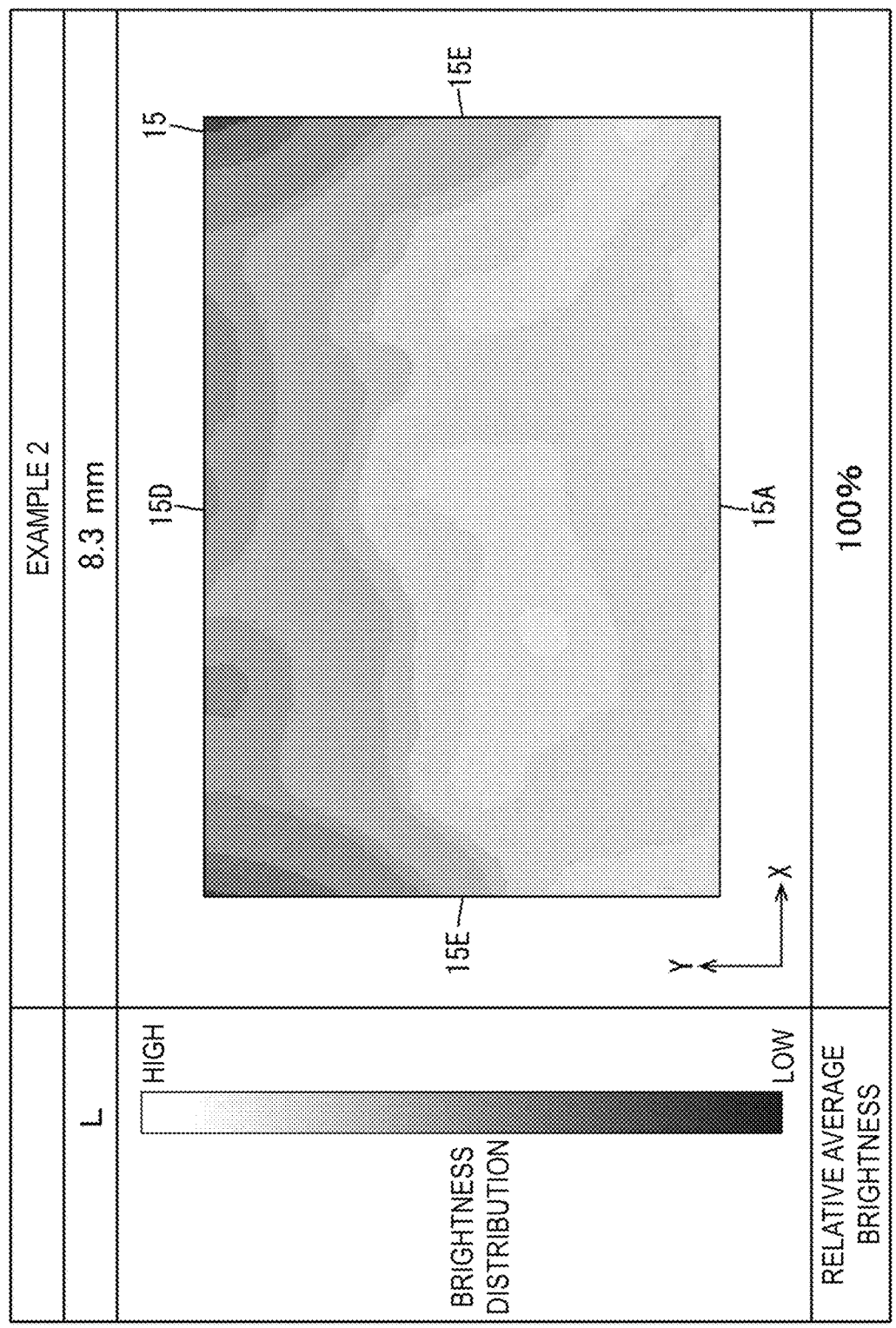
FIG. 11 is a table showing brightness distribution of Example 2 of Comparative Experiment 1.
Figure 12:
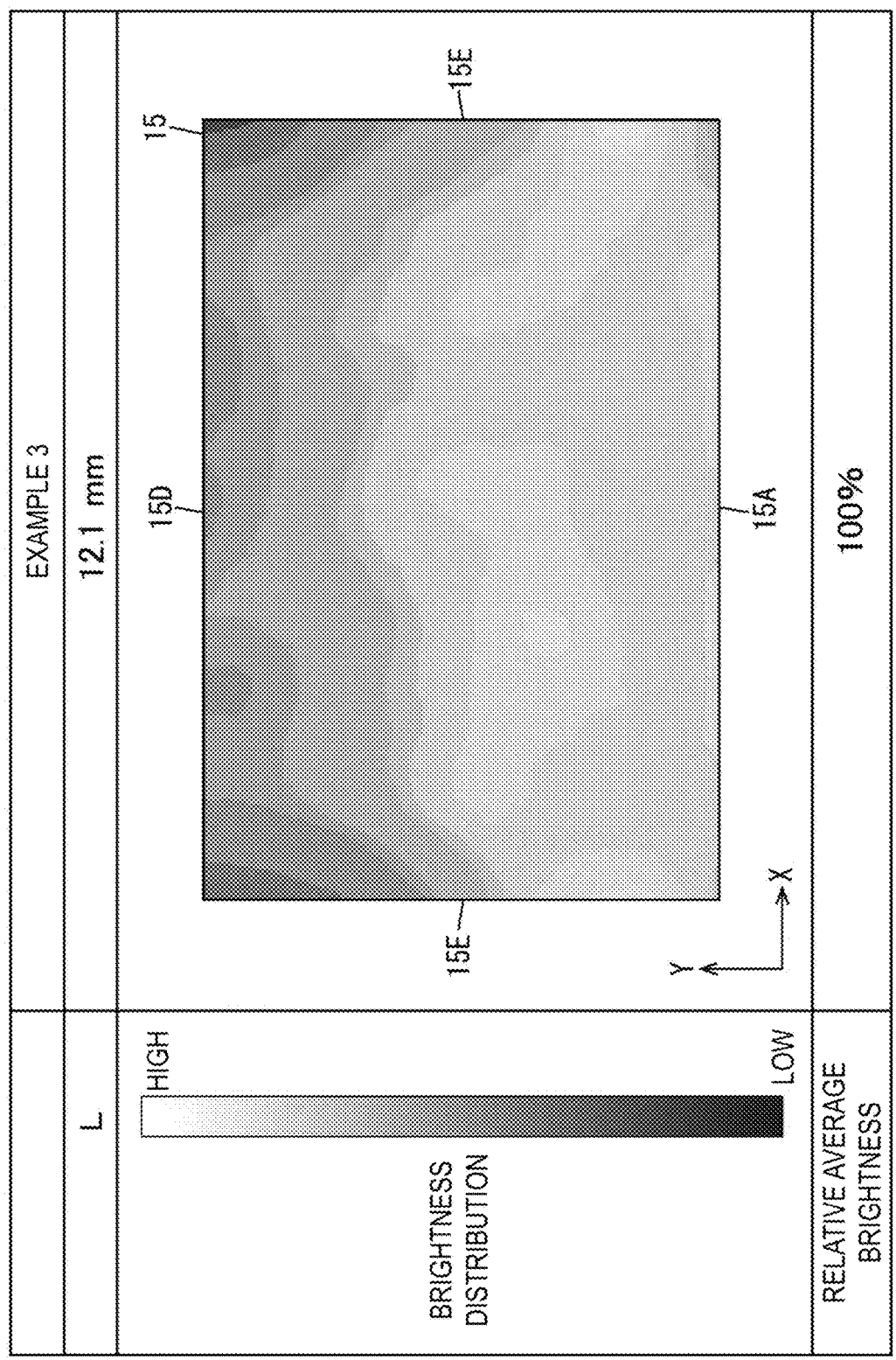
FIG. 12 is a table showing brightness distribution of Example 3 of Comparative Experiment 1.
Figure 13:
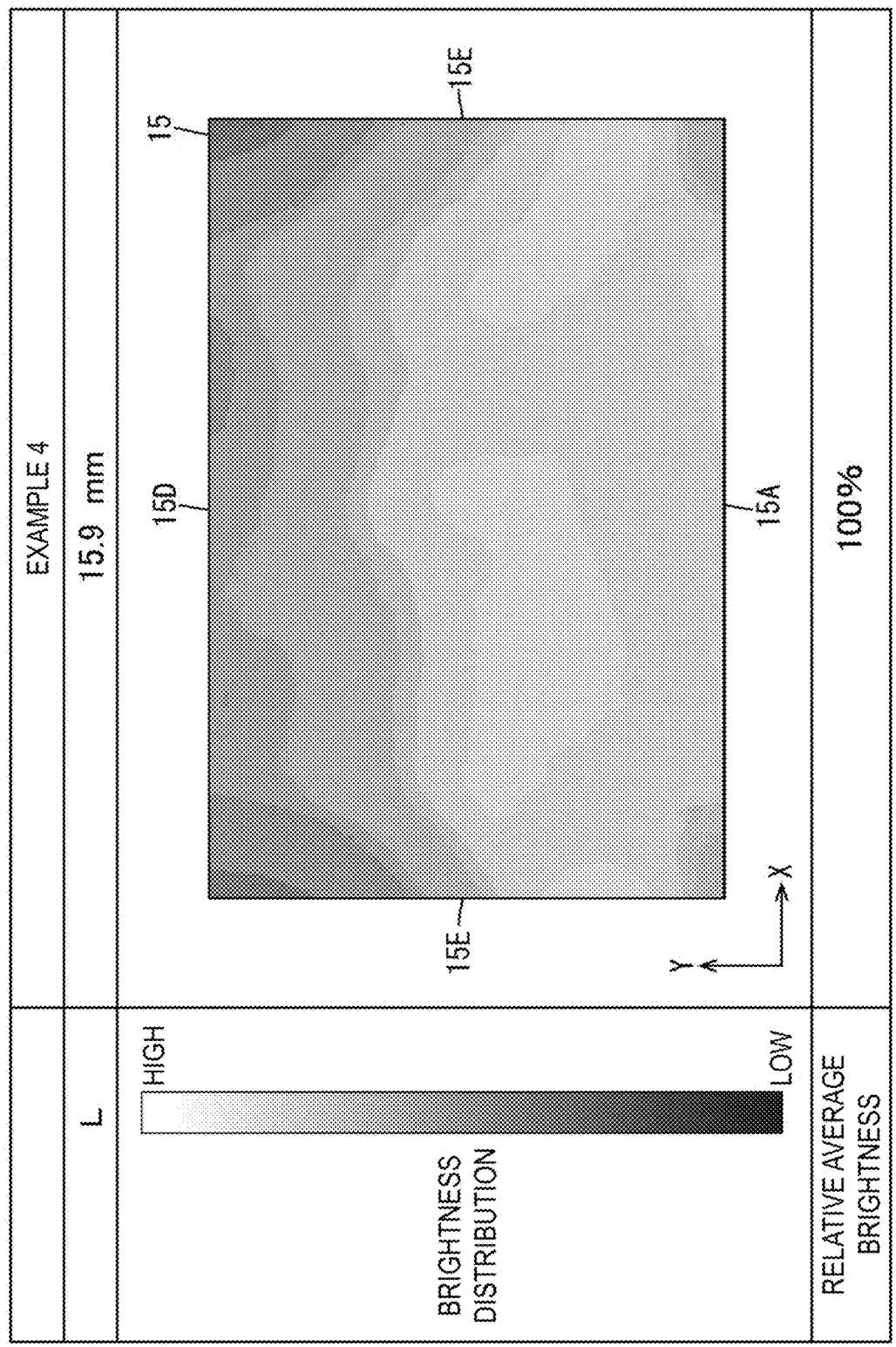
FIG. 13 is a table showing brightness distribution of Example 4 of Comparative Experiment 1.
Figure 14:
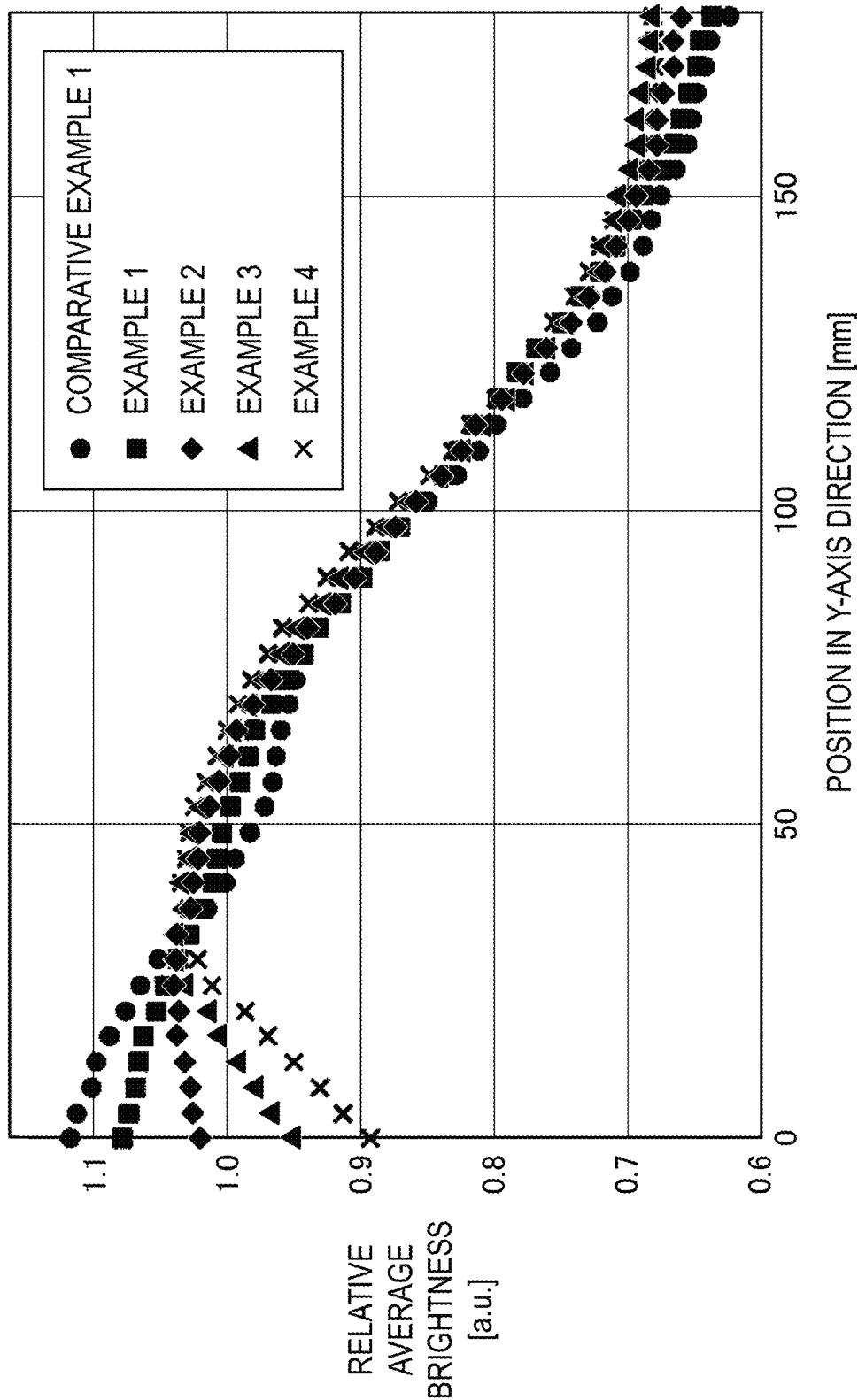
FIG. 14 is a graph related to brightness distribution in the Y-axis direction of Comparative Example 1 and Examples 1 to 4 of Comparative Experiment 1.

Experimental results of Comparative Experiment 1 are as illustrated in FIG. 9 to FIG. 14. FIG. 9 is a table showing the brightness distribution of Comparative Example 1, FIG. 10 is a table showing the brightness distribution of Example 1, FIG. 11 is a table showing the brightness distribution of Example 2, and FIG. 12 is a table showing the brightness distribution of Example 3, FIG. 13 is a table showing the brightness distribution of Example 4, and FIG. 14 is a graph related to the brightness distribution in the Y-axis direction in Comparative Example 1 and Example 1 to Example 4. In the diagram related to the brightness distribution illustrated in each of FIG. 9 to FIG. 13, the LEDs 13 are arranged on the long side portion at the lower side. For reference, in the diagram related to the brightness distribution described in each of FIG. 9 to FIG. 13, respective reference signs of the light entering end face 15A, the opposite end face to the light entering end face 15D, and the side end face 15E are denoted. In the diagram related to the brightness distribution illustrated in each of FIG. 9 to FIG. 13, the level of brightness is represented by shading, and there is a tendency that the higher the brightness is, the lighter the color is, and the lower the brightness is, the darker the color is. The values of relative average brightness in percentages are described in FIG. 9 to FIG. 13. FIG. 14 is a graph related to the brightness distribution in the Y-axis direction in each of Comparative Example 1 and Example 1 to Example 4 illustrated in FIG. 9 to FIG. 13 at the position represented by the A-A line (near the end portion having the side end face 15E at the left side).

The vertical axis of the graph illustrated in FIG. 14 represents relative brightness (no unit) obtained by dividing the measured brightness by the relative average brightness of Comparative Example 1. The fact that a numerical value on the vertical axis of the graph illustrated in FIG. 14 is 1.0 means that the measured brightness is equal to the relative average brightness of Comparative Example 1. The horizontal axis of the graph illustrated in FIG. 14 represents a position with the position of the light entering end face 15A in the Y-axis direction used as a reference (0 mm), and its unit is "mm". A position of the opposite end face to the light entering end face 15D on the horizontal axis of the graph illustrated in FIG. 14 is a position of approximately 180 mm.

Experimental results of Comparative Experiment 1 will be described. According to the brightness distribution in FIG. 9, in Comparative Example 1, it can be seen that at both end portions in the X-axis direction, bright portions having extremely high brightness occur at both corner portions at the light entering end face 15A side in the Y-axis direction, and dark portions having extremely low brightness occur at both corner portions at the opposite end face to the light entering end face 15D side in the Y-axis direction. According to the graph in FIG. 14, in Comparative Example 1, the relative brightness is approximately 1.1 near the light entering end face 15A (within a range from 0 mm to 20 mm), while the relative brightness is approximately from 0.6 to 0.7 near the opposite end face to the light entering end face 15D (within a range from 150 mm to 180 mm). Compared to Comparative Example 1, according to the brightness distribution in FIG. 10 to FIG. 13, in Examples 1 to 4, it can be seen that bright portions having extremely high brightness are not generated at both end portions in the X-axis direction, and at both corner portions at the light entering end face 15A side in the Y-axis direction. Additionally, in Examples 1 to 4, it can be seen that dark portions having extremely low brightness are not generated at both end portions in the X-axis direction, and at both corner portions at the opposite end face to the light entering end face 15D side in the Y-axis direction. According to the graph in FIG. 14, in all of Examples 1 to 4, the relative brightness is lower than 1.1 near the light entering end face 15A (within a range from 0 mm to 20 mm), whereas the relative brightness is higher than that in Comparative Example 1 near the opposite end face to the light entering end face 15D (within a range from 150 mm to 180 mm). In addition, in all of Examples 1 to 4, the relative average brightness is 100%, which is substantially the same as Comparative Example 1. As a result, it can be said that in Examples 1 to 4, bright portions and dark portions that may occur at both end portions in the X-axis direction are less likely to occur while the average brightness equivalent to that of Comparative Example 1 is ensured.

Figure 15:
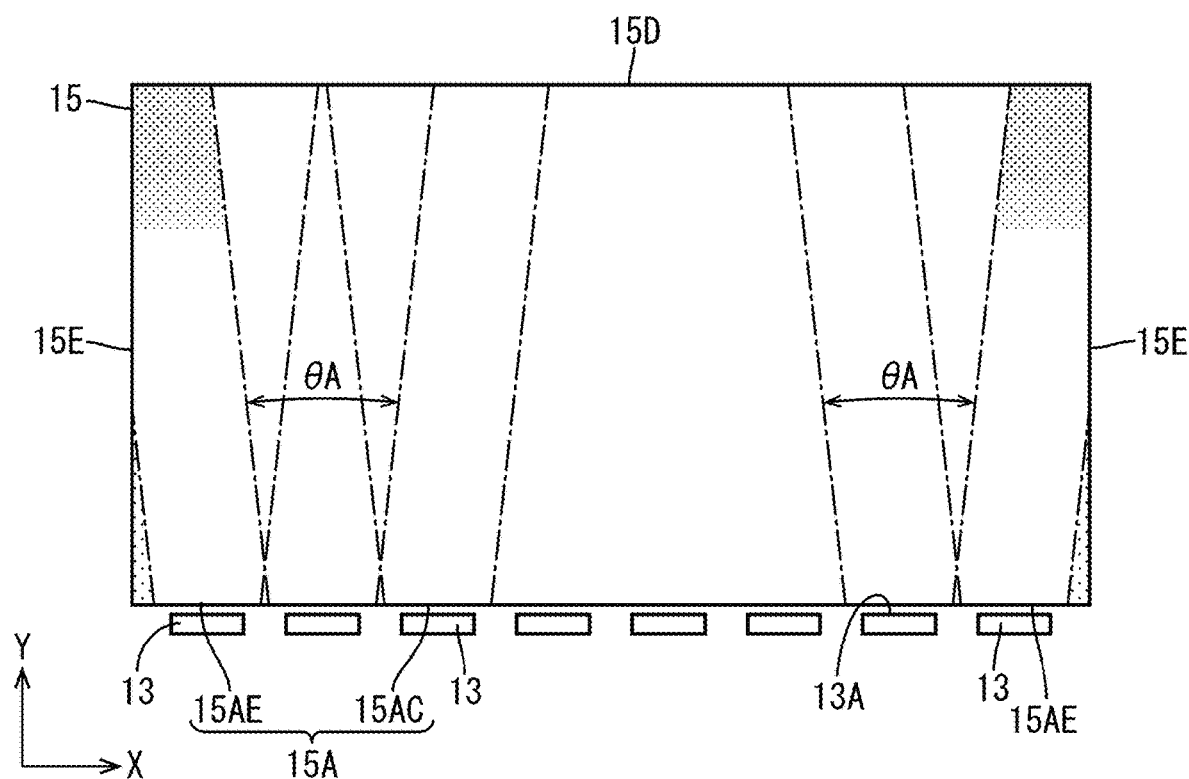
FIG. 15 is a diagram conceptually illustrating a range in which light emitted from each of a plurality of LEDs is emitted from a light emission plate face of a light guide plate in Comparative Example 1 of Comparative Experiment 1.
Figure 16:
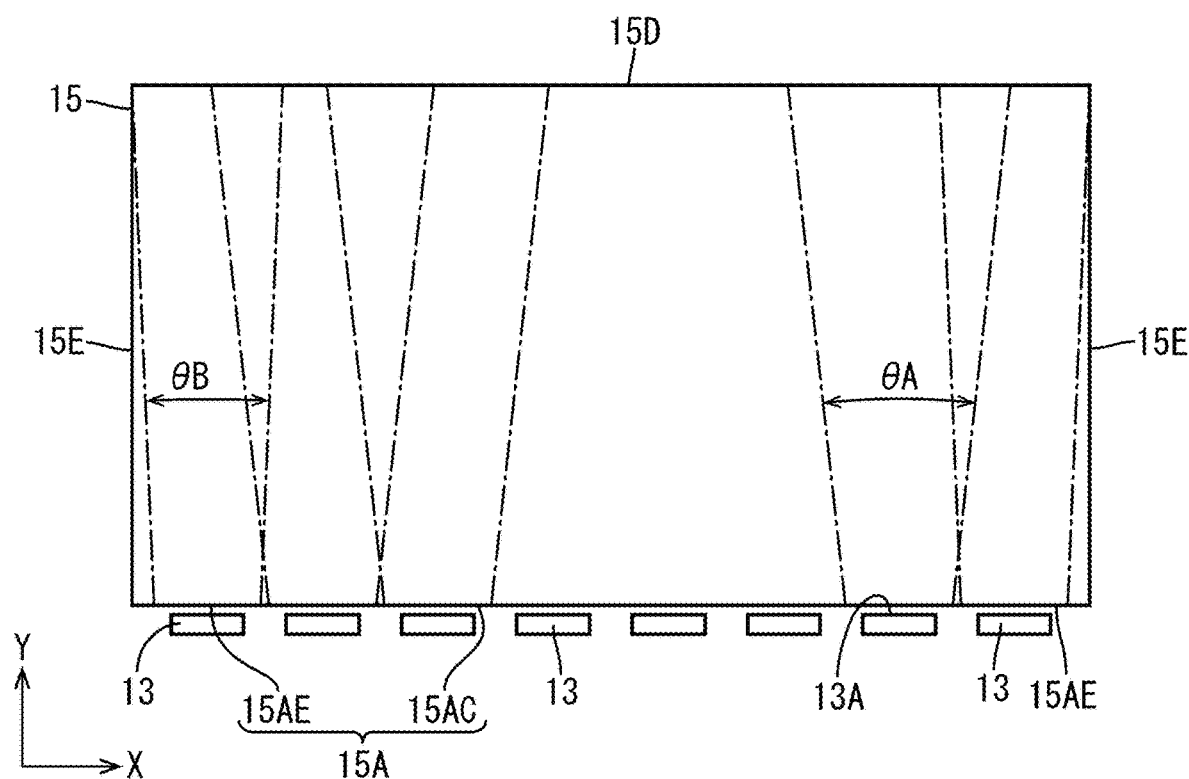
FIG. 16 is a diagram conceptually illustrating a range in which light emitted from each of the plurality of LEDs is emitted from a light emission plate face of a light guide plate in Examples 1 to 4 of Comparative Experiment 1.

Such experimental results will be described by using FIG. 15 and FIG. 16. As for Comparative Example 1, FIG. 15 is a diagram conceptually illustrating a range in which light emitted from each LED 13 is emitted from the light emission plate face 15B of the light guide plate 15. As for Examples 1 to 4, FIG. 16 is a diagram conceptually illustrating a range in which light emitted from each LED 13 is emitted from the light emission plate face 15B of the light guide plate 15. Note that in FIG. 15 and FIG. 16, illustration of the light refracting portion 26 and the like is omitted. In Comparative Example 1, since the occupancy rate occupied by the unit light refracting portions 26A is constant over the entire light entering end face 15A, the range within which light emitted from each LED 13 is emitted from the light emission plate face 15B of the light guide plate 15 is approximated by an angle range AA, as illustrated in FIG. 15. Thus, in Comparative Example 1, it is assumed that some of the light emitted from the respective LEDs 13 positioned at both ends in the X-axis direction is incident on the side end faces 15E of the light guide plate 15 and directly leaks from the light guide plate 15 to the outside, and is diffused and reflected by the frame 25 to be emitted from the vicinity of the light entering end face 15A to the outside at the front side, which leads to the occurrence of bright portions having an extremely large amount of emission light. Furthermore, in Comparative Example 1, it is presumed that light emitted from each LED 13 (each LED 13 positioned other than both ends) in the central side in the X-axis direction is almost not emitted from both end portions in the X-axis direction of the light emission plate face 15B of the light guide plate 15, and thus, the amount of emission light is significantly decreased near the opposite end face to the light entering end face 15D at both end portions in the X-axis direction, which leads to the occurrence of dark portions. Note that, in FIG. 15, the bright portions and the dark portions are illustrated by different hatchings. In contrast, in Examples 1 to 4, since the end side portions 15AE of the light entering end face 15A have a lower occupancy rate occupied by the unit light refracting portions 26A than that of the central side portion 15AC, as illustrated in FIG. 16, the range in which light emitted from each LED 13 positioned at the end sides and facing each of the end side portions 15AE is emitted from the light emission plate face 15B of the light guide plate 15 is approximated by an angle range θB that is narrower than the angle range θA described above. Thus, the light emitted from the respective LEDs 13 positioned at both ends in the X-axis direction is hardly incident on the side end faces 15E of the light guide plate 15, and is unlikely to leak from the side end faces 15E to the outside. As a result, it is presumed that bright portions having an extremely large amount of emission light are unlikely to occur near the light entering end face 15A at both end portions in the X-axis direction of the light emission plate face 15B. In addition, the light emitted from each LED 13 positioned at both ends in the X-axis direction has the narrow angle range θB within which the light is emitted from the light emission plate face 15B, thereby increasing the amount of emission light per unit area, and easily reaching near the opposite end face to the light entering end face 15D at both end portions of the light emission plate face 15B in the X-axis direction. As a result, it is presumed that dark portions having an extremely small amount of emission light are unlikely to occur near the opposite end face to the light entering end face 15D at both end portions in the X-axis direction of the light emission plate face 15B.

Next, Examples 1 to 4 will be compared and considered. According to the brightness distribution in FIG. 10 and FIG. 11, compared to Example 1, Example 2 shows that at both end portions of the light guide plate 15 in the X-axis direction, dark portions are less likely to be visually recognized near the opposite end face to the light entering end face 15D, and bright portions are less likely to be visually recognized near the light entering end face 15A. According to the graph in FIG. 14, Example 1 has a relative brightness being greater than 1.05 near the light entering end face 15A (within the range from 0 mm to 20 mm), while Example 2 has a relative brightness being less than 1.05 near the light entering end face 15A. Further, in Example 2, compared to Example 1, the relative brightness is high near the opposite end face to the light entering end face 15D (within the range from 150 mm to 180 mm). This is assumed to be because when the length L in the X-axis direction of the end side portions 15AE is made larger than 4.5 mm, the effect of lowering the occupancy rate occupied by the unit light refracting portions 26A to 0% in the end side portions 15AE is sufficiently obtained, compared to a case where the length L of the end side portions 15AE is equal to or less than 4.5 mm.

According to the brightness distribution of FIG. 12 and FIG. 13, it can be seen that, compared to Example 4, Example 3 has equivalent brightness near the opposite end face to the light entering end face 15D at both end portions of the light guide plate 15 in the X-axis direction, and an excessive reduction in brightness is suppressed near the light entering end face 15A. According to the graph in FIG. 14, Example 3 has a relative brightness within the range from 0.95 to 1.05 near the light entering end face 15A (within the range from 0 mm to 20 mm), while Example 4 has a relative brightness within the range from 0.90 to 1.05 near the light entering end face 15A, and in particular, the difference in relative brightness from Example 3 at 0 mm is the largest. Further, in Example 3, compared to Example 4, the relative brightness is equivalent near the opposite end face to the light entering end face 15D (within a range from 150 mm to 180 mm). This is assumed to be because when the length L in the X-axis direction of the end side portions 15AE is made less than 15.9 mm, compared to a case where the length L of the end side portions 15AE is made equal to or larger than 15.9 mm, an excessive reduction in the amount of light that leaks from the side end faces 15E of the light guide plate 15 to the outside after being incident on the end side portions 15AE of the light entering end face 15A from the LEDs 13 positioned at the end sides in the X-axis direction is suppressed, and light imparted with a diffusing action by the light refracting portion 26 in the central side portion 15AC of the light entering end face 15A is easy to reach to the end portions of the light guide plate 15 in the X-axis direction.

Furthermore, according to the brightness distribution in FIG. 11 and FIG. 12, it can be seen that in Examples 2 and 3, the bright portions and the dark portions are equivalently difficult to be visually recognized at both end portions of the light guide plate 15 in the X-axis direction. According to the graph in FIG. 14, both Examples 2 and 3 have a relative brightness within a range from 0.95 to 1.05 near the light entering end face 15A (within a range from 0 mm to 20 mm). In addition, both Examples 2 and 3 have a relative brightness within a range from 0.65 to 0.70 near the opposite end face to the light entering end face 15D (within a range from 150 mm to 180 mm). The reason for the advantage of Example 2 is assumed that when the length L of the end side portions 15AE in the X-axis direction is equal to or larger than 8.3 mm, the effect of lowering the occupancy rate occupied by the unit light refracting portions 26A to 0% in the end side portions 15AE can be further obtained, compared to a case where the length L of the end side portions 15AE is less than 8.3 mm. The reason for the advantage of Example 3 is assumed that when the length L of the end side portions 15AE in the X-axis direction is equal to or less than 12.1 mm, compared to a case where the length L of the end side portions 15AE is larger than 12.1 mm, an excessive reduction in the amount of light that leaks from the side end faces 15E of the light guide plate 15 to the outside after being incident on the end side portions 15AE of the light entering end face 15A from the LEDs 13 positioned at the end sides in the X-axis direction is suitably avoided, and light imparted with a diffusing action by the light refracting portion 26 in the central side portion 15AC of the light entering end face 15A becomes easier to reach to the end portions of the light guide plate 15 in the X-axis direction.

As described above, a backlight device (illumination device) 12 of the present embodiment includes a plurality of LEDs (light sources) 13 arranged in a row, a light guide plate 15 including at least a light entering end face 15A having a plate shape, the light entering end face 15A including an outer peripheral edge face on which light emitted from the plurality of LEDs 13 is incident, and an opposite end face to the light entering end face 15D disposed at an opposite side to the light entering end face 15A, the light guide plate 15 having one plate face serving as a light emission plate face 15B configured to emit light, and a light refracting portion 26 configured with a plurality of unit light refracting portions 26A arranged side by side on the light entering end face 15A along an alignment direction of the plurality of LEDs 13, the light refracting portion 26 being configured to refract incident light, wherein in the light refracting portion 26, an occupancy rate occupied by the unit light refracting portions 26A in end side portions 15AE of the light entering end face 15A in the alignment direction is made lower than an occupancy rate occupied by the unit light refracting portions 26A in a central side portion 15AC of the light entering end face 15A in the alignment direction.

In this way, light emitted from the plurality of LEDs 13 to be incident on the light entering end face 15A of the light guide plate 15 propagates inside the light guide plate 15 and is emitted from the light emission plate face 15B. Of the light incident on the light entering end face 15A, light imparted with a refracting action by the light refracting portion 26 travels while being widely diffused inside the light guide plate 15, compared to light not imparted with the refracting action. As a result, brightness unevenness is less likely to occur near the light entering end face 15A.

In a case where the front brightness of emission light is required to be improved, an optical design may be adopted that narrows a range where light emitted from one LED 13 is to be emitted from the light emission plate face 15B of the light guide plate 15. In such a case, at the end portions of the light guide plate 15 in the alignment direction of the plurality of LEDs 13, dark portions locally having a small amount of emission light tend to be easily visually recognized near the opposite end face to the light entering end face 15D, and bright portions locally having a large amount of emission light tend to be easily visually recognized near the light entering end face 15A. It is assumed that the dark portions occur due to the fact that light from the LED 13 positioned at the central side in the alignment direction is difficult to reach, and the bright portions occur due to the fact that light from the LEDs 13 positioned at the end sides in the alignment direction leaks to the outside of the light guide plate 15.

Thus, since the light refracting portion 26 is configured such that the occupancy rate occupied by the unit light refracting portions 26A in the end side portions 15AE in the alignment direction of the light entering end face 15A is lower than the occupancy rate occupied by the unit light refracting portions 26A in the central side portion 15AC in the alignment direction of the light entering end face 15A, in the end side portions 15AE, the amount of light that is imparted with a refracting action by the light refracting portion 26 is reduced in comparison with the central side portion 15AC, and the degree of diffusion of incident light is decreased. Thus, as compared to incident light on the central side portion 15AC, incident light on the end side portions 15AE of the light entering end face 15A has a narrow range of an angle at which the incident light travels inside the light guide plate 15, so light incident on the end side portions 15AE of the light entering end face 15A from the LEDs 13 positioned at the end sides in the alignment direction is difficult to leak to the outside of the light guide plate 15, and is easy to reach near the opposite end face to the light entering end face 15D at the end portions of the light guide plate 15 in the alignment direction. As a result, the bright portions are difficult to be visually recognized near the light entering end face 15A at the end portions of the light guide plate 15 in the alignment direction, and the dark portions are difficult to be visually recognized near the opposite end face to the light entering end face 15D at the same end portions. As a result, brightness unevenness hardly occurs in emission light emitted from the light emission plate face 15B.

Also, the light refracting portion 26 is configured such that the length L of the end side portions 15AE in the alignment direction is within a range being greater than 4.5 mm and less than 15.9 mm. Thus, when the length L of the end side portions 15AE in the alignment direction is made less than 15.9 mm, an excessive reduction in the amount of light that leaks to the outside of the light guide plate 15 after being incident on the end side portions 15AE of the light entering end face 15A from the LEDs 13 positioned at the end sides in the alignment direction is suppressed, and light imparted with a diffusing action by the light refracting portion 26 in the central side portion 15AC of the light entering end face 15A is easy to reach to the end portions of the light guide plate 15 in the alignment direction. As a result, it is possible to suppress an excessive reduction in brightness of emission light near the light entering end face 15A at the end portions of the light guide plate 15 in the alignment direction. On the other hand, when the length L of the end side portions 15AE in the alignment direction is made larger than 4.5 mm, the effect of lowering the occupancy rate in the end side portions 15AE can be sufficiently obtained, so at the end portions of the light guide plate 15 in the alignment direction, the dark portions are less likely to be visually recognized near the opposite end face to the light entering end face 15D, and the bright portions are less likely to be visually recognized near the light entering end face 15A.

In addition, the light refracting portion 26 is configured such that the length L of the end side portions 15AE in the alignment direction is within a range being equal to or greater than 8.3 mm and equal to or less than 12.1 mm. In this manner, when the length L in the end side portions 15AE in the alignment direction is made equal to or less than 12.1 mm, an excessive reduction in the amount of light that leaks to the outside of the light guide plate 15 after being incident on the end side portions 15AE of the light entering end face 15A from the LEDs 13 positioned at the end sides in the alignment direction is suitably avoided, and light imparted with a diffusing action by the light refracting portion 26 in the central side portion 15AC of the light entering end face 15A becomes easier to reach to the end portions of the light guide plate 15 in the alignment direction. Thus, it is possible to suitably avoid an excessive reduction in the brightness of emission light near the light entering end face 15A at the end portions of the light guide plate 15 in the alignment direction. On the other hand, when the length L of the end side portions 15AE in the alignment direction is made equal to or larger than 8.3 mm, the effect of lowering the occupancy rate in the end side portions 15AE can be further obtained, so at the end portions of the light guide plate 15 in the alignment direction, the dark portions become more difficult to be visually recognized near the opposite end face to the light entering end face 15D, and the bright portions become more difficult to be visually recognized near the light entering end face 15A.

Further, the light refracting portion 26 is configured such that the occupancy rate in the end side portions 15AE is set to 0% in percent figures. In this way, the light refracting portion 26 is formed in the central side portion 15AC of the light entering end face 15A, while the light refracting portion 26 is not formed in the end side portions 15AE over the entire regions. Thus, since incident light on the end side portions 15AE is not imparted with a refracting action by the light refracting portion 26, the angle range within which the incident light travels inside the light guide plate 15 is made narrow, thereby making it difficult for the incident light to leak to the outside of the light guide plate 15 and making it easy for the incident light to reach near the opposite end face to the light entering end face 15D at the end portions of the light guide plate 15 in the alignment direction. As described above, the bright portions become difficult to be visually recognized near the light entering end face 15A at the end portions of the light guide plate 15 in the alignment direction, and the dark portions become difficult to be visually recognized near the opposite end face to the light entering end face 15D at the same end portions.

Additionally, the light refracting portion 26 is configured such that the unit light refracting portion 26A extends along the normal direction of the light emission plate face 15B, and has an arch shape in a cross section taken along the light emission plate face 15B. In this way, light can be imparted with a refracting action by the curved face of the unit light refracting portion 26A so as to be widely diffused. As a result, the amount of emission light can be sufficiently ensured near the light entering end face 15A on the light emission plate face 15B of the light guide plate 15, and thus, brightness unevenness due to an insufficient amount of emission light is less likely to be visually recognized near the light entering end face 15A.

The backlight device 12 further includes a frame (light reflecting member) 25 disposed so as to face at least a portion other than the light entering end face 15A of the outer peripheral edge face of the light guide plate 15. For example, even in a case where light leaks from a portion other than the light entering end face 15A of the outer peripheral edge face of the light guide plate 15, the reflected light can be made incident again on the light guide plate 15 by reflecting the leaked light by the frame 25. Thus, the usage efficiency of light can be improved. On the other hand, when the reflected light by the frame 25 is incident again on the light guide plate 15 and travels in various directions, the incident light may be unintentionally emitted to the outside, and bright portions that are locally bright may occur near the light entering end face 15A at the end portions of the light guide plate 15 in the alignment direction. In that regard, since the light refracting portion 26 is configured to have a lower occupancy rate in the end side portions 15AE of the light entering end face 15A in the alignment direction, the light leakage from the light guide plate 15 is suppressed, thereby making it difficult for the bright portions to be visually recognized near the light entering end face 15A at the end portions of the light guide plate 15 in the alignment direction.

The backlight device 12 further includes a first prism sheet 18 disposed on a light emission side with respect to the light guide plate 15, the first prism sheet 18 being provided with a plurality of first unit prisms 18B arranged side by side along a direction from each of the plurality of LEDs 13 toward the light guide plate 15 on a light emission face 17B configured to emit light, the plurality of first unit prisms extending along the alignment direction, and a second prism sheet 19 disposed on a light emission side with respect to the first prism sheet 18, the second prism sheet 19 being provided with a plurality of second unit prisms 19B arranged side by side in a direction from each of the plurality of LEDs 13 toward the light guide plate 15 on the light emission face 17B configured to emit light, the plurality of second unit prisms extending along the alignment direction. In this way, when light emitted from the light emission plate face 15B of the light guide plate 15 is incident on the first prism sheet 18, the light is selectively imparted with a condensing action in a direction from each LED 13 toward the light guide plate 15 by the plurality of first unit prisms 18B extending along the alignment direction of the plurality of LEDs 13 on the light emission face 17B, and is then emitted toward the second prism sheet 19. When the light emitted from the first prism sheet 18 is incident on the second prism sheet 19, the light is selectively imparted with the condensing action in the direction from each LED 13 toward the light guide plate 15 by the plurality of second unit prisms 19B extending along the alignment direction on the light emission face 17B, and is then emitted to the outside. By adjusting angles and the like of respective oblique sides 18B2, 18B3, 19B2, and 19B3 of the first unit prism 18B and the second unit prism 19B, the condensing action imparted to the light can be controlled, and thus, it is possible to improve the front brightness related to emission light and improve the usage efficiency of light. When the front brightness related to emission light is improved in this manner, there is a concern that the bright portions may be easy to be visually recognized near the light entering end face 15A at the end portions of the light guide plate 15 in the alignment direction, and the dark portions may be easy to be visually recognized near the opposite end face to the light entering end face 15D at the same end portions. In that regard, since the light refracting portion 26 is configured to have a lower occupancy rate in the end side portions 15AE of the light entering end face 15A in the alignment direction, light incident on the end side portions 15AE of the light entering end face 15A from the LEDs 13 positioned at the end sides in the alignment direction is difficult to leak to the outside of the light guide plate 15, and is easy to reach near the opposite end face to the light entering end face 15D at the end portions of the light guide plate 15 in the alignment direction. As a result, the bright portions are difficult to be visually recognized near the light entering end face 15A at the end portions of the light guide plate 15 in the alignment direction, and the dark portions are difficult to be visually recognized near the opposite end face to the light entering end face 15D at the same end portions.

Further, a liquid crystal display device (display device) 10 according to the present embodiment includes the backlight device 12 described above, and a liquid crystal panel (display panel) 11 configured to perform display by using light from the backlight device 12. According to the liquid crystal display device 10 having such a configuration, brightness unevenness is unlikely to occur in emission light from the backlight device 12, and thus, display can be achieved with excellent display quality.

Second Embodiment

A second embodiment will be described with reference to FIG. 17 to FIG. 23. In this second embodiment, a light refracting portion 126 with a modified configuration will be indicated. Note that redundant descriptions of structures, actions, and effects similar to those of the first embodiment described above will be omitted.

Figure 17:
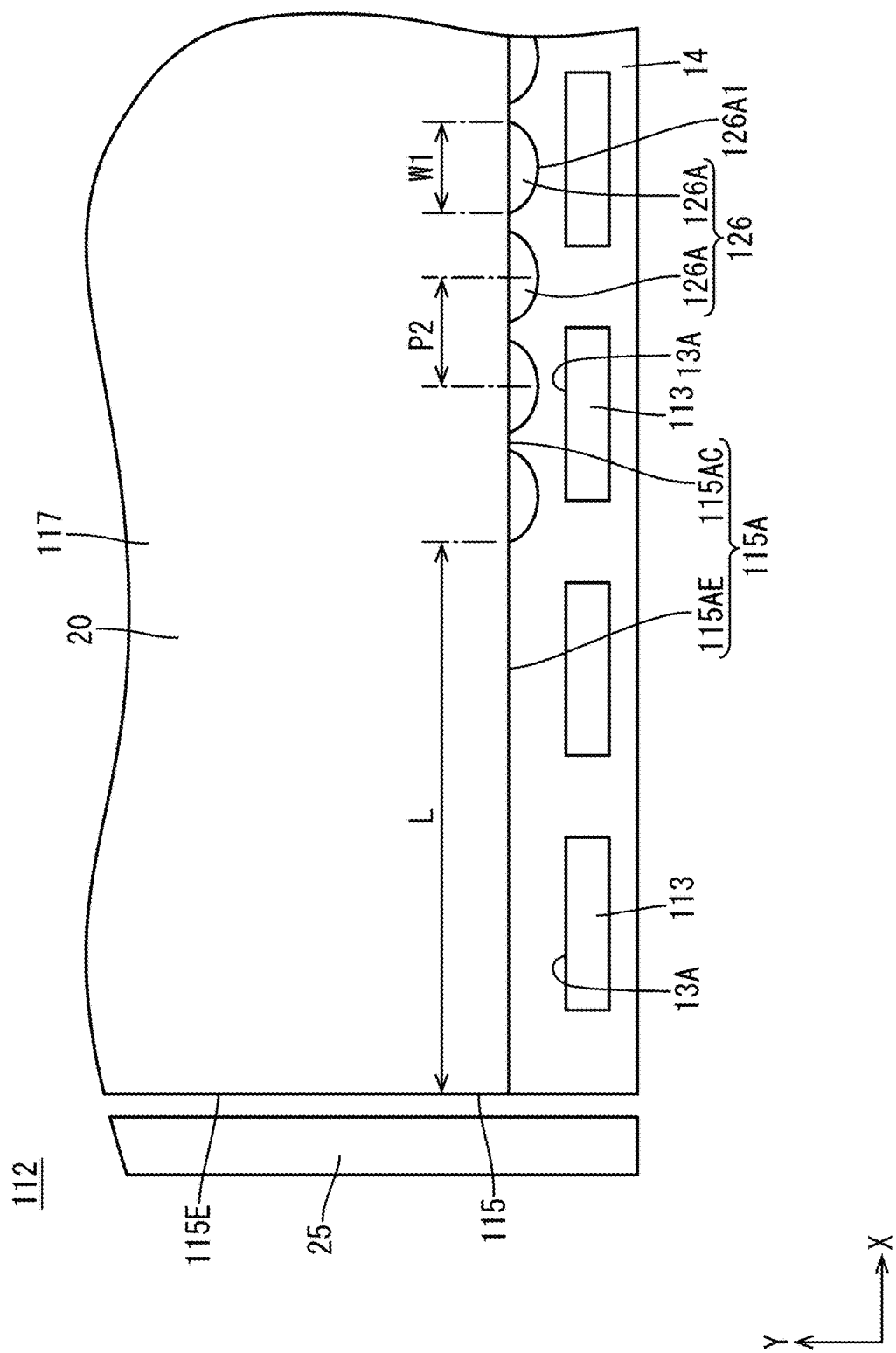
FIG. 17 is a plan view, of a backlight device according to a second embodiment, in which the vicinity of a corner portion of a light guide plate at a light entering end face side is enlarged.

As illustrated in FIG. 17, the light refracting portion 126 according to the present embodiment is configured such that an arrangement interval P2 of unit light refracting portions 126A is larger than a width dimension W1 of the unit light refracting portion 126A. Thus, a central side portion 115AC of a light entering end face 115A includes an arrangement region in which the unit light refracting portions 126A are arranged, and a non-arrangement region in which no unit light refracting portion 126A is arranged. A plurality of unit light refracting portions 126A are arranged side by side at intervals in the X-axis direction in the central side portion 115AC. Thus, there is a flat face between the adjacent unit light refracting portions 126A in the central side portion 115AC. In the light refracting portion 126, as the arrangement interval P2 of the unit light refracting portions 126A becomes large, compared with the width dimension W1 of the unit light refracting portion 126A, an occupancy rate (W1/P2) occupied by the unit light refracting portions 126A tends to become low on the light entering end face 115A, and conversely, as the arrangement interval P2 has a value close to that of the width dimension W1, the occupancy rate occupied by the unit light refracting portions 126A tends to become high. The lower the occupancy rate occupied by the unit light refracting portions 126A becomes on the light entering end face 115A, the higher a rate occupied by the flat faces (non-arrangement region) on the light entering end face 115A is, and conversely, the higher the occupancy rate is, the higher a rate occupied by circular arc-shaped faces 126A1 (the arrangement region) on the light entering end face 115A is. Note that a pair of end side portions 115AE of the light entering end face 115A are, over the entire regions, the non-arrangement regions in which no unit light refracting portion 126A is arranged in a similar manner to that in the first embodiment described above.

Additionally, the light refracting portion 126 is configured such that the occupancy rate occupied by the unit light refracting portions 126A in the central side portion 115AC in the X-axis direction on the light entering end face 115A of a light guide plate 115 is within a range being equal to or greater than 70% and equal to or less than 85% in percent figures. In this way, since the occupancy rate occupied by the unit light refracting portions 126A is made equal to or greater than 70% in the central side portion 115AC of the light entering end face 115A, the amount of light to be imparted with a refracting action by the light refracting portion 126 is sufficiently ensured in incident light on the central side portion 115AC, and the degree of diffusion of the incident light is sufficiently high, so the range of an angle at which the incident light travels inside the light guide plate 115 can be prevented from becoming too narrow. As a result, dark portions are hardly visually recognized near an opposite end face to the light entering end face 115D at the end portions of the light guide plate 115 in the X-axis direction. On the other hand, when the occupancy rate in the central side portion 115AC of the light entering end face 115A is equal to or less than 85%, the amount of light to be imparted with a refracting action by the light refracting portion 126 is not excessively large, so a condensing action in the front direction is appropriately imparted to emission light from the light emission plate face by an optical sheet 117, and as a result, the front brightness related to the emission light can be improved. In addition, since an excessive amount of light to be imparted with a refracting action by the light refracting portion 126 in incident light on the central side portion 115AC is avoided, the amount of light that leaks to the outside of the light guide plate 115 is reduced, so bright portions are less likely to be visually recognized near the light entering end face 115A at the end portions of the light guide plate 115 in the X-axis direction.

Preferably, the light refracting portion 126 is made to have an occupancy rate occupied by the unit light refracting portions 126A of 85%, which is higher than 70%, in the central side portion 115AC. In this way, a larger amount of light to be imparted with a refracting action by the light refracting portion 126 is ensured in incident light on the central side portion 115AC than that in the case where the occupancy rate occupied by the unit light refracting portions 126A is set to 70% in the central side portion 115AC, and thus, a larger amount of emission light is secured near the light entering end face 115A on the light emission plate face of the light guide plate 115. As a result, brightness unevenness due to an insufficient amount of emission light near the light entering end face 115A is less likely to be visually recognized.

Next, Comparative Experiment 2 was performed. A purpose of Comparative Experiment 2 is to obtain knowledge related to a change in brightness distribution related to emission light of a backlight device 112 in a case where the occupancy rate occupied by the unit light refracting portions 126A is changed. In Comparative Experiment 2, examples in which the backlight device 112 having the configuration described in the paragraphs prior to those of Comparative Experiment 2 was used, and the occupancy rate occupied by the unit light refracting portions 126A in the central side portion 115AC of the light entering end face 115A of the light guide plate 115 was changed are referred to as Examples 5 and 6 (see FIG. 17), and comparative examples in which the light guide plate 115 was used in which the entire light entering end face 115A was the arrangement region in which the unit light refracting portions 126A were arranged are referred to as Comparative Examples 2 and 3. In Example 5, the occupancy rate occupied by the unit light refracting portions 126A is set to 85% in the central side portion 115AC. In Example 6, the occupancy rate occupied by the unit light refracting portions 126A is set to 70% in the central side portion 115AC. In Examples 5 and 6, the length L in the X-axis direction of each end side portion 115AE of the light entering end face 115A is commonly set to 8.3 mm (which is the same value as that in Example 2 described in Comparative Experiment 1). In Comparative Example 2, the occupancy rate occupied by the unit light refracting portions 126A arranged across the entire light entering end face 115A is set to 85%. In Comparative Example 3, the occupancy rate occupied by the unit light refracting portions 126A arranged across the entire light entering end face 115A is set to 70%. In Comparative Example 1 and Example 5, compared to Comparative Example 2 and Example 6, the unit light refracting portions 126A are arranged at a high density with the arrangement interval of the unit light refracting portions 126A being small.

Figure 18:
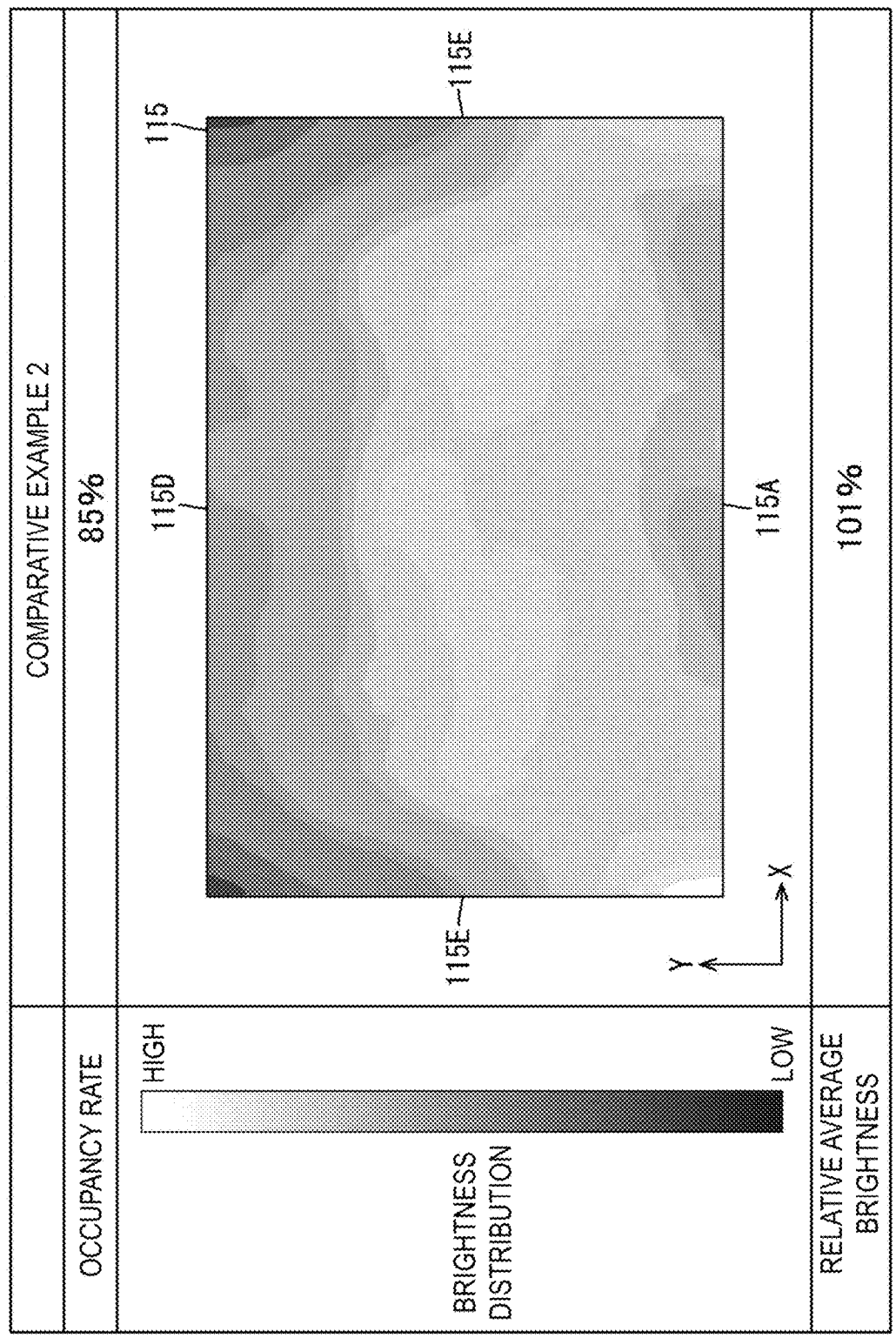
FIG. 18 is a table showing brightness distribution of Comparative Example 2 of Comparative Experiment 2.
Figure 19:
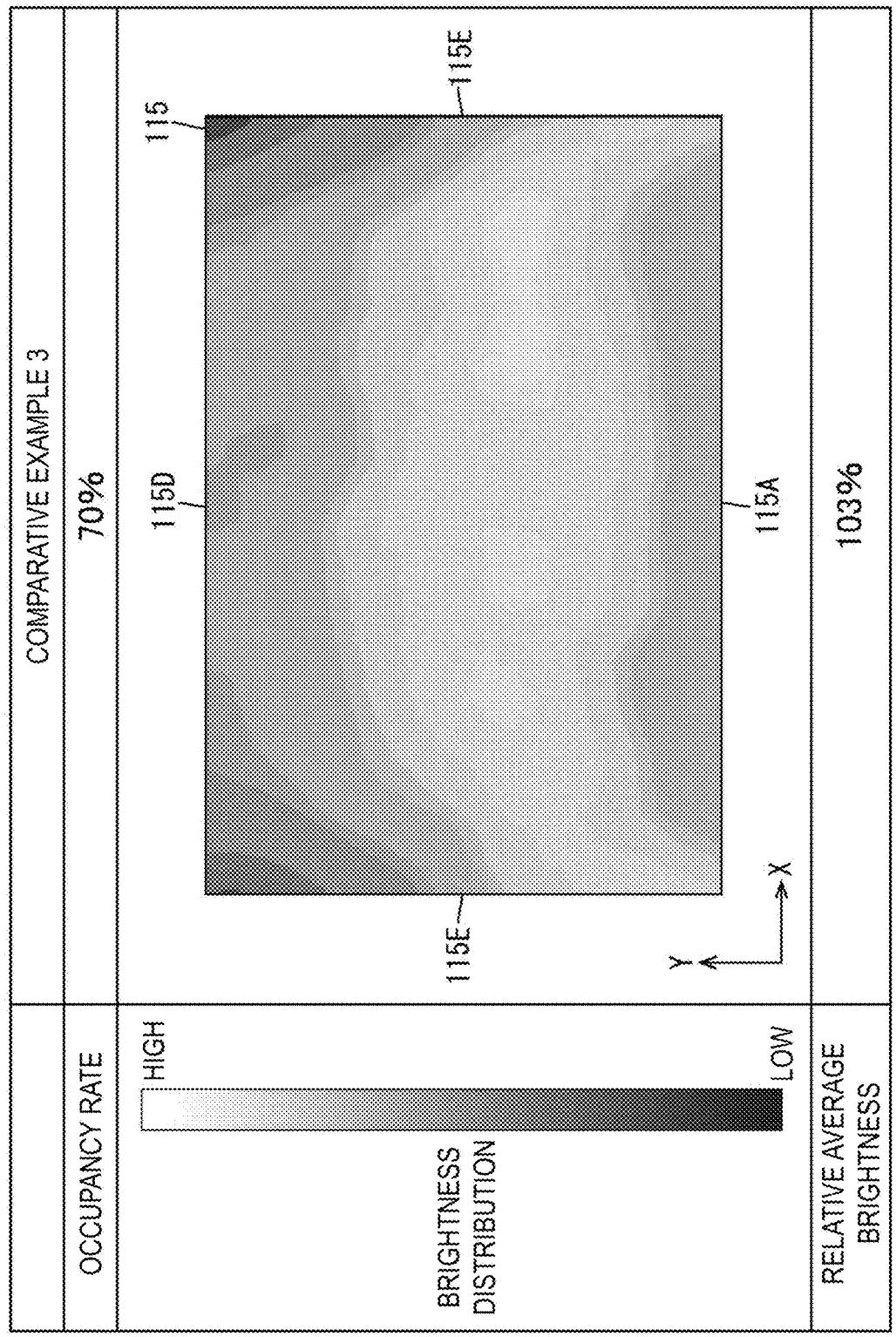
FIG. 19 is a table showing brightness distribution of Comparative Example 3 of Comparative Experiment 2.

Then, in Comparative Experiment 2, brightness related to emission light was measured in a state where all LEDs 113 were turned on in each backlight device 112 according to Comparative Examples 2 and 3 and Examples 5 and 6 to calculate relative average brightness, and a diagram was produced in which brightness distribution was represented by shading, and a graph related to the brightness distribution in the Y-axis direction was produced. The relative average brightness is as described in Comparative Experiment 1. Experimental results of Comparative Experiment 2 are as illustrated in FIG. 18 to FIG. 23. FIG. 18 is a table showing the brightness distribution of Comparative Example 2, FIG.

Figure 20:
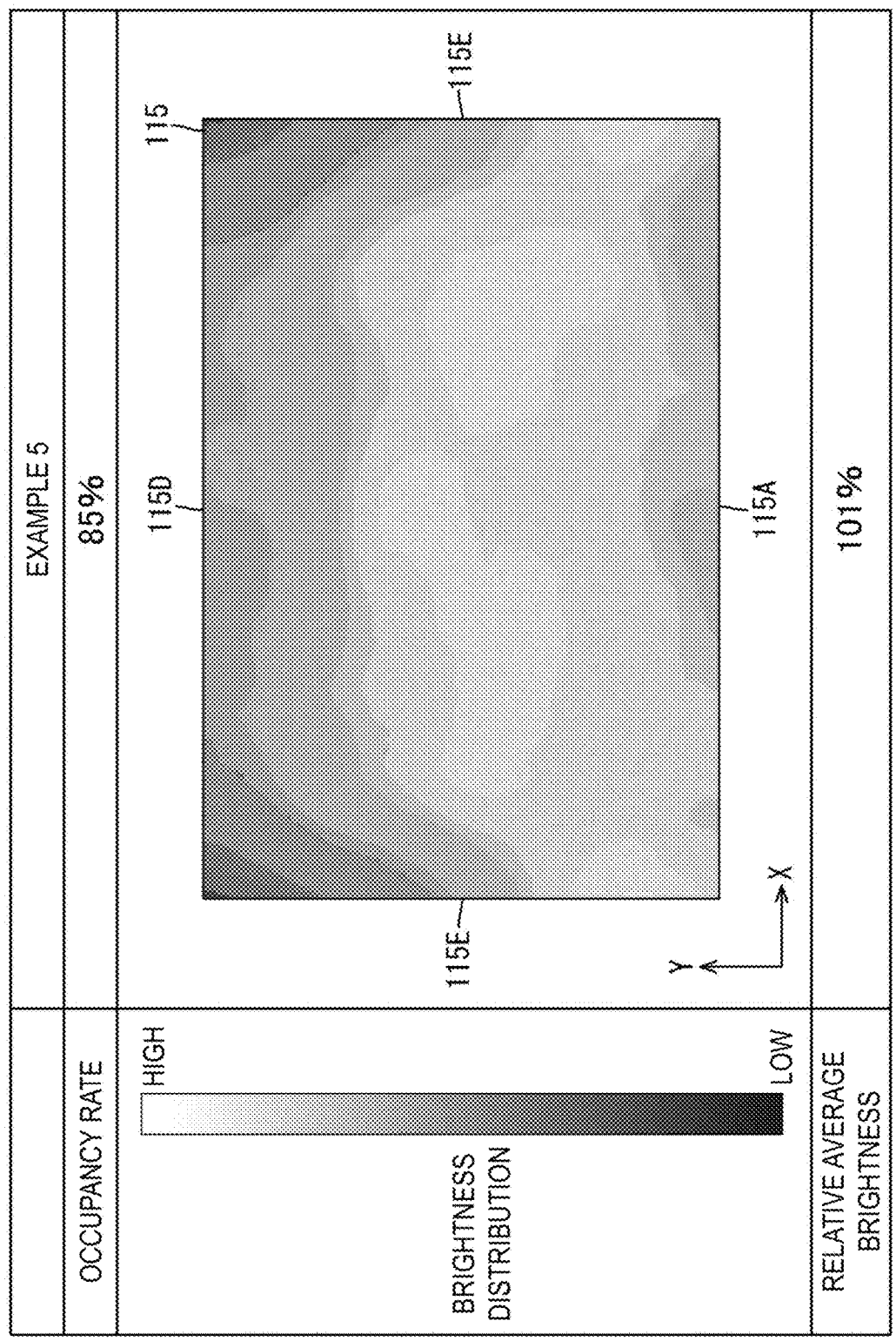
FIG. 20 is a table showing brightness distribution of Example 5 of Comparative Experiment 2.
Figure 21:
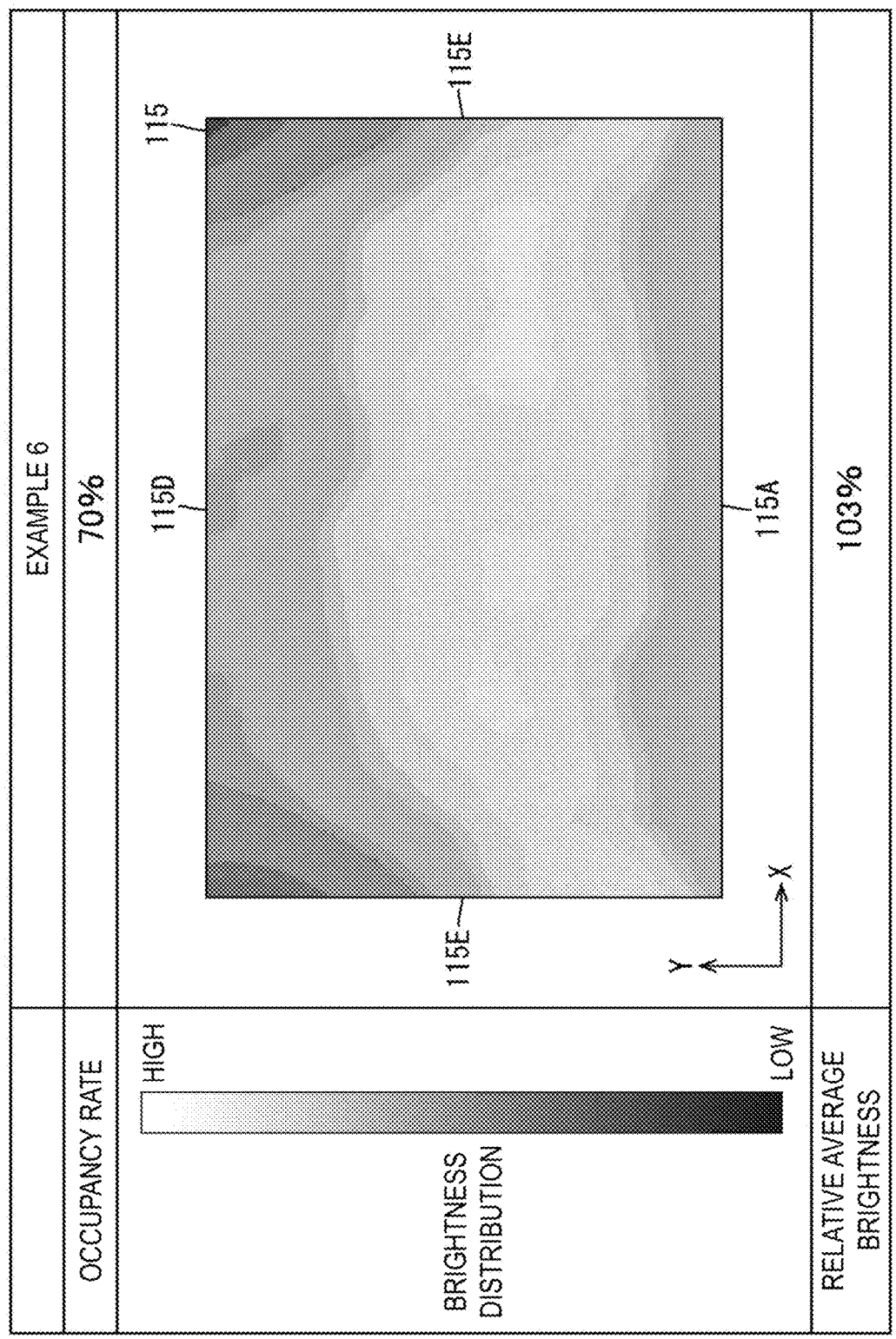
FIG. 21 is a table showing brightness distribution of Example 6 of Comparative Experiment 2.
Figure 22:
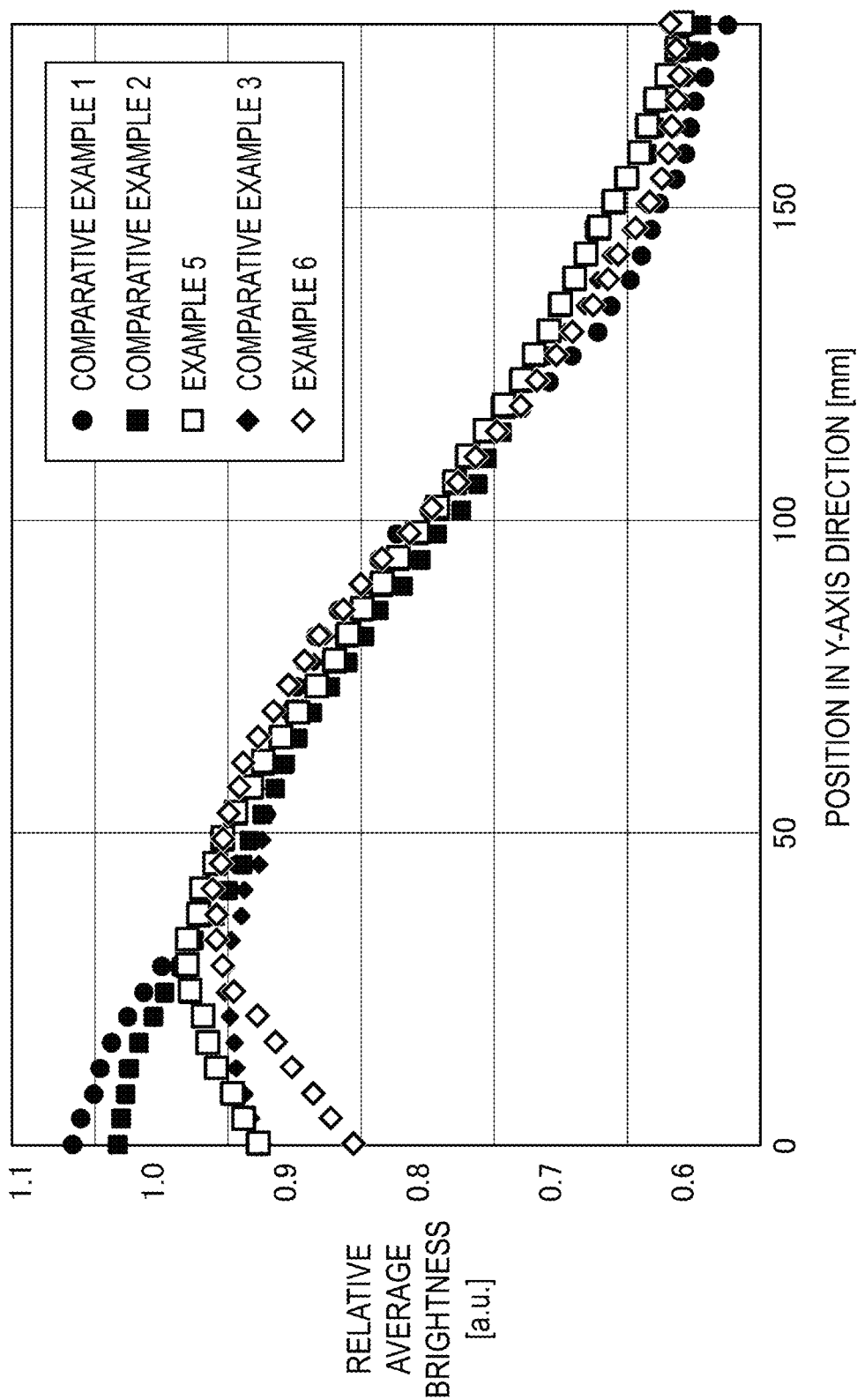
FIG. 22 is a graph related to brightness distribution in the Y-axis direction of Comparative Examples 2 and 3 and Examples 5 and 6 of Comparative Experiment 2.
Figure 23:
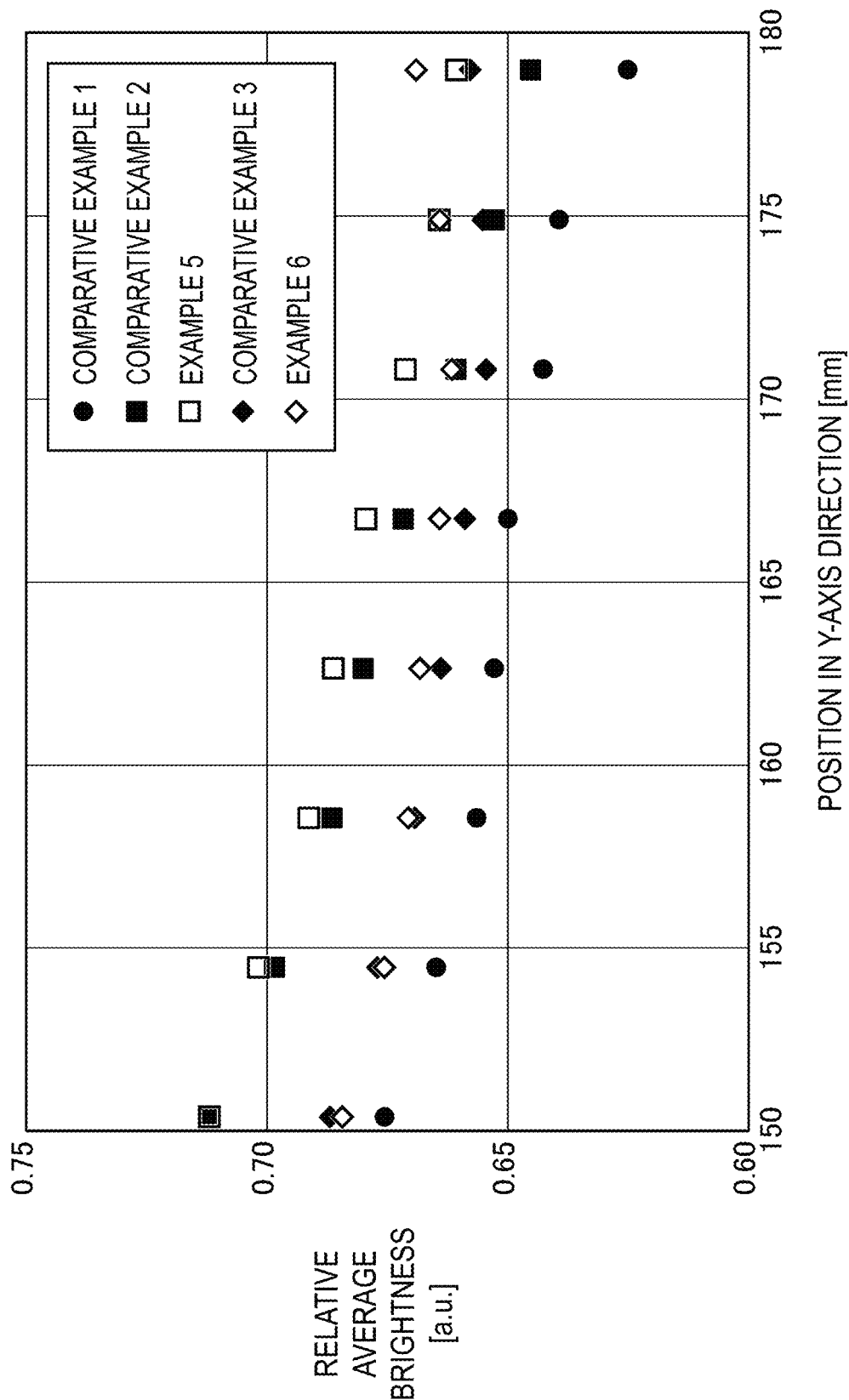
FIG. 23 is an enlarged graph of a part of FIG. 22.

19 is a table showing the brightness distribution of Comparative Example 3, FIG. 20 is a table showing the brightness distribution of Example 5, FIG. 21 is a table showing the brightness distribution of Example 6, FIG. 22 is a graph related to the brightness distribution in the Y-axis direction of Comparative Examples 1 to 3 and Examples 5 and 6, and FIG. 23 is an enlarged graph of a part of FIG. 22. The diagrams related to the brightness distribution and illustrated in FIGS. 18 to 21 are similar to those related to the brightness distribution illustrated in FIGS. 9 to 13. FIG. 22 is a graph related to the brightness distribution in the Y-axis direction in Comparative Examples 2 and 3 and Examples 5 and 6 illustrated in FIG. 18 to FIG. 21, respectively, at the position represented by the A-A line, and is similar to FIG. 14. FIG. 23 is an enlarged graph of a range from 150 mm to 180 mm (near the opposite end face to the light entering end face 115D) of the horizontal axis in FIG. 22. Note that the experimental results related to Comparative Example 1 of Comparative Experiment 1 are illustrated together in the graphs of FIG. 22 and FIG. 23 as a reference.

The experimental results of Comparative Experiment 2 will be described. According to the brightness distribution in FIG. 18, in Comparative Example 2, it can be seen that at both end portions in the X-axis direction, bright portions having extremely high brightness occur at both corner portions at the light entering end face 115A side in the Y-axis direction, and dark portions having extremely low brightness occur at both corner portions at the opposite end face to the light entering end face 115D side in the Y-axis direction. The relative average brightness in Comparative Example 2 is 101, which is approximately 1% higher than those of Comparative Example 1 and Examples 1 to 4 of Comparative Experiment 1. According to the graphs of FIG. 22 and FIG. 23, in Comparative Example 2, the relative brightness is approximately 1.08 near the light entering end face 115A (within the range from 0 mm to 20 mm), while the relative brightness is approximately 0.65 near the opposite end face to the light entering end face 115D (within the range from 150 mm to 180 mm). On the other hand, according to the brightness distribution in FIG. 19, in Comparative Example 3, it can be seen that at both end portions in the X-axis direction, bright portions are not formed at both corner portions at the light entering end face 115A side in the Y-axis direction, but the brightness is slightly lowered at both corner portions at the opposite end face to the light entering end face 115D side in the Y-axis direction. In addition, it can be seen that, near the light entering end face 115A, the brightness is reduced over almost the entire region in the X-axis direction. The relative average brightness in Comparative Example 3 is 103%, which is approximately 3% higher than those of Comparative Example 1 and Examples 1 to 4 of Comparative Experiment 1. According to the graphs of FIG. 22 and FIG. 23, in Comparative Example 3, the relative brightness is approximately 1 near the light entering end face 115A, whereas the relative brightness is generally higher near the opposite end face to the light entering end face 115D than that in Comparative Example 2, but the relative brightness is slightly lower than those in Examples 5 and 6 that will be described below.

According to the brightness distribution in FIG. 20, it can be seen that in Example 5, bright portions and dark portions are not almost generated at both end portions in the X-axis direction, and at both corner portions at the light entering end face 115A side in the Y-axis direction, and both corner portions at the opposite end face to the light entering end face 115D side in the Y-axis direction, respectively. The relative average brightness in Example 5 is 101', which is equivalent to that in Comparative Example 2, and is approximately 1% higher than those in Comparative Example 1 and Examples 1 to 4 of Comparative Experiment 1. According to the graphs in FIG. 22 and FIG. 23, in Example 5, the relative brightness is approximately 1 near the light entering end face 115A, and is slightly higher than that in Comparative Example 3, while the relative brightness is generally the highest near the opposite end face to the light entering end face 115D. In addition, in Example 5, the relative brightness at both corner portions at the light entering end face 115A side in the Y-axis direction, of both end portions in the X-axis direction, is slightly low in comparison to Example 1 of Comparative Experiment 1 (see FIG. 14). This is considered to be because, as compared to Example 1 where the occupancy rate in the central side portion 115AC is 100%, in Example 5 where the occupancy rate in the central side portion 15AC is 85%, an excessive amount of light imparted with a refracting action by the light refracting portion 126 in incident light on the central side portion 115AC is avoided, and thus, the amount of light that leaks to the outside from the side end face 115E of the light guide plate 115 is reduced.

According to the brightness distribution in FIG. 21, in Example 6, although bright portions are not almost generated at both end portions in the X-axis direction and at both corner portions at the light entering end face 115A side in the Y-axis direction, the brightness is slightly lowered at both corner portions at the opposite end face to the light entering end face 115D side in the Y-axis direction. In addition, it can be seen that, near the light entering end face 115A, the brightness is reduced over almost the entire region in the X-axis direction. The relative average brightness in Example 6 is 103%, which is equivalent to that in Comparative Example 3, and is approximately 3% higher than those in Comparative Example 1 and Examples 1 to 4 of Comparative Experiment 1. According to the graphs in FIG. 22 and FIG. 23, in Example 6, the relative brightness is approximately from 0.9 to 1.0, which is slightly lower than that in Example 5, near the light entering end face 115A, whereas the relative brightness is higher than that in Comparative Example 3 near the opposite end face to the light entering end face 115D.

In comparison with Example 6, Example 5 is excellent because there is no situation in which the brightness is reduced substantially across the entire region in the X-axis direction near the light entering end face 115A. This is considered to be because, as compared to Example 6 where the occupancy rate in the central side portion 115AC is 70%, in Example 5 where the occupancy rate in the central side portion 115AC is 85%, a large amount of light imparted with a refracting action by the light refracting portion 126 in incident light on the central side portion 115AC is ensured, and thus, a large amount of emission light is ensured near the light entering end face 115A on the light emission plate face of the light guide plate 115. On the other hand, in comparison with Example 5, in Example 6, the relative average brightness is 103%, which is a high value. This is assumed to be because in comparison with Example 5, in Example 6, the amount of light imparted with a refracting action by the light refracting portion 126 is low, so a condensing action in the front direction is imparted to the light emitted from the light emission plate face of the light guide plate 115 by the optical sheet 117, thus, the amount of light that rises in the front direction increases, and as a result, the relative average brightness increases.

As described above, according to the present embodiment, the light refracting portion 126 is configured such that the occupancy rate in the central side portion 115AC is equal to or greater than 70% and equal to or less than 85% in percent figures. In this way, since the occupancy rate is made equal to or greater than 70% in the central side portion 115AC of the light entering end face 115A, the amount of light to be imparted with a refracting action by the light refracting portion 126 is sufficiently ensured in incident light on the central side portion 115AC, and the degree of diffusion of the incident light is sufficiently high, so the range of an angle at which the incident light travels inside the light guide plate 115 can be prevented from becoming too narrow. As a result, dark portions are less likely to be visually recognized near the opposite end face to the light entering end face 115D at the end portions of the light guide plate 115 in the alignment direction. On the other hand, when the occupancy rate is made equal to or less than 85% in the central side portion 115AC of the light entering end face 115A, the front brightness related to emission light can be improved. In addition, since an excessive amount of light to be imparted with a refracting action by the light refracting portion 126 in incident light on the central side portion 115AC is avoided, the amount of light that leaks to the outside of the light guide plate 115 is reduced, so bright portions are less likely to be visually recognized near the light entering end face 115A at the end portions of the light guide plate 115 in the alignment direction.

Also, the light refracting portion 126 has the occupancy rate being larger than 70% in the central side portion 115AC. In this way, compared to the case where the occupancy rate is 70% in the central side portion 115AC of the light entering end face 115A, a large amount of light to be imparted with a refracting action by the light refracting portion 126 is ensured in incident light on the central side portion 115AC, and thus, a large amount of emission light is secured near the light entering end face 115A on the light emission plate face of the light guide plate 115. As a result, brightness unevenness due to an insufficient amount of emission light near the light entering end face 115A is less likely to be visually recognized.

Third Embodiment

A third embodiment will be described with reference to FIG. 24 to FIG. 28. In this third embodiment, a light refracting portion 226 with a modified configuration from that in the second embodiment described above will be indicated. Note that redundant descriptions of structures, actions, and effects similar to those of the second embodiment described above will be omitted.

Figure 24:
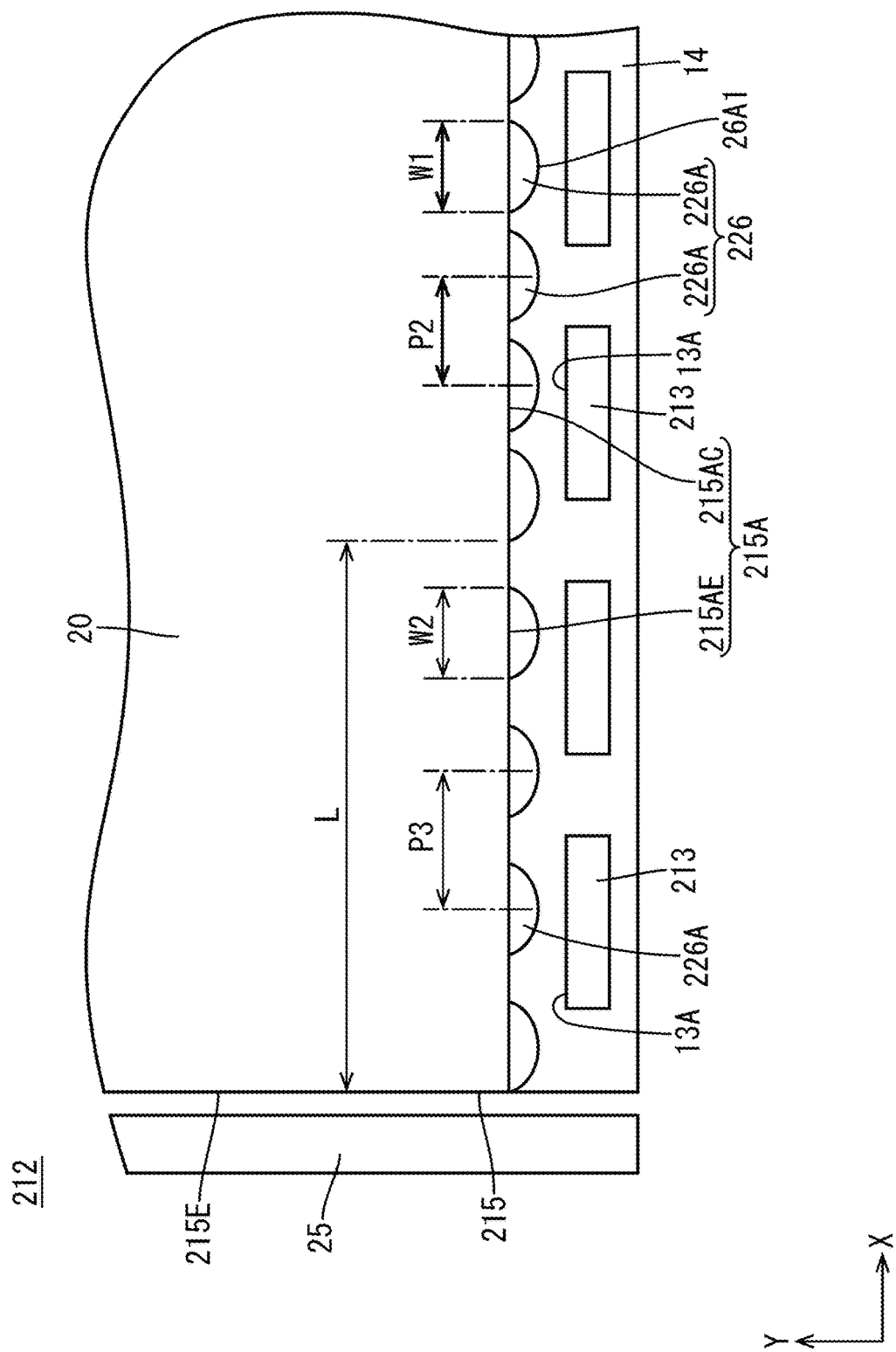
FIG. 24 is a plan view, of a backlight device according to a third embodiment, in which the vicinity of a corner portion of a light guide plate at a light entering end face side is enlarged.

As illustrated in FIG. 24, the light refracting portion 226 according to the present embodiment is also provided in a pair of end side portions 215AE in addition to a central side portion 215AC of a light entering end face 215A. The light refracting portion 226 is configured such that a width dimension W2 of the unit light refracting portion 226A in each end side portion 215AE is the same as the width dimension W1 of the unit light refracting portion 226A in the central side portion 215AC, but an arrangement interval P3 of the unit light refracting portions 226A in each end side portion 215AE is larger than the arrangement interval P2 of the unit light refracting portions 226A in the central side portion 215AC. That is, although the plurality of unit light refracting portions 226A having an identical shape are arranged side by side at intervals in the X-axis direction throughout the entire length of the light entering end face 215A, but the arrangement interval P3 in each end side portion 215AE is made larger than the arrangement interval P2 in the central side portion 215AC. Thus, the occupancy rate (W2/P3) occupied by the unit light refracting portions 226A in each end side portion 215AE of the light entering end face 215A is lower than the occupancy rate (W1/P2) occupied by the unit light refracting portions 226A in the central side portion 215AC of the light entering end face 215A. Each of the end side portions 215AE of the light entering end face 215A includes an arrangement region in which the unit light refracting portions 226A are arranged and a non-arrangement region in which no unit light refracting portion 226A is arranged, but in comparison to the central side portion 215AC, the arrangement region is made narrow, and the non-arrangement region is made wide. As described above, since the width dimensions W1 and W2 of the unit light refracting portion 226A are made equal between the end side portion 215AE and the central side portion 215AC, a refracting action to be imparted to incident light by the unit light refracting portion 226A is made common between the end side portion 215AE and the central side portion 215AC. This facilitates the optical design related to the light guide plate 215.

Then, the light refracting portion 226 is configured such that the occupancy rate in the end side portions 215AE is equal to or greater than 50% and equal to or less than 60% in percent figures. By making the occupancy rate in the end side portions 215AE of the light entering end face 215A be equal to or greater than 50%, the amount of light to be imparted with a refracting action by the light refracting portion 226 in incident light on the end side portions 215AE is sufficiently ensured, and the degree of diffusion of the incident light is sufficiently high. As a result, front brightness related to emission light from the backlight device 212 can be improved, and an excessive reduction in brightness of the emission light near the light entering end face 215A at the end portions of the light guide plate 215 in the X-axis direction can be suppressed. On the other hand, when the occupancy rate is made equal to or less than 60% in the end side portions 215AE of the light entering end face 215A, an excessive amount of light to be imparted with a refracting action by the light refracting portion 226 in incident light on the end side portions 215AE can be suppressed, and the amount of light that leaks to the outside from the side end faces 215E of the light guide plate 215 can be reduced. This makes it difficult for bright portions to be visually recognized near the light entering end face 215A at the end portions of the light guide plate 215 in the X-axis direction. As described above, brightness unevenness is less likely to be visually recognized near the light entering end face 215A at the end portions of the light guide plate 215 in the X-axis direction.

Preferably, the light refracting portion 226 is configured to have the occupancy rate being lower than 60% in the end side portions 215AE. In this way, compared to the case where the occupancy rate is 60% in the end side portions 215AE of the light entering end face 215A, an excessive amount of light to be imparted with a refracting action by the light refracting portion 226 in incident light on the end side portions 215AE can be more preferably suppressed, and the amount of light that leaks to the outside from the side end faces 215E of the light guide plate 215 can be further reduced. As a result, bright portions are less likely to be visually recognized near the light entering end face 215A at the end portions of the light guide plate 215 in the X-axis direction.

Next, Comparative Experiment 3 was performed. A purpose of Comparative Experiment 3 is to obtain knowledge related to a change in brightness distribution related to emission light of a backlight device 212, when the occupancy rate occupied by the unit light refracting portions 226A in the end side portions 215AE of the light entering end face 215A is changed. In Comparative Experiment 3, examples in which the backlight device 212 having the configuration described in the paragraphs prior to those of Comparative Experiment 3 was used, and the occupancy rate occupied by the unit light refracting portions 226A in each end side portion 215AE of the light entering end face 215A of the light guide plate 215 was changed are referred to as Examples 7 and 8 (see FIG. 24). In Example 7, the occupancy rate occupied by the unit light refracting portions 226A in each end side portion 215AE is set to 50%. In Example 8, the occupancy rate occupied by the unit light refracting portions 226A in each end side portion 215AE is set to 50%. In Examples 7 and 8, the length L in the X-axis direction of each end side portion 215AE of the light entering end face 215A is commonly set to 8.3 mm (which is the same value as that in Example 2 described in Comparative Experiment 1), and the occupancy rate occupied by the unit light refracting portions 226A in the central side portion 215AC is commonly set to 85% (which is the same value as that in Example 5 described in Comparative Experiment 2). In Example 7, compared to Example 8, the arrangement interval of the unit light refracting portions 226A in each end side portion 215AE is large, and the unit light refracting portions 226A are arranged at a low density.

Figure 25:
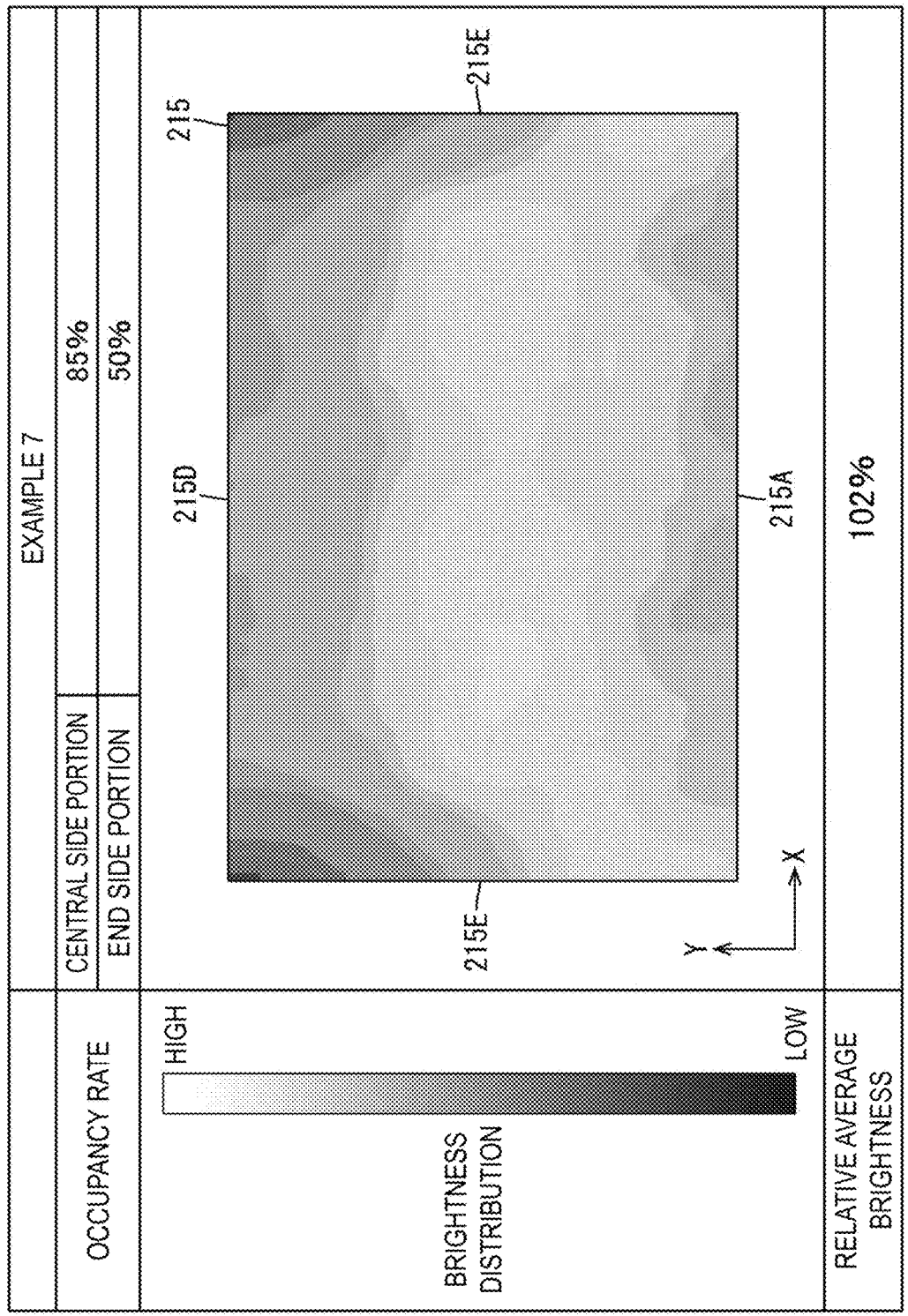
FIG. 25 is a table showing brightness distribution of Example 7 of Comparative Experiment 3.
Figure 26:
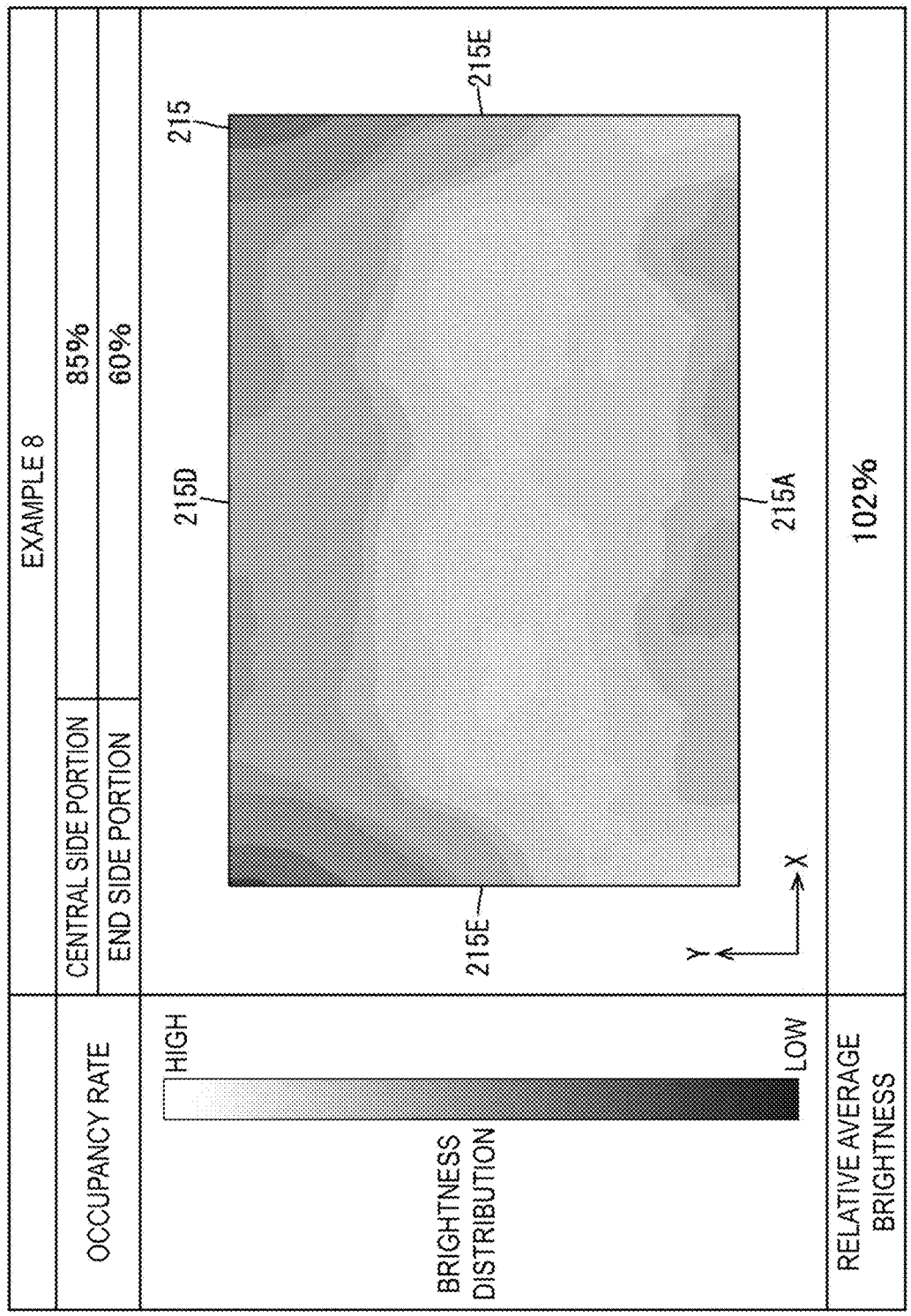
FIG. 26 is a table showing brightness distribution of Example 8 of Comparative Experiment 3.
Figure 27:
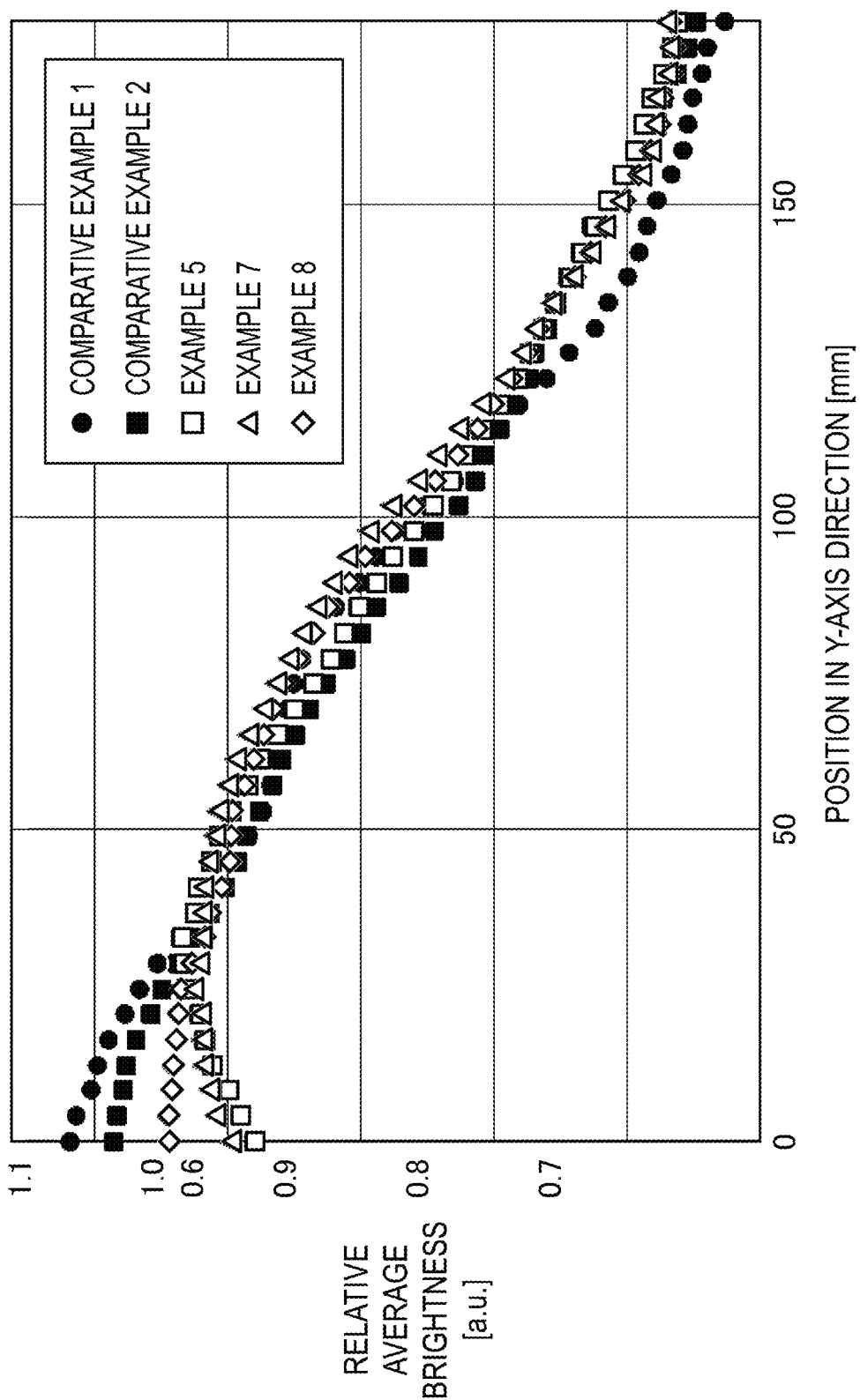
FIG. 27 is a graph related to brightness distribution in the Y-axis direction of Comparative Examples 1 and 2 and Examples 5, 7, and 8 of Comparative Experiment 3.
Figure 28:
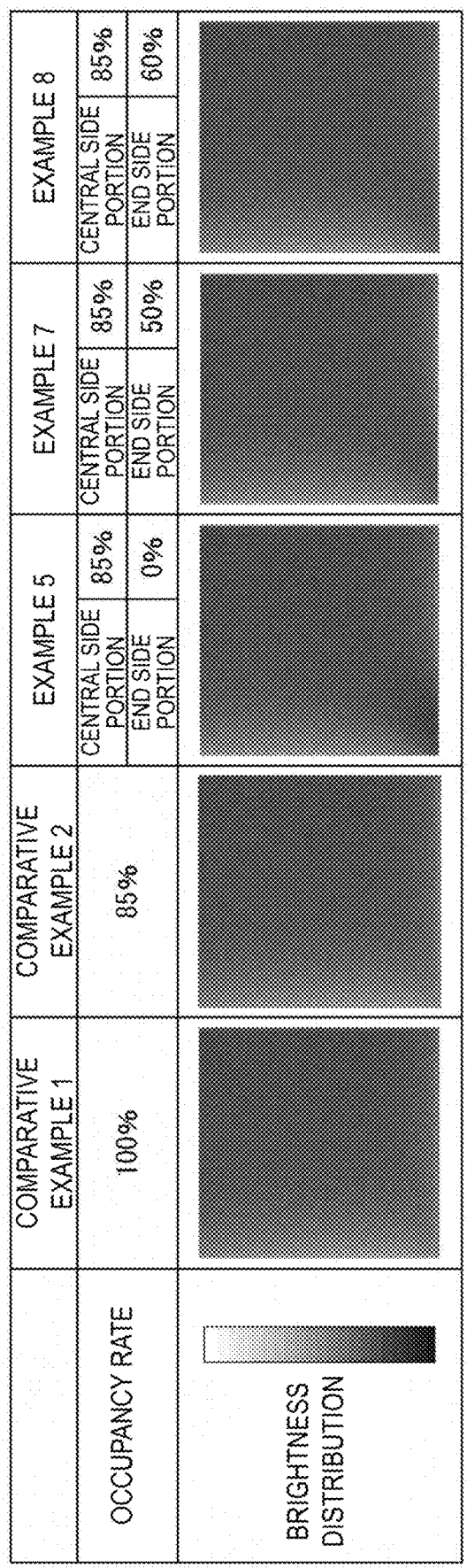
FIG. 28 is a table showing an illuminance portion of each of Comparative Examples 1 and 2 and Examples 5, 7, and 8 of Comparative Experiment 3.

Then, in Comparative Experiment 3, brightness related to emission light was measured in a state where all LEDs 213 were turned on in each backlight device 212 according to Examples 7 and 8 to calculate relative average brightness, and a diagram was produced in which brightness distribution was represented by shading, and a graph related to the brightness distribution in the Y-axis direction was produced. The relative average brightness is as described in Comparative Experiment 1. Furthermore, in Comparative Experiment 3, illuminance related to emission light was measured in a state in which all the LEDs were turned on in each backlight device according to Comparative Example 1 described in Comparative Experiment 1 and Comparative Example 2 and Example 5 described in Comparative Experiment 2, in addition to each backlight device 212 according to Examples 7 and 8, and a diagram was produced in which illuminance distribution was represented by shading. In the diagram according to the illuminance distribution, the corner portions at the light entering end face side in the Y-axis direction are enlarged at the end portions of the light guide plate in the X-axis direction. The experimental results of Comparative Experiment 3 are as illustrated in FIG. 25 to FIG. 28. FIG. 25 is a table showing the brightness distribution of Example 7, FIG. 26 is a table showing the brightness distribution of Example 8, FIG. 27 is a graph related to the brightness distribution in the Y-axis direction in Comparative Examples 1 and 2 and Examples 5, 7, and 8, and FIG. 28 is a table showing the illuminance distribution in Comparative Examples 1 and 2 and Examples 5, 7, and 8. The diagrams related to the brightness distribution illustrated in FIG. 25 and FIG. 26 are similar to the diagrams related to the brightness distribution illustrated in FIG. 9 to FIG. 13 and the like. FIG. 27 is a graph related to the brightness distribution in the Y-axis direction in each of Comparative Examples 1 and 2 and Examples 5, 7, and 8 illustrated in FIG. 25 and FIG. 26 at the position represented by the A-A line, and is similar to FIG. 14 and the like. Note that the experimental results according to Comparative Examples 1 and 2 and Example 5 are illustrated together in the graph of FIG. 27 as a reference.

The experimental results of Comparative Experiment 3 will be described. According to the brightness distribution in FIG. 25, it can be seen that in Example 7, bright portions and dark portions are not almost generated at both end portions in the X-axis direction, and at both corner portions at the light entering end face 215A side in the Y-axis direction, and both corner portions at the opposite end face to the light entering end face 215D side in the Y-axis direction, respectively. The relative average brightness in Example 7 is 102%, which is approximately 2% higher than those in Comparative Example 1 and Examples 1 to 4 of Comparative Experiment 1. According to the graph in FIG. 27, in Example 7, the relative brightness is approximately 1 near the light entering end face 215A (within the range from 0 mm to 20 mm), and thus, is slightly higher than that in Example 5, while the relative brightness is equivalent to that in Example 5 near the opposite end face to the light entering end face 215D (within the range from 150 mm to 180 mm). According to the brightness distribution in FIG. 26, it can be seen that in Example 8, bright portions and dark portions are not almost generated at both end portions in the X-axis direction, and at both corner portions at the light entering end face 215A side in the Y-axis direction, and both corner portions at the opposite end face to the light entering end face 215D side in the Y-axis direction, respectively. The relative average brightness in Example 8 is 102%, which is substantially the same as that in Example 7, and is approximately 2% higher than those in Comparative Example 1 and Examples 1 to 4 of Comparative Experiment 1. According to the graph in FIG. 27, in Example 8, the relative brightness is approximately 1.05 near the light entering end face 215A, and is larger than that in Example 7, while the relative brightness is equivalent to those in Examples 5 and 7 near the opposite end face to the light entering end face 215D.

Furthermore, according to the illuminance distribution in FIG. 28, it can be seen that in Examples 7 and 8, in comparison with Example 5, the illumination at the corner portions at the light entering end face 215A side in the Y-axis direction, at the end portions in the X-axis direction, is slightly high. This is assumed to be because, compared to Example 5 in which the occupancy rate in the end side portions is 0%, in Examples 7 and 8 in which the occupancy rates in the end side portions 215AE are 50% and 60%, respectively, the amount of light to be imparted with a refracting action by the light refracting portion 226 is sufficiently ensured in incident light on the end side portions 215AE, and the degree of diffusion of the incident light is sufficiently high, so an excessive reduction in the brightness of emission light in a direction other than the front direction (an oblique viewing direction) near the light entering end face 215A is suppressed. Additionally, according to the graph in FIG. 27, it can be seen that compared to Example 8, in Example 7, the relative brightness is reduced near the light entering end face 215A, making it more difficult for bright portions to be visually recognized. This is assumed to be because, compared to Example 8 in which the occupancy rate in the end side portions 215AE is 60%, in Example 7 in which the occupancy rate in the end side portions 215AE is 50%, an excessive amount of light to be imparted with a refracting action by the light refracting portion 226 in incident light on the end side portions 215AE is more preferably suppressed, and the amount of light that leaks to the outside from the side end faces 215E of the light guide plate 215 can be further reduced.

As described above, according to the present embodiment, the light refracting portion 226 is configured to have the occupancy rate in the end side portions 215AE being equal to or greater than 50% and equal to or less than 60% in percent figures. By making the occupancy rate in the end side portions 215AE of the light entering end face 215A be equal to or greater than 50%, the amount of light to be imparted with a refracting action by the light refracting portion 226 in incident light on the end side portions 215AE is sufficiently ensured, and the degree of diffusion of the incident light is sufficiently high. As a result, front brightness related to emission light can be improved, and an excessive reduction in brightness related to the emission light in a direction other than the front direction near the light entering end face 215A at the end portions of the light guide plate 215 in the alignment direction can be suppressed. On the other hand, when the occupancy rate is equal to or less than 60% in the end side portions 215AE of the light entering end face 215A, an excessive amount of light to be imparted with a refracting action by the light refracting portion 226 in incident light on the end side portions 215AE can be suppressed, and the amount of light that leaks to the outside of the light guide plate 215 can be reduced. As a result, bright portions are less likely to be visually recognized near the light entering end face 215A at the end portions of the light guide plate 215 in the alignment direction. As described above, brightness unevenness is less likely to be visually recognized near the light entering end face 215A at the end portions of the light guide plate 215 in the alignment direction.

Also, the light refracting portion 226 is configured to have the occupancy rate in the end side portions 215AE being lower than 60%. In this way, compared to a case where the occupancy rate is 60% in the end side portions 215AE of the light entering end face 215A, an excessive amount of light to be imparted with a refracting action by the light refracting portion 226 in incident light on the end side portions 215AE can be more preferably suppressed, and the amount of light that leaks to the outside of the light guide plate 215 can be further reduced. As a result, bright portions are less likely to be visually recognized near the light entering end face 215A at the end portions of the light guide plate 215 in the alignment direction.

Also, the light refracting portion 226 is configured such that dimensions of the unit light refracting portions 226A in the alignment direction are equal between the end side portion 215AE and the central side portion 215AC. In this way, a refracting action to be imparted to incident light by the unit light refracting portion 226A is made common between the end side portion 215AE and the central side portion 215AC. This facilitates the optical design related to the light guide plate 215.

Fourth Embodiment

A fourth embodiment will be described with reference to FIG. 29 or FIG. 30. In the fourth embodiment, a second prism sheet 319 having a modified arrangement and a light refracting portion 326 having a modified configuration from the above-described third embodiment will be indicated. Note that redundant descriptions of structures, actions, and effects similar to those of the third embodiment described above will be omitted.

Figure 29:
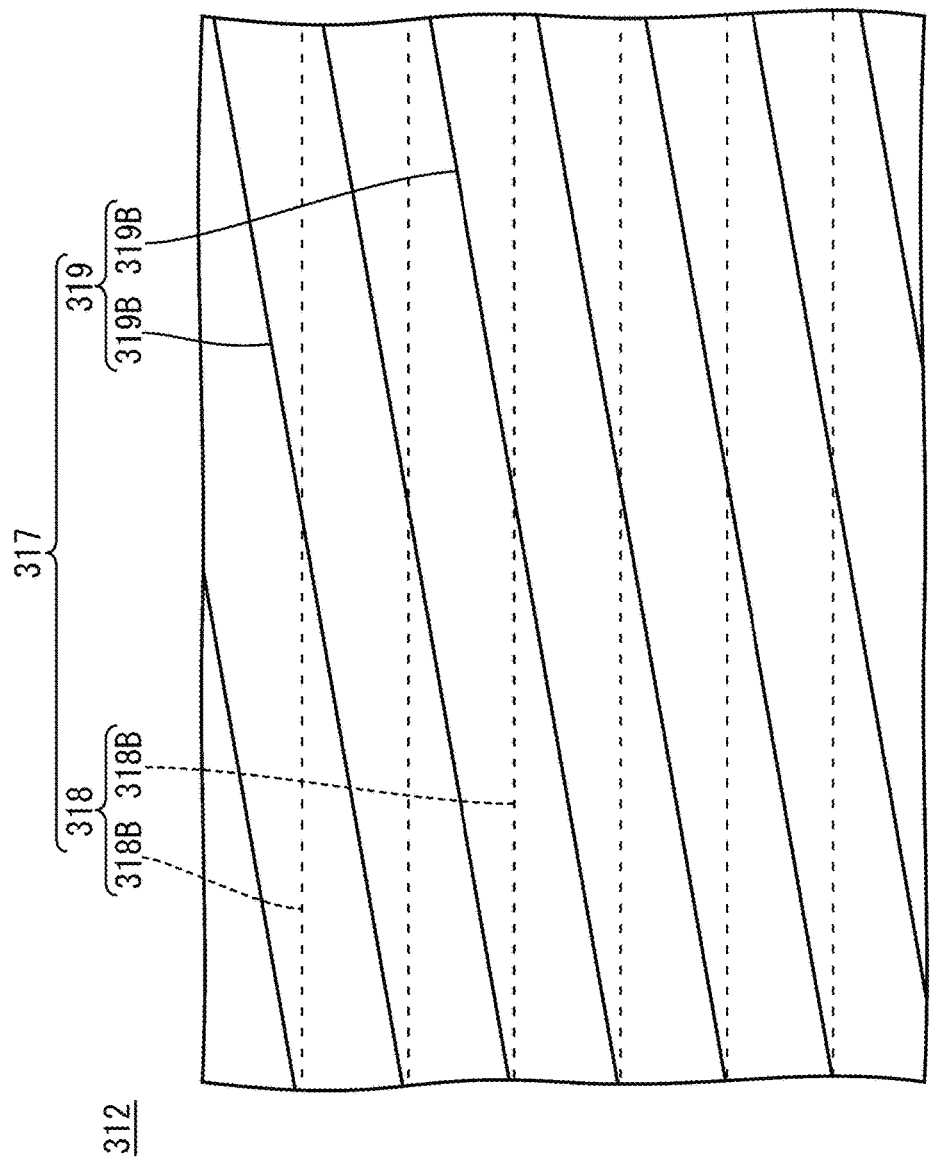
FIG. 29 is a plan view illustrating planar arrangement of a first prism sheet and a second prism sheet in a backlight device according to a fourth embodiment.

As illustrated in FIG. 29, in the second prism sheet 319 according to the present embodiment, second unit prisms 319B are disposed in postures with their extending directions (ridge lines) being inclined with respect to first unit prisms 318B extending along the X-axis direction in a first prism sheet 318. Here, pixels included in the liquid crystal panel (see FIG. 1) are configured as a periodic structure in which a plurality of the pixels are arranged side by side for each of rows and columns so as to be formed in a matrix with constant periodicity along the X-axis direction and the Y-axis direction. The second unit prisms 319B of the second prism sheet 319 according to the present embodiment have planar arrangement inclined with respect to the X-axis direction that is the alignment direction of the pixels having the periodic structure. This makes it difficult for the arrangement of the second unit prisms 319B to interfere with the array of the pixels, making it more difficult to generate interference fringes called moire in a display image on the liquid crystal panel, and allowing high display quality to be obtained.

When the second prism sheet 319 is disposed as described above, there is a concern that brightness distribution related to emission light from the backlight device 312 is biased. In detail, of an emission range of light from the backlight device 312, a difference between the amounts of emission light from both end side portions in the X-axis direction is likely to be generated, and there is a risk that brightness unevenness is visually recognized. Specifically, in the present embodiment, of the emission range of light from the backlight device 312, the amount of emission light from the left end side portion illustrated in FIG. 30 tends to be greater than the amount of emission light from the right end side portion illustrated in FIG. 30. Thus, as illustrated in FIG. 30, the light refracting portion 326 according to the present embodiment is configured such that an occupancy rate occupied by unit light refracting portions 326A differs between one end side portion 315AE and the other end side portion 315AE of the light entering end face 315A. Specifically, the light refracting portion 326 is configured such that an arrangement interval P4 of the unit light refracting portions 326A in the right end side portion 315AE illustrated in FIG. 30 is larger than the arrangement interval P3 of the unit light refracting portions 326A in the left end side portion 315AE illustrated in FIG. 30. Also, the arrangement interval P3 of the unit light refracting portions 326A in the left end side portion 315AE illustrated in FIG. 30 is larger than the arrangement interval P2 of the unit light refracting portions 326A in a central side portion 315AC. Note that a width dimension W2 of the unit light refracting portion 326A in the left end side portion 315AE illustrated in FIG. 30 and a width dimension W3 of the unit light refracting portion 326A in the right end side portion 315AE illustrated in FIG. 30 are identical, and are also identical to a width dimension W1 of the unit light refracting portion 326A in the central side portion 315AC. Thus, the occupancy rate (W3/P4) occupied by the unit light refracting portions 326A in the right end side portion 315AE illustrated in FIG. 30 is lower than the occupancy rate (W2/P3) occupied by the unit light refracting portions 326A in the left end side portion 315AE illustrated in FIG. 30. In addition, the occupancy rate occupied by the unit light refracting portions 326A in the left end side portion 315AE illustrated in FIG. 30 is lower than an occupancy rate (W1/P2) occupied by the unit light refracting portions 326A in the central side portion 315AC.

Figure 30:
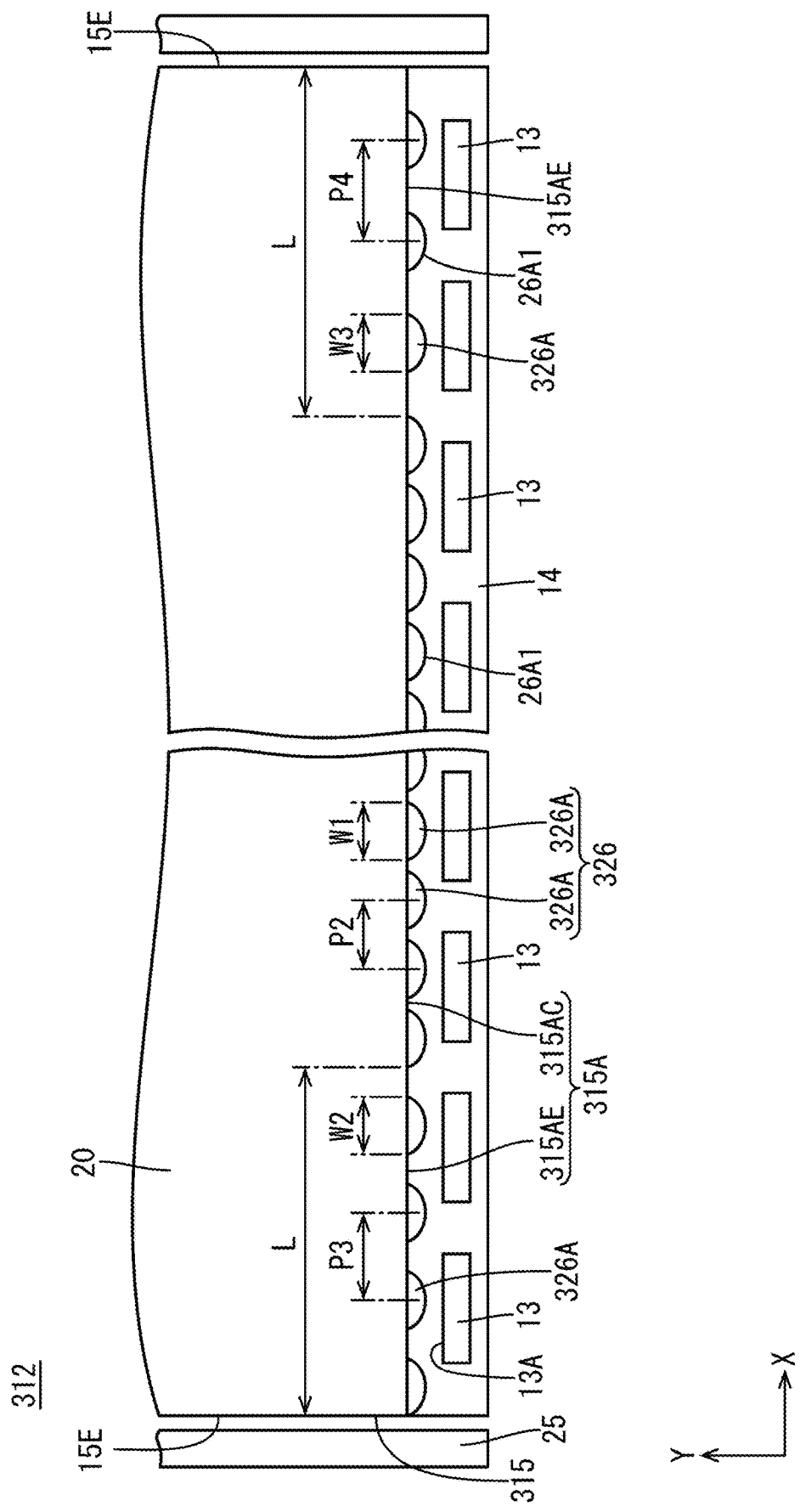
FIG. 30 is a plan view of the backlight device in which the vicinity of a corner portion of a light guide plate at a light entering end face side is enlarged.

As described above, since in the right end side portion 315AE illustrated in FIG. 30, the occupancy rate occupied by the unit light refracting portions 326A is the lowest in the light entering end face 315A, the amount of light imparted with a refracting action by the unit light refracting portions 326A is the lowest. Thus, when light emitted from the light emission plate face after being incident on the right end side portion 315AE illustrated in FIG. 30 is imparted with a condensing action in the front direction by the optical sheet 317, most of the light rises in the front direction, and as a result, the effect of improving the front brightness related to the emission light is the highest. Because of this, within the emission range of light from the backlight device 312, the amount of emission light that tends to be insufficient in the right end side portion illustrated in FIG. 30 can be compensated. In contrast, in the left end side portion 315AE illustrated in FIG. 30, compared to the right end side portion 315AE, the occupancy rate occupied by the unit light refracting portions 326A is high, so the amount of light imparted with a refracting action by the unit light refracting portions 326A is relatively increased. Thus, light emitted from the light emission plate face after being incident on the left end side portion 315AE illustrated in FIG. 30 is imparted with a condensing action in the front direction by the optical sheet 317, the amount of light that rises in the front direction is relatively reduced, and as a result, the effect of improving the front brightness related to emission light is relatively low. In this way, within the emission range of light from the backlight device 312, the amount of emission light that tends to be excessive in the left end side portion illustrated in FIG. 30 can be suppressed. As described above, it is possible to compensate for the bias of brightness distribution related to emission light from the backlight device 312.

As described above, according to the present embodiment, the light refracting portion 326 is configured such that the occupancy rates are different between the two end side portions 315AE that sandwich the central side portion 315AC of the light entering end face 315A. For example, in a case where other optical members are overlaid on the light emission plate face of the light guide plate 315, there is a possibility that the brightness distribution related to the emission light from the backlight device 312 may be biased. In such a case, since the light refracting portion 326 is configured such that the occupancy rates differ between the two end side portions 315AE that sandwich the central side portion 315AC of the light entering end face 315A, the amount of emission light can be adjusted near the light entering end face 315A and near the opposite end face to the light entering end face at each of two end portions of the light guide plate 315 in the alignment direction. This makes it possible to compensate for the bias of the brightness distribution related to emission light from the backlight device 312.

Fifth Embodiment

A fifth embodiment will be described with reference to FIG. 31. In the fifth embodiment, a light refracting portion 426 with a modified configuration from that in the above-described third embodiment will be indicated. Note that redundant descriptions of structures, actions, and effects similar to those of the third embodiment described above will be omitted.

Figure 31:
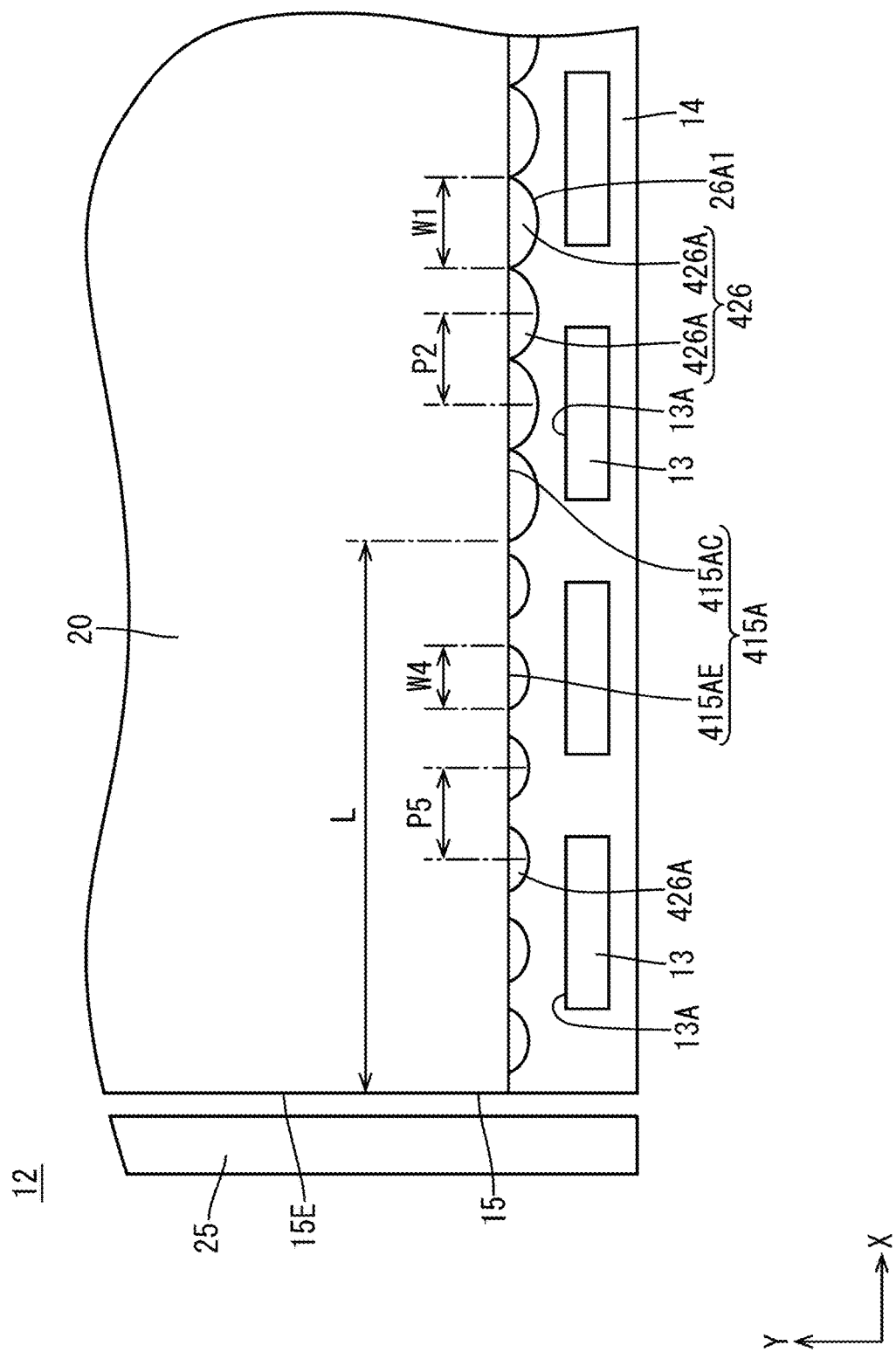
FIG. 31 is a plan view, of a backlight device according to a fifth embodiment, in which the vicinity of a corner portion of a light guide plate at a light entering end face side is enlarged.

First, as illustrated in FIG. 31, as for the light refracting portion 426 according to the present embodiment, a width dimension W1 of a unit light refracting portion 426A in a central side portion 415AC and an arrangement interval P1 of the unit light refracting portions 426A in the central side portion 415AC are identical, which is the same as the first embodiment described above in that regard. That is, an occupancy rate occupied by the unit light refracting portions 426A in the central side portion 415AC is 100% in percent figures. In contrast, the light refracting portion 426 is configured such that an arrangement interval P5 of the unit light refracting portions 426A in each end side portion 415AE is identical to the arrangement interval P1 of the unit light refracting portions 426A in the central side portion 415AC, but a width dimension W4 of the unit light refracting portion 426A in each end side portion 415AE is smaller than the width dimension W1 of the unit light refracting portion 426A in the central side portion 415AC. That is, although a plurality of unit light refracting portions 426A are arranged side by side at equal intervals in the X-axis direction throughout the entire length of the light entering end face 415A, the unit light refracting portion 426A in each end side portion 415AE is made smaller than the unit light refracting portion 426A in the central side portion 415AC. Thus, an occupancy rate (W4/P5) occupied by the unit light refracting portions 426A in each end side portion 415AE of the light entering end face 415A is lower than an occupancy rate (W1/P1) occupied by the unit light refracting portions 426A in the central side portion 415AC of the light entering end face 415A. Even in such a configuration, the effect of improving brightness unevenness and the like can be obtained in a similar manner to those in the above-described embodiments 1 and 3.

Sixth Embodiment

A sixth embodiment will be described with reference to FIG. 32. In the sixth embodiment, a light refracting portion 526 with a modified configuration from that in the above-described third embodiment will be indicated. Note that redundant descriptions of structures, actions, and effects similar to those of the third embodiment described above will be omitted.

Figure 32:
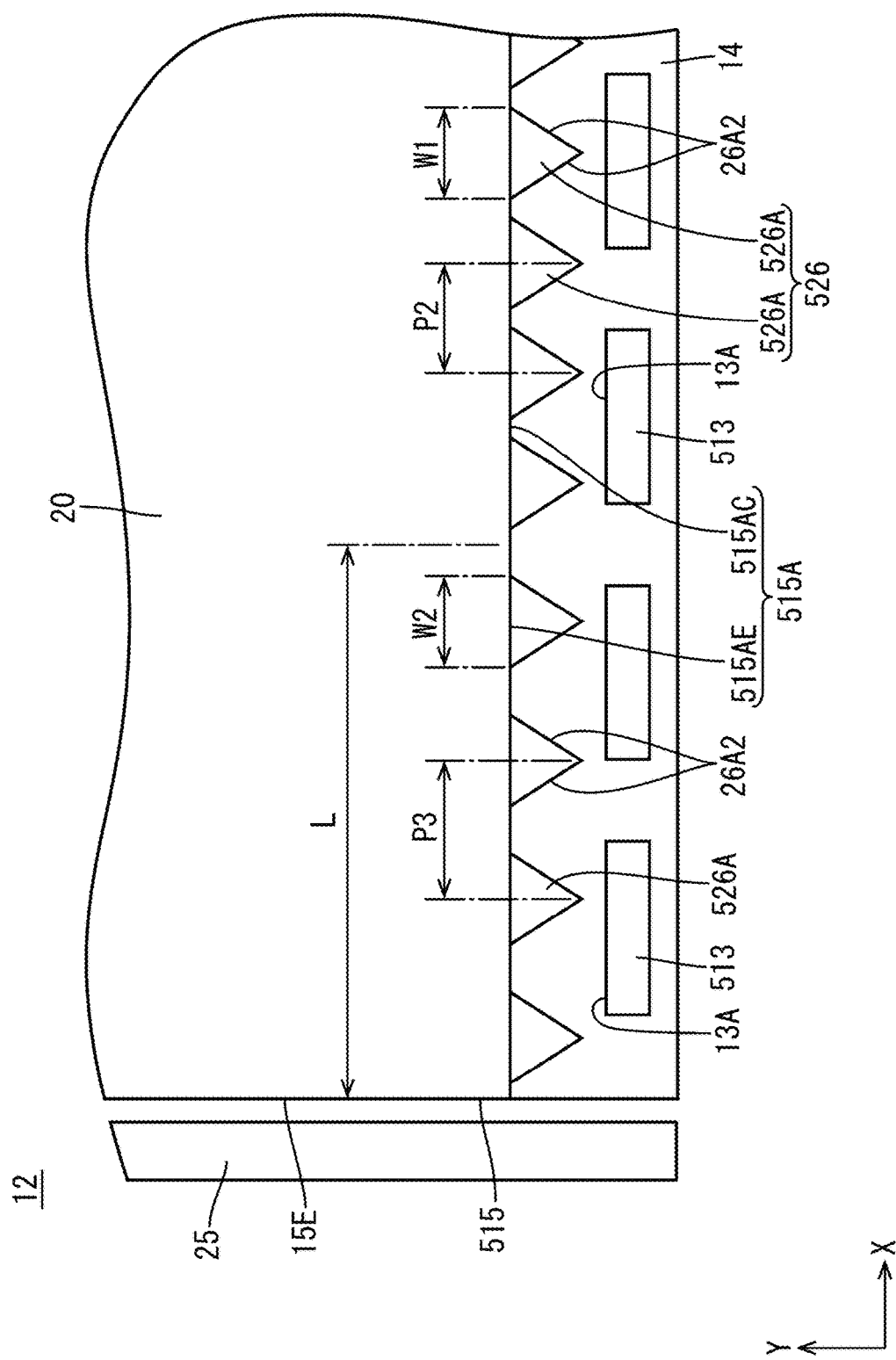
FIG. 32 is a plan view, of a backlight device according to a sixth embodiment, in which the vicinity of a corner portion of a light guide plate at a light entering end face side is enlarged.

As illustrated in FIG. 32, in the light refracting portion 526 according to the present embodiment, a unit light refracting portion 526A has a triangular shape in a cross section taken along the X-axis direction and the Y-axis direction, and has a triangular prism shape extending along the Z-axis direction. That is, the unit light refracting portion 526A is said to be a prism having a convex shape and protruding from a light entering end face 515A to an LED 513 side. The surface of the unit light refracting portion 526A is an inclined face 26A2 that is inclined with respect to the X-axis direction and the Y-axis direction. Thus, light emitted from the LED 513 is made incident inside the light guide plate 515 while being imparted with a refracting action so as to be diffused in the X-axis direction by the inclined face 26A2 of the unit light refracting portion 526A. The light imparted with the refracting action by the unit light refracting portion 526A travels while being diffused in the X-axis direction inside the light guide plate 515, compared to light that is not imparted with the refracting action. In order to provide the light refracting portion 526 having such a configuration integrally with the light guide plate 515, for example, the light guide plate 515 may be manufactured by injection molding, and a transfer shape for transferring the light refracting portion 526 may be formed in advance on a molding face of a molding die thereof for molding the light entering end face 515A. In the light refracting portion 526, a width dimension W1 and an arrangement interval P2 of the unit light refracting portions 526A in the central side portion 515AC of the light entering end face 515A, and a width dimension W2 and an arrangement interval P3 of the unit light refracting portions 526A in each end side portion 515AE are identical to those in third embodiment. In such a configuration, the effect of improving brightness unevenness and the like can be obtained in a similar manner to that in the third embodiment described above.

Seventh Embodiment

A seventh embodiment will be described with reference to FIG. 33. In the seventh embodiment, a backlight device 612 with a modified configuration from that in the first embodiment described above will be indicated. Note that redundant descriptions of structures, actions, and effects similar to those of the first embodiment described above will be omitted.

Figure 33:
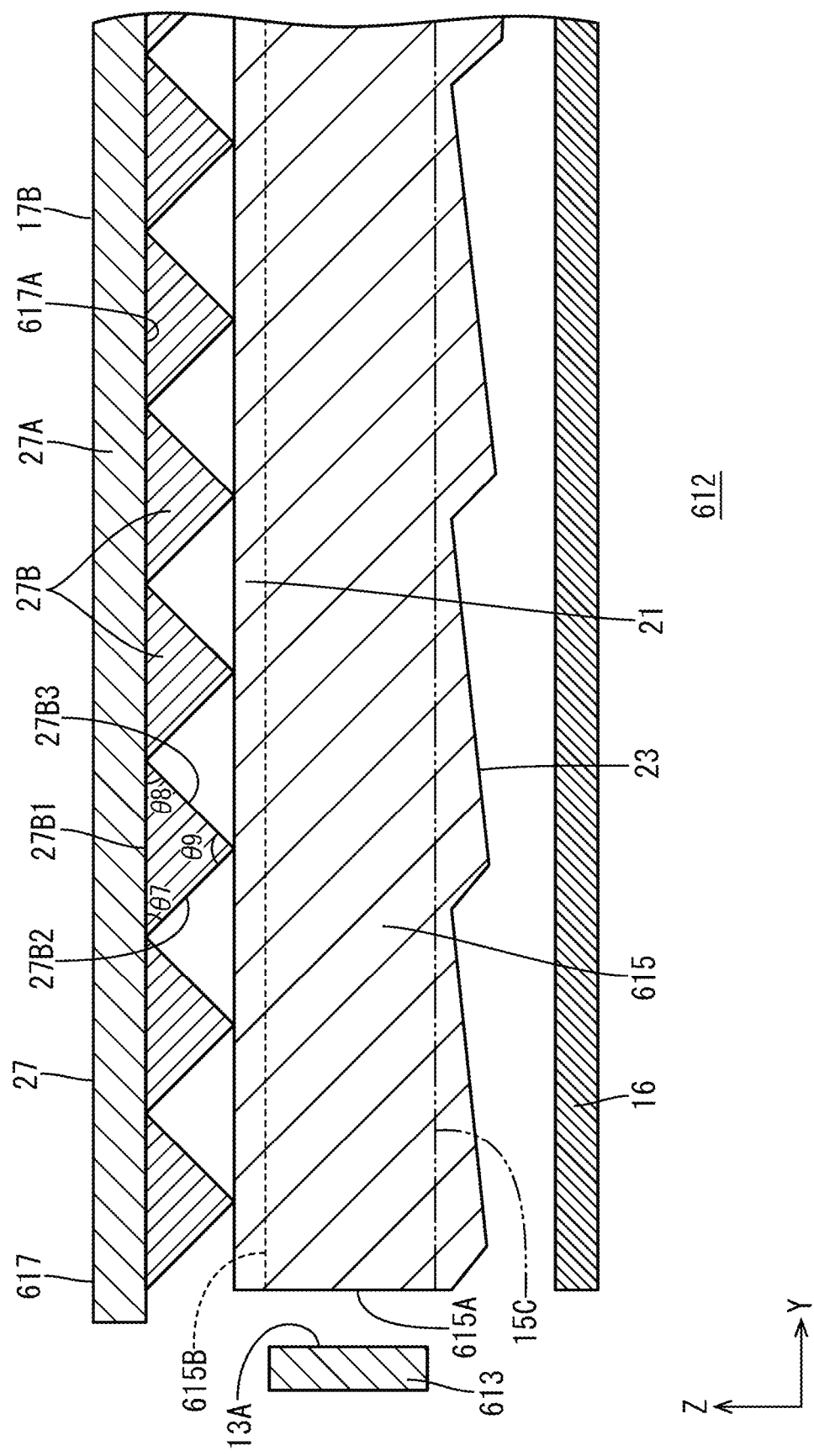
FIG. 33 is a cross-sectional view of a backlight device according to a seventh embodiment taken along the Y-axis direction.

As illustrated in FIG. 33, the backlight device 612 according to the present embodiment includes a prism sheet (turning lens sheet) 27 as an optical sheet 617. The prism sheet 27 includes a base material 27A having a sheet shape and unit prisms 27B provided on a plate face (light entering face 617A) at a back side (light entering side) of the base material 27A. The base material 27A is made of substantially transparent synthetic resin, and specifically, is formed of, for example, a crystalline transparent resin material such as PET. The unit prism 27B is formed of an ultraviolet-curing resin material being substantially transparent and being a type of photo-curable resin material. A manufacturing method of the prism sheet 27 is similar to the manufacturing method of the first prism sheet 18 and the second prism sheet 19 described in the first embodiment. The ultraviolet-curing resin material constituting the unit prism 27B is, for example, acrylic resin such as PMMA. The unit prism 27B is provided so as to protrude from a plate face of the base material 27A toward the back side along the Z-axis direction, that is, toward a light guide plate 615 side.

The unit prism 27B has a substantially triangular shape (substantially mountain shape) in a cross section taken along the Y-axis direction and extends linearly along the X-axis direction, and a plurality of the unit prisms 27B are continuously arranged side by side with substantially no interval along the Y-axis direction on the plate face of the base material 27A. The unit prism 27B includes a base 27B1 parallel to the Y-axis direction (plate face of the base material 27A), and a pair of oblique sides 27B2 and 27B3 rising from both ends of the base 27B1. Of the pair of oblique sides 27B2 and 27B3 in the unit prism 27B, the oblique side at the LED 613 side in the Y-axis direction is referred to as an LED-side oblique side (light source-side oblique side) 27B2, and the oblique side at the opposite side is referred to as an opposite-side oblique side to the LED side (opposite-side oblique side to the light source side) 27B3. Of the pair of oblique sides, the opposite-side oblique side to the LED side 27B3 is exposed mainly to light traveling in a direction away from the LED 613 in the Y-axis direction, of light incident on the unit prism 27B, to refract the light. In contrast, the LED-side oblique side 27B2 is exposed mainly to light traveling in a direction approaching the LED 613 in the Y-axis direction, of the light incident on the unit prism 27B, to refract the light. In any case, most of the light refracted by the pair of oblique sides 27B2 and 27B3 in the unit prism 27B is selectively raised in the Y-axis direction and condensed. In the unit prism 27B, an inclination angle θ7 of the LED-side oblique side 27B2 with respect to the base 27B1, and an inclination angle θ8 of the opposite-side oblique side to the LED side 27B3 with respect to the base 27B1 are identical. In other words, the unit prism 27B has a symmetric cross-sectional shape, which is an isosceles triangle, and an apex angle θ9 thereof is approximately 90 degrees, for example.

Light incident on the light entering end face 615A of the light guide plate 615 from the LED 613 is emitted from the light emission plate face 615B while traveling in a direction away from the light entering end face 615A in the Y-axis direction to be incident on the prism sheet 27. Thus, since most of the incident light on the prism sheet 27 is incident on the unit prism 27B while traveling in the direction away from the light entering end face 615A in the Y-axis direction, most of the incident light is imparted with a refracting action by the opposite-side oblique side to the LED side 27B3 of the pair of oblique sides 27B2 and 27B3. Here, the apex angle θ9 of the unit prism 27B is approximately 90 degrees, so most of the light refracted by the opposite-side oblique side to the LED side 27B3 is raised and emitted so as to be directed toward the front direction. Further, light reflected by the frame to be incident again on the opposite end face to the light entering end face after being emitted from the opposite end face to the light entering end face of the light guide plate 615 once is emitted from the light emission plate face 615B to be incident on the prism sheet 27 while traveling toward a direction approaching the light entering end face 615A in the Y-axis direction. Thus, because some of the incident light on the prism sheet 27 is incident on the unit prism 27B while traveling in a direction approaching the light entering end face 615A in the Y-axis direction, some of the incident light is imparted with a refracting action by the LED-side oblique side 27B2 of the pair of oblique sides 27B2 and 27B3, and is raised so as to be directed toward the front direction. As described above, the emission light from the light guide plate 615 is selectively imparted with a condensing action in the Y-axis direction by the prism sheet 27, thereby improving front brightness related to emission light from the backlight device 612 and usage efficiency of light.

As described above, according to the present embodiment, the backlight device 612 includes the prism sheet 27 disposed at the light emission side with respect to the light guide plate 615, and the prism sheet 27 includes a plurality of unit prisms 27B arranged side by side along a direction from the LED 613 toward the light guide plate 615 on the light entering face 617A on which light from the light guide plate 615 is incident, and extending along the alignment direction. In this way, when the light emitted from the light emission plate face 615B of the light guide plate 615 is incident on the prism sheet 27, the light is emitted to the outside while being selectively imparted with a condensing action in the direction from the LED 613 toward the light guide plate 615 by the plurality of unit prisms 27B extending along the alignment direction of the plurality of LEDs 613 on the light entering face 617A. By adjusting the angles or the like of the respective oblique sides 27B2 and 27B3 of the unit prism 27B, the condensing action to be imparted to the light can be controlled, thereby improving front brightness related to emission light, usage efficiency of light, and the like. When the front brightness related to the emission light is improved in this manner, there is a concern that bright portions are easily visually recognized near the light entering end face 615A at the end portions of the light guide plate 615 in the alignment direction, and dark portions are easily visually recognized near the opposite end face to the light entering end face at the same end portions. In that regard, since the light refracting portion is configured to have a low occupancy rate in the end side portions of the light entering end face 615A in the alignment direction, light incident on the end side portions of the light entering end face 615A from the LEDs 613 positioned at the end sides in the alignment direction is difficult to leak to the outside of the light guide plate 615, and is easy to reach near the opposite end face to the light entering end face at the end portions of the light guide plate 615 in the alignment direction. As a result, bright portions are difficult to be visually recognized near the light entering end face 615A at the end portions of the light guide plate 615 in the alignment direction, and dark portions are difficult to be visually recognized near the opposite end face to the light entering end face at the same end portions.

Other Embodiments

The techniques disclosed in the specification are not limited to the embodiments described above and illustrated by the drawings, and embodiments such as those that will be described below are also included within the technical scope.

(1) The light refracting portion 26, 126, 226, 326, 426, 526 may be configured such that the length in the X-axis direction in the end side portions 15AE, 115AE, 215AE, 315AE, 415AE, 515AE of the light entering end face 15A, 115A, 215A, 315A, 415A, 515A, and 615A is set to any numeral value within a range being greater than 8.3 mm and less than 12.1 mm. In addition, the light refracting portion 26, 126, 226, 326, 426, 526 may be configured such that the length in the X-axis direction in the end side portions 15AE, 115AE, 215AE, 315AE, 415AE, and 515AE of the light entering end face 15A, 115A, 215A, 315A, 415A, 515A, 615A is set to any numeral value within a range being greater than 4.5 mm and less than 8.3 mm. Also, the light refracting portion 26, 126, 226, 326, 426, 526 may be configured such that the length in the X-axis direction in the end side portions 15AE, 115AE, 215AE, 315AE, 415AE, 515AE of light entering end face 15A, 115A, 215A, 315A, 415A, 515A, 615A is set to any numeral value within a range being greater than 12.1 mm and less than 15.9 mm. Also, the light refracting portion 26, 126, 226, 326, 426, 526 may be configured such that the length in the X-axis direction of the end side portions 15AE, 115AE, 215AE, 315AE, 415AE, 515AE of the light entering end face 15A, 115A, 215A, 315A, 415A, 515A, 615A is set to any numeral value being less than 4.5 mm. Also, the light refracting portion 26, 126, 226, 326, 426, 526 may be configured such that the length in the X-axis direction in the end side portions 15AE, 115AE, 215AE, 315AE, 415AE, 515AE of the light entering end face 15A, 115A, 215A, 315A, 415A, 515A, 615A is set to any numeral value being greater than 15.9 mm.

(2) The light refracting portions 26, 126, 226, 326, 426, 526 may be configured such that the occupancy rate occupied by the unit light refracting portions 26A, 126A, 226A, 326A, 426A, 526A in the central side portion 15AC, 115AC, 215AC, 315AC, 415AC, 515AC of the light entering end face 15A, 115A, 215A, 315A, 415A, 515A, 615A is set to any numeral value within a range being lower than 100% and higher than 85% in percent figures. Also, the light refracting portion 26, 126, 226, 326, 426, 526 may be configured such that the occupancy rate occupied by the unit light refracting portions 26A, 126A, 226A, 326A, 426A, 526A in the central side portion 15AC, 115AC, 215AC, 315AC, 415AC, 515AC of the light entering end face 15A, 115A, 215A, 315A, 415A, 515A, 615A is set to any numeral value being lower than 85% and higher than 70% in percent figures. Also, the light refracting portion 26, 126, 226, 326, 426, 526 may be configured such that the occupancy rate occupied by the unit light refracting portions 26A, 126A, 226A, 326A, 426A, 526A in the central side portion 15AC, 115AC, 215AC, 315AC, 415AC, 515AC of the light entering end face 15A, 115A, 215A, 315A, 415A, 515A, 615A is set to any numeral value being lower than 70% in percent figures.

(3) In the configurations described in the third to sixth embodiments, the light refracting portion 226, 326, 426, 526 may be configured such that the occupancy rate occupied by the unit light refracting portions 226A, 326A, 426A, 526A in the end side portions 215AE, 315AE, 415AE, 515AE of the light entering end face 215A, 315A, 415A, 515A is set to any numeral value within a range being lower than 100% and higher than 60% in percent figures. Also, the light refracting portion 226, 326, 426, 526 may be configured such that the occupancy rate occupied by the unit light refracting portions 226A, 326A, 426A, 526A in the end side portions 215AE, 315AE, 415AE, 515AE of the light entering end face 215A, 315A, 415A, 515A is set to any numeral value within a range being lower than 60% and higher than 50% in percent figures. The light refracting portions 226, 326, 426, 526 may be configured such that the occupancy rate occupied by the unit light refracting portions 226A, 326A, 426A, 526A in the end side portions 215AE, 315AE, 415AE, 515AE of the light entering end face 215A, 315A, 415A, 515A is set to any numeral value being lower than 50% in percent figures.

(4) In the configurations described in the third to sixth embodiments, the light refracting portions 226, 326, 426, 526 may be configured such that the width dimension of the unit light refracting portion 226A, 326A, 426A, 526A in the end side portions 215AE, 315AE, 415AE, 515AE of the light entering end face 215A, 315A, 415A, 515A, 615A is different from the width dimension of the unit light refracting portion 226A, 326A, 426A, 526A in the central side portion 215AC, 315AC, 415AC, 515AC, and the arrangement interval of the unit light refracting portion 226A, 326A, 426A, 526A in the end side portions 215AE, 315AE, 415AE, 515AE of the light entering end face 215A, 315A, 415A, 515A is different from the arrangement interval of the unit light refracting portions 226A, 326A, 426A, 526A in the central side portion 215AC, 315AC, 415AC, 515AC.

(5) The light refracting portion 26, 126, 226, 326, 426, 526 may be configured such that a plurality of width dimensions of the unit light refracting portions 26A, 126A, 226A, 326A, 426A, 526A in the central side portion 15AC, 115AC, 215AC, 315AC, 415AC, 515AC of the light entering end face 15A, 115A, 215A, 315A, 415A, 515A, 615A are set. Similarly, the light refracting portion 26, 126, 226, 326, 426, 526 may be configured such that a plurality of arrangement intervals of the unit light refracting portions 26A, 126A, 226A, 326A, 426A, 526A in the central side portion 15AC, 115AC, 215AC, 315AC, 415AC, 515AC of the light entering end face 15A, 115A, 215A, 315A, 415A, 515A, 615A are set.

(6) In the configurations described in the third to sixth embodiments, the light refracting portion 226, 326, 426, 526 may be configured such that radii of curvature of the unit light refracting portions 226A, 326A, 426A, 526A in the end side portions 215AE, 315AE, 415AE, 515AE of the light entering end face 215A, 315A, 415A, 515A are different from radii of curvature of the unit light refracting portions 226A, 326A, 426A, 526A in the central side portion 215AC, 315AC, 415AC, 515AC. In this case, the width dimension of the unit light refracting portions 226A, 326A, 426A, 526A in the end side portions 215AE, 315AE, 415AE, 515AE of the light entering end face 215A, 315A, 415A, 515A may be identical to or may be different from the width dimension of the unit light refracting portions 226A, 326A, 426A, 526A in the central side portion 215AC, 315AC, 415AC, 515AC.

(7) In the configurations described in the third to sixth embodiments, the light refracting portion 226, 326, 426, 526 may be configured such that a plurality of width dimensions of the unit light refracting portions 226A, 326A, 426A, 526A in the end side portions 215AE, 315AE, 415AE, 515AE of the light entering end face 215A, 315A, 415A, 515A are set. Similarly, the light refracting portions 226, 326, 426, 526 may be configured such that a plurality of arrangement intervals of the unit light refracting portions 226A, 326A, 426A, 526A in the end side portions 215AE, 315AE, 415AE, 515AE of the light entering end face 215A, 315A, 415A, 515A, 615A are set.

(8) In the configurations described in the third, fourth, and sixth embodiments, the light refracting portion 226, 326, 526 may be configured such that the occupancy rate occupied by the unit light refracting portions 226A, 326A, 526A in the central side portion 215AC, 315AC, 515AC of the light entering end face 215A, 315A, 515A is set to 100% in percent figures.

(9) In the configurations described in the fifth embodiment, the light refracting portion 426 may be configured such that the occupancy rate occupied by the unit light refracting portions 426A in the central side portion 415AC of the light entering end face 415A is set to be lower than 100% in percent figures.

(10) In the configurations described in the fourth embodiment, when the inclination of the second prism sheet 319 with respect to the first prism sheet 318 is opposite to that illustrated in the figure, the occupancy rates occupied by the unit light refracting portions 326A in the left and right end side portions 315AE may be reversed.

(11) In a case where there is a concern that deviation occurs in brightness distribution related to emission light due to the configurations other than those of the prism sheets 318 and 319 as described in the fourth embodiment, the occupancy rates occupied by the unit light refracting portions 26A, 126A, 226A, 326A, 426A, 526A in the left and right end side portions 15AE, 115AE, 215AE, 315AE, 415AE, 515AE may be differentiated so as to compensate for the deviation.

(12) Each of the configurations described in the first to seventh embodiments can be combined as appropriate.

(13) Of a pair of end side portions 15AE, 115AE, 215AE, 315AE, 415AE, 515AE included in the light entering end face 15A, 115A, 215A, 315A, 415A, 515A, 615A, the occupancy rate occupied by the unit light refracting portions 26A, 126A, 226A, 326A, 426A, 526A in one end side portion 15AE, 115AE, 215AE, 315AE, 415AE, 515AE is lower than the occupancy rate occupied by the unit light refracting portions 26A, 126A, 226A, 326A, 426A, 526A in the central side portion 15AC, 115AC, 215AC, 315AC, 415AC, 515AC, but the occupancy rate occupied by the unit light refracting portions 26A, 126A, 226A, 326A, 426A, 526A in the other end side portion 15AE, 115AE, 215AE, 315AE, 415AE, 515AE may be equal to the occupancy rate occupied by the unit light refracting portions 26A, 126A, 226A, 326A, 426A, 526A in the central side portion 15AC, 115AC, 215AC, 315AC, 415AC, 515AC.

(14) The light refracting portion 26, 126, 226, 326, 426, 526 may include a plurality of types of unit light refracting portions 26A, 126A, 226A, 326A, 426A, 526A having different shapes in cross sections taken along the X-axis direction and the Y-axis direction. The light refracting portion 26, 126, 226, 326, 426, 526 may include, for example, the unit light refracting portions 26A, 126A, 226A, 326A, 426A having an arch shape as described in the first to fifth and seventh embodiments, and the unit light refracting portions 526A having a triangular shape as described in the sixth embodiment.

(15) The light refracting portion 26, 126, 226, 326, 426, 526 may include the unit light refracting portions 26A, 126A, 226A, 326A, 426A, 526A having a shape other than the arch shape and the triangular shape (for example, an elliptical arch shape, semi-circular shape, semi-elliptical shape, trapezoidal shape, or the like) in a cross section taken along the X-axis direction and the Y-axis direction.

(16) The light refracting portion 26, 126, 226, 326, 426, 526 may be configured with a rough surface formed by performing blast processing or the like on the light entering end face 15A, 115A, 215A, 315A, 415A, 515A, 615A. In this case, the fine unevenness included in the rough surface serves as the unit light refracting portions.

(17) The frame 25 may have a frame-like shape surrounding the light guide plate 15, 115, 215, 315, 515, 615 over its entire periphery.

(18) The specific angle of each of the oblique sides 18B2 and 18B3 in the first unit prism 18B, 318B provided in the first prism sheet 18, 318 can be changed as appropriate. In addition, the configuration according to the first prism sheet 18, 318 can be changed as appropriate.

(19) The specific angle of each of oblique sides 19B2 and 19B3 in the second unit prism 19B, 319B provided in the second prism sheet 19, 319 can be changed as appropriate. In addition, the configuration according to the second prism sheet 19, 319 can be changed as appropriate.

(20) The planar shape of the light guide plate 15, 115, 215, 315, 515, 615 may be a trapezoidal shape or inverted trapezoidal shape, in addition to a rectangular shape. In this case, any of the light entering end face 15A, 115A, 215A, 315A, 415A, 515A, 615A and the opposite end face to the light entering end face 15D, 115D, 215D may be a long side or a short side. In addition, the planar shape of the light guide plate 15, 115, 215, 315, 515, 615 may be an arch shape, a semi-circular shape, a semi-elliptical shape, a shape in which an upper base of a trapezoidal shape (opposite end face to the light entering end face 15D, 115D, 215D) is arc-shaped, or the like.

(21) The first light guide plate lens portion 21 may be provided on the opposite plate face 15C of the light guide plate 15, 115, 215, 315, 515, 615, and the second light guide plate lens portion 22 may be provided on the light emission plate face 15B, 615B of the light guide plate 15, 115, 215, 315, 515, 615.

(22) The light emission reflection portion 23 may be provided on the light emission plate face 15B, 615B of the light guide plate 15, 115, 215, 315, 515, 615.

(23) In addition to a configuration in which the thickness of the light guide plate 15, 115, 215, 315, 515, 615 is constant throughout the entire length, the light guide plate 15, 115, 215, 315, 515, 615 may have a configuration in which the thickness thereof decreases while getting farther from the LED 13, 113, 213, 513, 613, and the opposite plate face 15C is inclined.

(24) The reflective polarizing sheet 20 may have a configuration including a multilayer film without a polarization layer. In this case, a polarizer having a polarization layer may be attached to the liquid crystal panel 11 separately from the reflective polarizing sheet 20.

(25) The specific number of layered sheets, layered order, type, and the like of the optical sheet 17, 117, 317 can be changed as appropriate. For example, the reflective polarizing sheet 20 may be omitted.

(26) The LED 13, 113, 213, 513, 613 may be a top light emitting type in addition to the side light emitting type. In addition to the LED 13, 113, 213, 513, 613, an Organic Light Emitting Diode (OLED) or the like may also be used as the light source.

(27) The backlight device 12, 112, 212, 312, 612 and the liquid crystal display device 10 may have a portrait shape (a configuration in which the long side and the short side are reversed) in a plan view, similar to that described in JP 2020-119678 A.

(28) The specific screen size of the liquid crystal panel 11, the long side dimension and the short side dimension of the light guide plate 15, 115, 215, 315, 515, 615, the width dimension of the LED 13, 113, 213, 513, 613, and the like can be changed as appropriate.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

The invention claimed is:

1. An illumination device comprising:
a plurality of light sources arranged in a row;
a light guide plate including at least a light entering end face having a plate shape, the light entering end face including an outer peripheral edge face on which light emitted from the plurality of light sources is incident, and an opposite end face to the light entering end face disposed at an opposite side to the light entering end face, the light guide plate having one plate face serving as a light emission plate face configured to emit light; and
a light refracting portion configured with a plurality of unit light refracting portions arranged side by side on the light entering end face along an alignment direction of the plurality of light sources, the light refracting portion being configured to refract incident light,
wherein in the light refracting portion, an occupancy rate occupied by the unit light refracting portions in an end side portion of the light entering end face in the alignment direction is made lower than an occupancy rate occupied by the unit light refracting portions in a central side portion of the light entering end face in the alignment direction, and
the light refracting portion is configured to have the occupancy rate in the end side portion being equal to or greater than 50% and equal to or less than 60% in percent figures.

2. The illumination device according to claim 1, wherein the light refracting portion is configured to have a length in the alignment direction of the end side portion within a range being greater than 4.5 mm and less than 15.9 mm.

3. The illumination device according to claim 2, wherein the light refracting portion is configured to have the length in the alignment direction of the end side portion within a range being equal to or greater than 8.3 mm and equal to or less than 12.1 mm.

4. The illumination device according to claim 1, wherein the light refracting portion is configured to have the occupancy rate in the central side portion being equal to or greater than 70% and equal to or less than 85% in percent figures.

5. The illumination device according to claim 1, wherein the light refracting portion has the occupancy rate in the central side portion being higher than 70%.

6. The illumination device according to claim 1, wherein the light refracting portion is configured to have the plurality of unit light refracting portions each of which extending along a normal direction of the light emission plate face, and having an arch shape in a cross section taken along the light emission plate face.

7. The illumination device according to claim 1, wherein the light refracting portion is configured to have the occupancy rate in the end side portion being lower than 60%.

8. The illumination device according to claim 1, wherein the light refracting portion is configured to have a dimension in the alignment direction of each of the plurality of the unit light refracting portions being identical in the end side portion and the central side portion.

9. The illumination device according to claim 1, further comprising:
a light reflecting member facing at least a portion excluding the light entering end face of the outer peripheral edge face of the light guide plate.

10. The illumination device according to claim 1, wherein the light refracting portion is configured to have, in two of end side portions sandwiching the central side portion of the light entering end face, occupancy rates being different from each other.

11. The illumination device according to claim 1, further comprising:
a prism sheet disposed on a light emission side with respect to the light guide plate, the prism sheet being provided with a plurality of unit prisms arranged side by side along a direction from each of the plurality of light sources toward the light guide plate on the light entering face on which light from the light guide plate is incident, the plurality of unit prisms extending along the alignment direction.

12. A display device comprising:
the illumination device according to claim 1; and
a display panel configured to display images using light from the illumination device.

13. An illumination device comprising:
a plurality of light sources arranged in a row;
a light guide plate including at least a light entering end face having a plate shape, the light entering end face including a outer peripheral edge face on which light emitted from the plurality of light sources is incident, and an opposite end face to the light entering end face disposed at an opposite side to the light entering end face, the light guide plate having one plate face serving as a light emission plate face configured to emit light;
a light refracting portion configured with a plurality of unit light refracting portions arranged side by side on the light entering end face along an alignment direction of the plurality of light sources, the light refracting portion being configured to refract incident light;
a first prism sheet disposed on a light emission side with respect to the light guide plate, the first prism sheet being provided with a plurality of first unit prisms arranged side by side along a direction from each of the plurality of light sources toward the light guide plate on a light emission face configured to emit light, the plurality of first unit prisms extending along the alignment direction; and
a second prism sheet disposed on a light emission side with respect to the first prism sheet, the second prism sheet being provided with a plurality of second unit prisms arranged side by side along the direction from each of the plurality of light sources toward the light guide plate on the light emission face configured to emit light, the plurality of second unit prisms extending along the alignment direction, wherein in the light refracting portion, an occupancy rate occupied by the unit light refracting portions in an end side portion of the light entering end face in the alignment direction is made lower than an occupancy rate occupied by the unit light refracting portions in a central side portion of the light entering end face in the alignment direction.

14. The illumination device according to claim 13, wherein the light refracting portion is configured to have the occupancy rate in the end side portion being equal to 0% in percent figures.

15. The illumination device according to claim 13, further comprising:
a light reflecting member facing at least a portion excluding the light entering end face of the outer peripheral edge face of the light guide plate.

16. The illumination device according to claim 13, wherein the light refracting portion is configured to have a length in the alignment direction of the end side portion within a range being greater than 4.5 mm and less than 15.9 mm.

17. The illumination device according to claim 16, wherein the light refracting portion is configured to have the length in the alignment direction of the end side portion within a range being equal to or greater than 8.3 mm and equal to or less than 12.1 mm.

18. The illumination device according to claim 13, wherein the light refracting portion is configured to have the occupancy rate in the central side portion being equal to or greater than 70% and equal to or less than 85% in percent figures.

19. The illumination device according to claim 13, wherein the light refracting portion has the occupancy rate in the central side portion being higher than 70%.

20. The illumination device according to claim 13, wherein the light refracting portion is configured to have, in two of end side portions sandwiching the central side portion of the light entering end face, occupancy rates being different from each other.

21. The illumination device according to claim 13, wherein the light refracting portion is configured to have the plurality of unit light refracting portions each of which extending along a normal direction of the light emission plate face, and having an arch shape in a cross section taken along the light emission plate face.

22. A display device comprising:
the illumination device according to claim 13; and
a display panel configured to display images using light from the illumination device.

* * * * *